(12) United States Patent
Arnold

(10) Patent No.: US 12,099,504 B2
(45) Date of Patent: Sep. 24, 2024

(54) UTILIZING ARRAY FIELD DISTRIBUTION DATA IN DATABASE SYSTEMS

(71) Applicant: Ocient Holdings LLC, Chicago, IL (US)

(72) Inventor: Jason Arnold, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 149 days.

(21) Appl. No.: 17/932,727

(22) Filed: Sep. 16, 2022

(65) Prior Publication Data

US 2023/0010912 A1 Jan. 12, 2023

Related U.S. Application Data

(63) Continuation-in-part of application No. 17/073,567, filed on Oct. 19, 2020, now Pat. No. 11,507,578.

(51) Int. Cl.
*G06F 16/2453* (2019.01)
*G06F 16/2455* (2019.01)

(52) U.S. Cl.
CPC .... *G06F 16/2454* (2019.01); *G06F 16/24542* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 5,548,770 A | 8/1996 | Bridges | |
| 6,230,200 B1 | 5/2001 | Forecast | |
| 6,633,772 B2 | 10/2003 | Ford | |
| 7,499,907 B2 | 3/2009 | Brown | |
| 7,908,242 B1 | 3/2011 | Achanta | |
| 2001/0051949 A1 | 12/2001 | Carey | |
| 2002/0032676 A1 | 3/2002 | Reiner | |
| 2002/0154740 A1 | 10/2002 | Avnery | |
| 2004/0162853 A1 | 8/2004 | Brodersen | |
| 2007/0266375 A1 | 11/2007 | Bronnikov | |
| 2008/0133456 A1 | 6/2008 | Richards | |
| 2009/0063893 A1 | 3/2009 | Bagepalli | |
| 2009/0183167 A1 | 7/2009 | Kupferschmidt | |
| 2010/0082577 A1 | 4/2010 | Mirchandani | |
| 2010/0241646 A1 | 9/2010 | Friedman | |
| 2010/0274983 A1 | 10/2010 | Murphy | |
| 2010/0312756 A1 | 12/2010 | Zhang | |
| 2011/0219169 A1 | 9/2011 | Zhang | |

(Continued)

OTHER PUBLICATIONS

Geng et al., "SciHive: Array-based query processing with HiveQL". 2013. (Year: 2013).*

(Continued)

*Primary Examiner* — Christopher J Raab

(74) *Attorney, Agent, or Firm* — Garlick & Markison; Katherine C. Stuckman; Bruce E. Stuckman

(57) ABSTRACT

A method includes generating array field distribution data for an array field of a dataset. A query expression for execution that includes a query predicate indicating the array field of the dataset is received. The array field distribution data for the array field is utilized to generate query plan data for the query expression based on the query expression including the query predicate indicating the array field. Execution of the query expression is facilitated in accordance with the query plan data.

18 Claims, 40 Drawing Sheets

(56) References Cited

U.S. PATENT DOCUMENTS

| | | | |
|---|---|---|---|
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | McWilliams |
| 2013/0332484 | A1 | 12/2013 | Gajic |
| 2014/0006382 | A1* | 1/2014 | Barber .................. G06F 16/221 707/718 |
| 2014/0047095 | A1 | 2/2014 | Breternitz |
| 2014/0136510 | A1 | 5/2014 | Parkkinen |
| 2014/0188841 | A1 | 7/2014 | Sun |
| 2014/0281746 | A1 | 9/2014 | Ercegovac |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2018/0314722 | A1* | 11/2018 | Li ......................... G06F 40/221 |
| 2019/0327124 | A1* | 10/2019 | Lai .......................... G01S 5/017 |
| 2021/0042302 | A1* | 2/2021 | Miao ................... G06F 16/2462 |
| 2021/0357373 | A1* | 11/2021 | Vemulapalli .......... G06F 16/316 |
| 2022/0019784 | A1* | 1/2022 | Wen ....................... G06F 40/289 |
| 2022/0121711 | A1* | 4/2022 | Arnold ............. G06F 16/24542 |

OTHER PUBLICATIONS

A new high performance fabric for HPC, Michael Feldman, May 2016, Intersect360 Research.

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci572120l1Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner

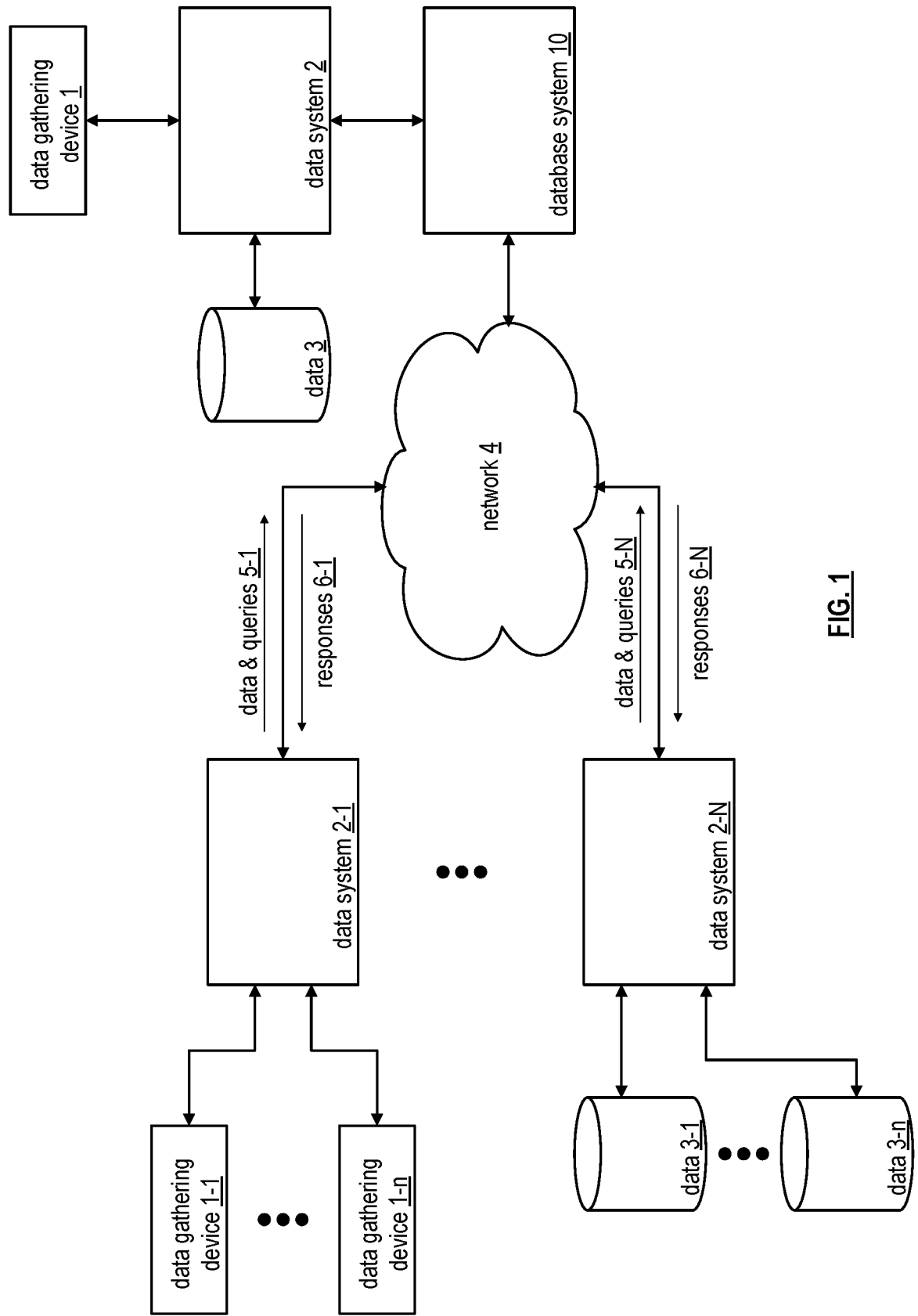

database system 10 computing device 18 computing device 18 computing device 18 node 37 node 37 node 37 node 37 data set

FIG. 21 query processing module 2510

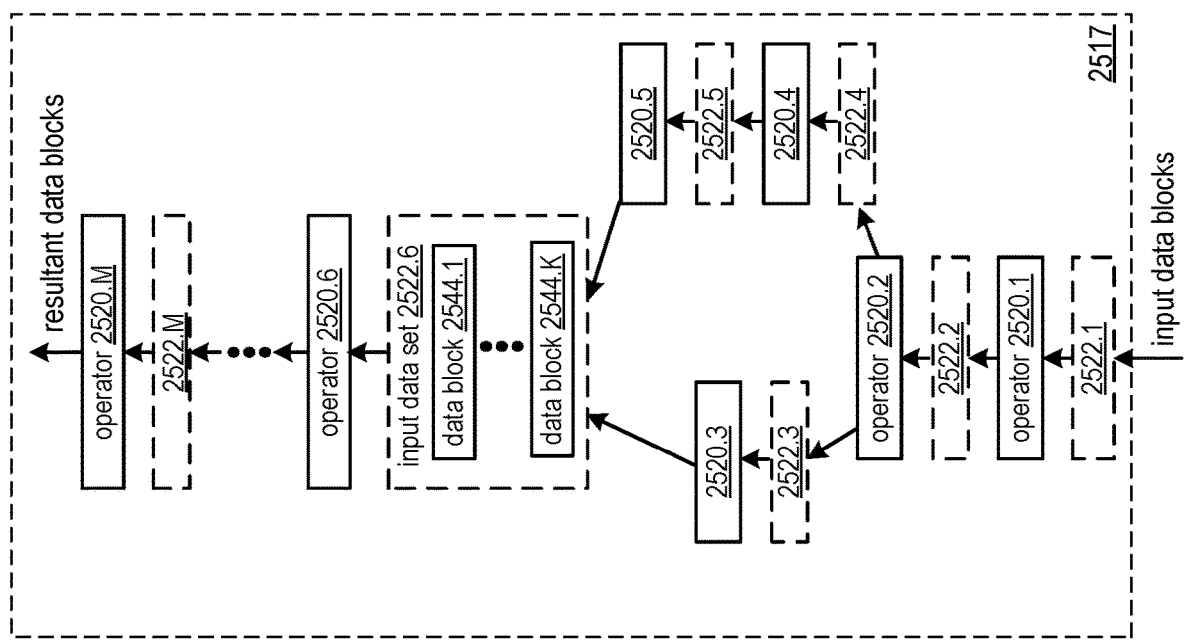

query processing module 2510 query execution module 2504 query execution module 2504 query processing module 2510 step 2590 step 2586 query processing system 2510

US 12,099,504 B2

UTILIZING ARRAY FIELD DISTRIBUTION DATA IN DATABASE SYSTEMS

CROSS-REFERENCE TO RELATED APPLICATIONS

The present U.S. Utility patent application claims priority pursuant to 35 U.S.C. § 120 as a continuation-in-part of U.S. Utility application Ser. No. 17/073,567, entitled "DELAYING EXCEPTIONS IN QUERY EXECUTION", filed Oct. 19, 2020, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIG. 1 is a schematic block diagram of an embodiment of a large scale data processing network that includes a database system in accordance with the present invention;

FIGS. 15-23 are schematic block diagrams of an example of processing a table or data set for storage in the database system in accordance with the present invention;

FIG. 25B is a schematic block diagram of a query operator execution flow in accordance with various embodiments of the present invention;

DETAILED DESCRIPTION OF THE INVENTION

Figure 1A:
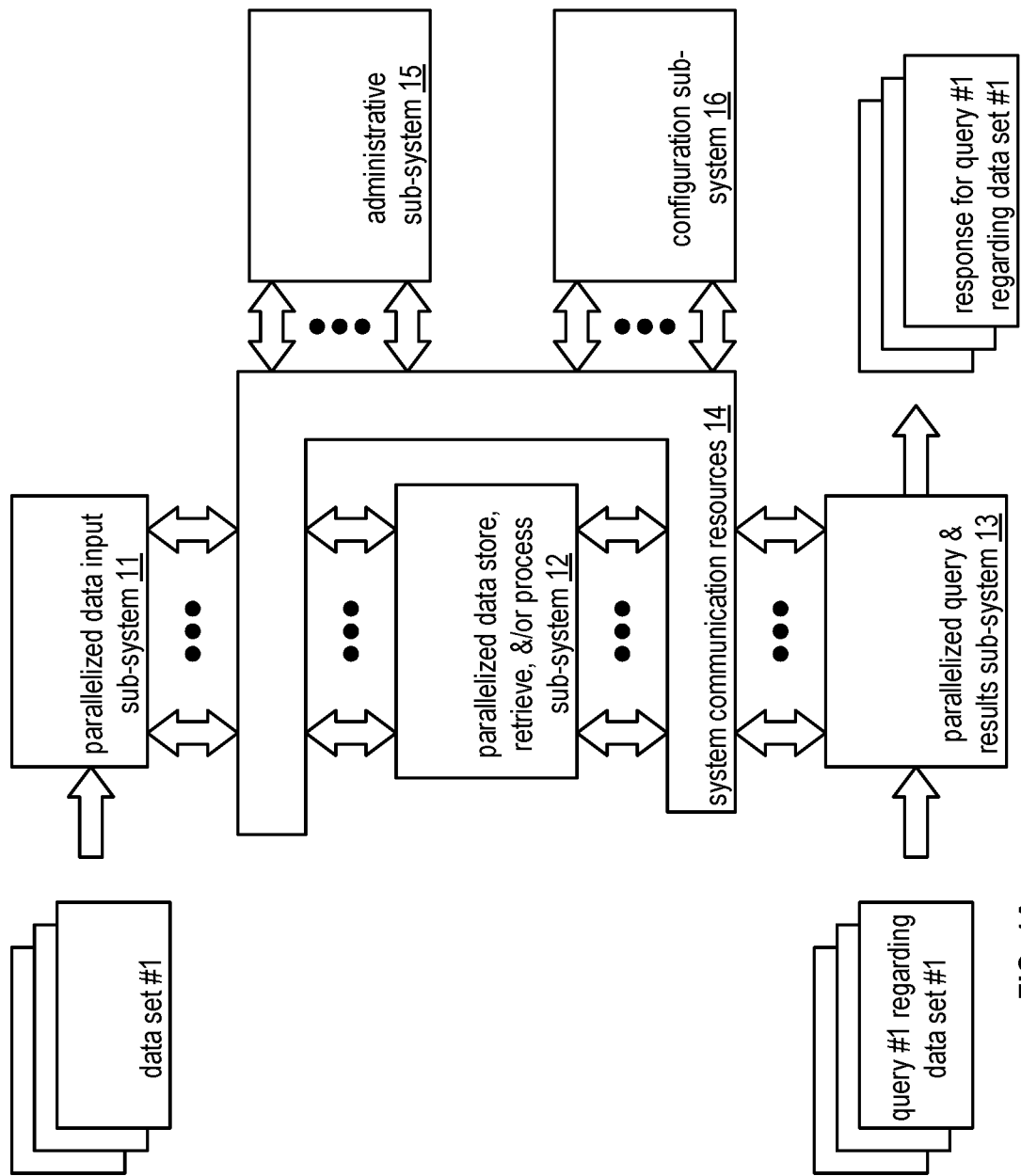
FIG. 1A is a schematic block diagram of an embodiment of a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
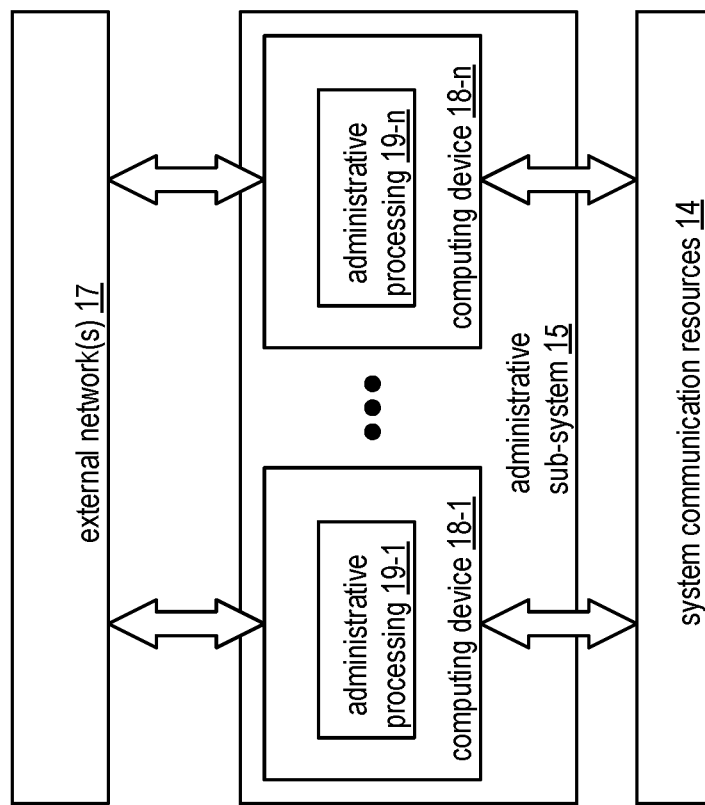
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
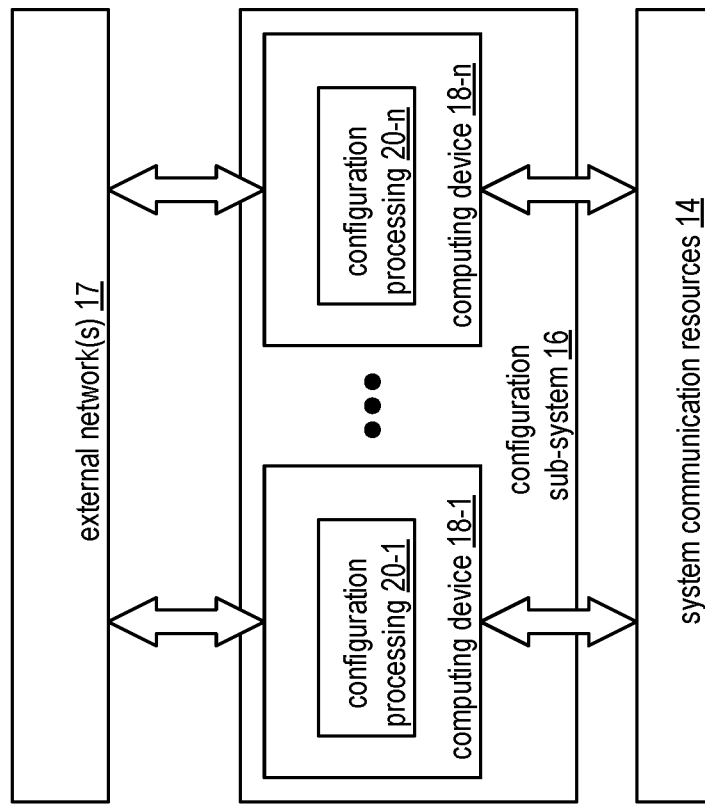
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
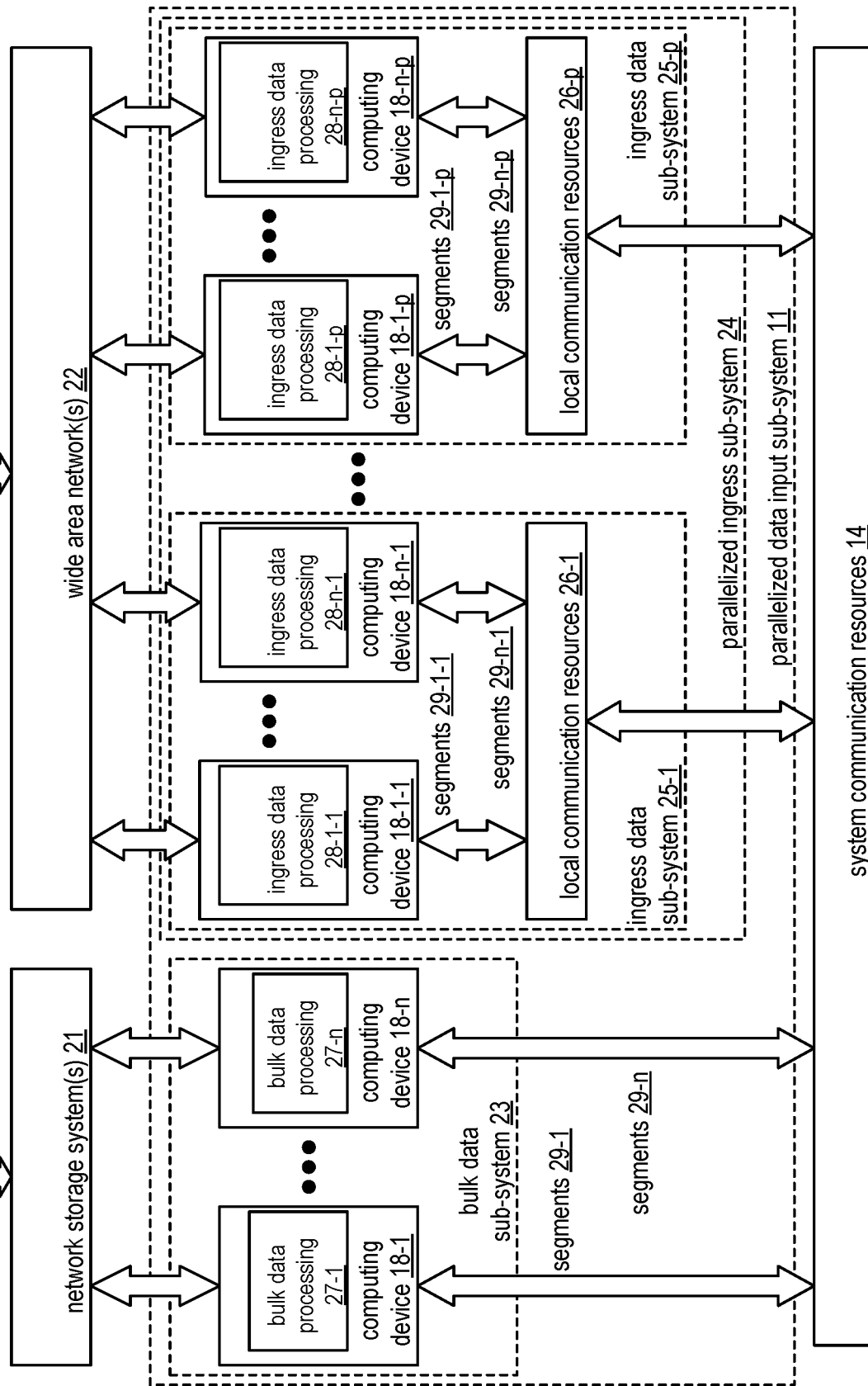
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
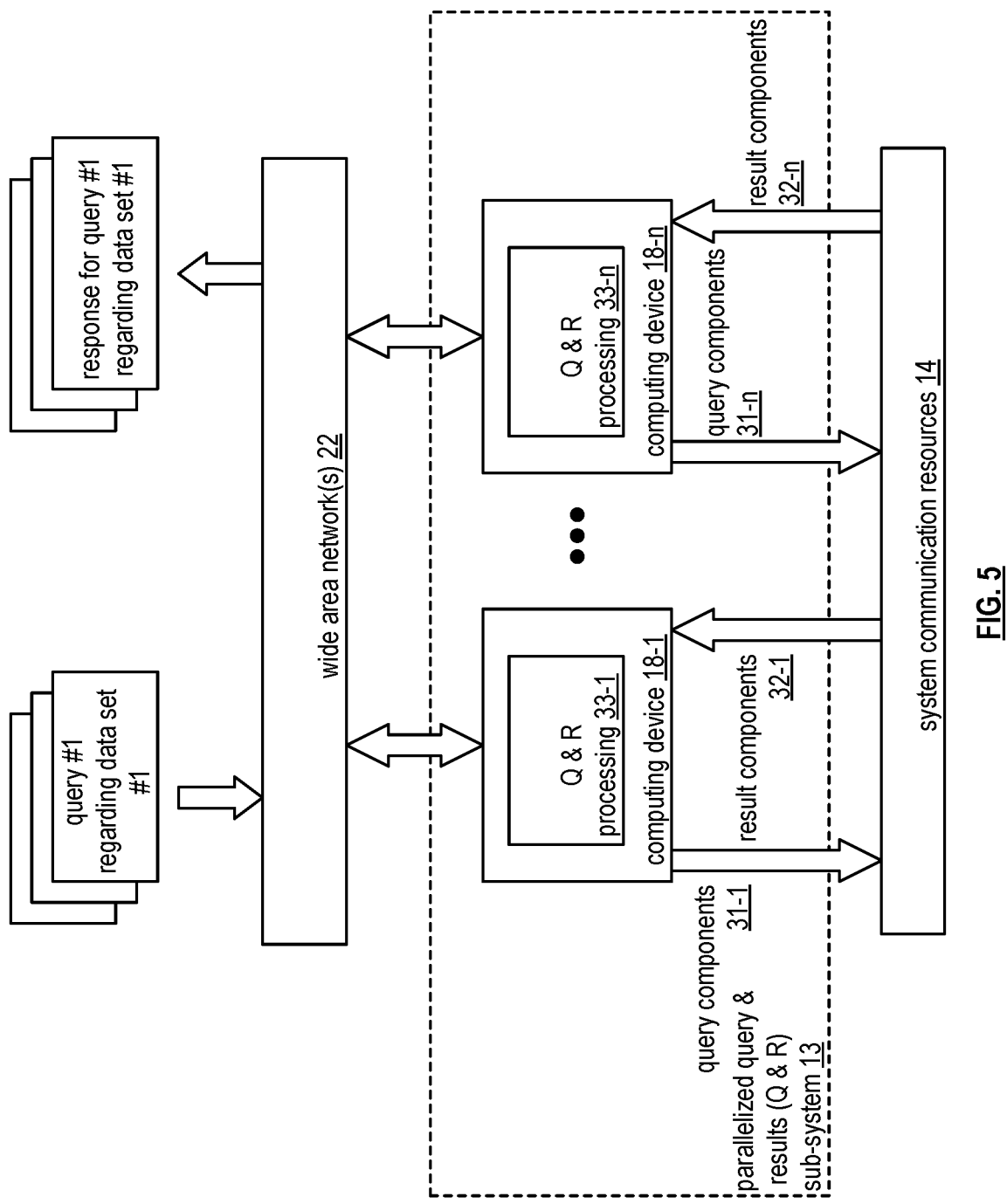
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
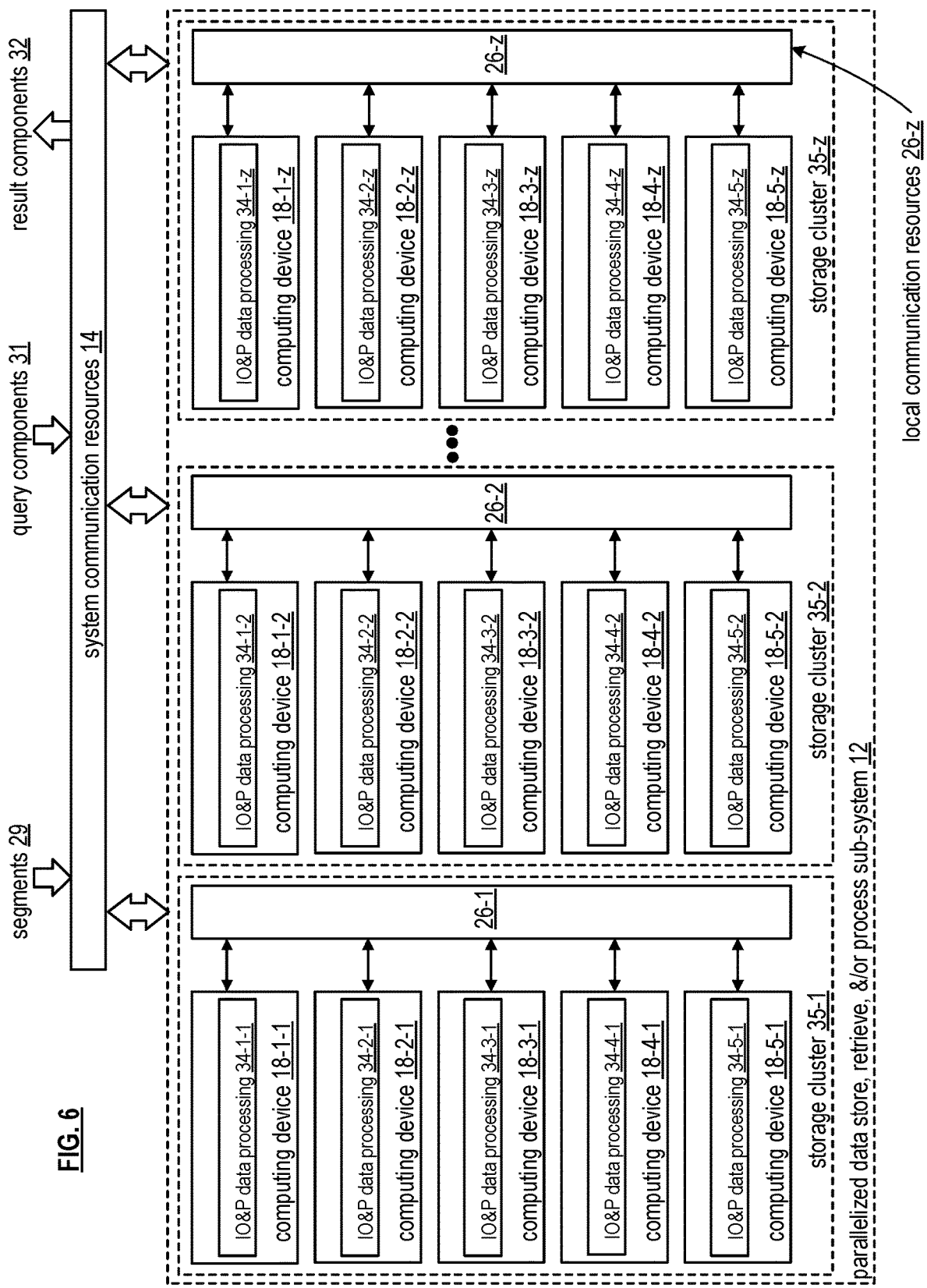
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing GO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
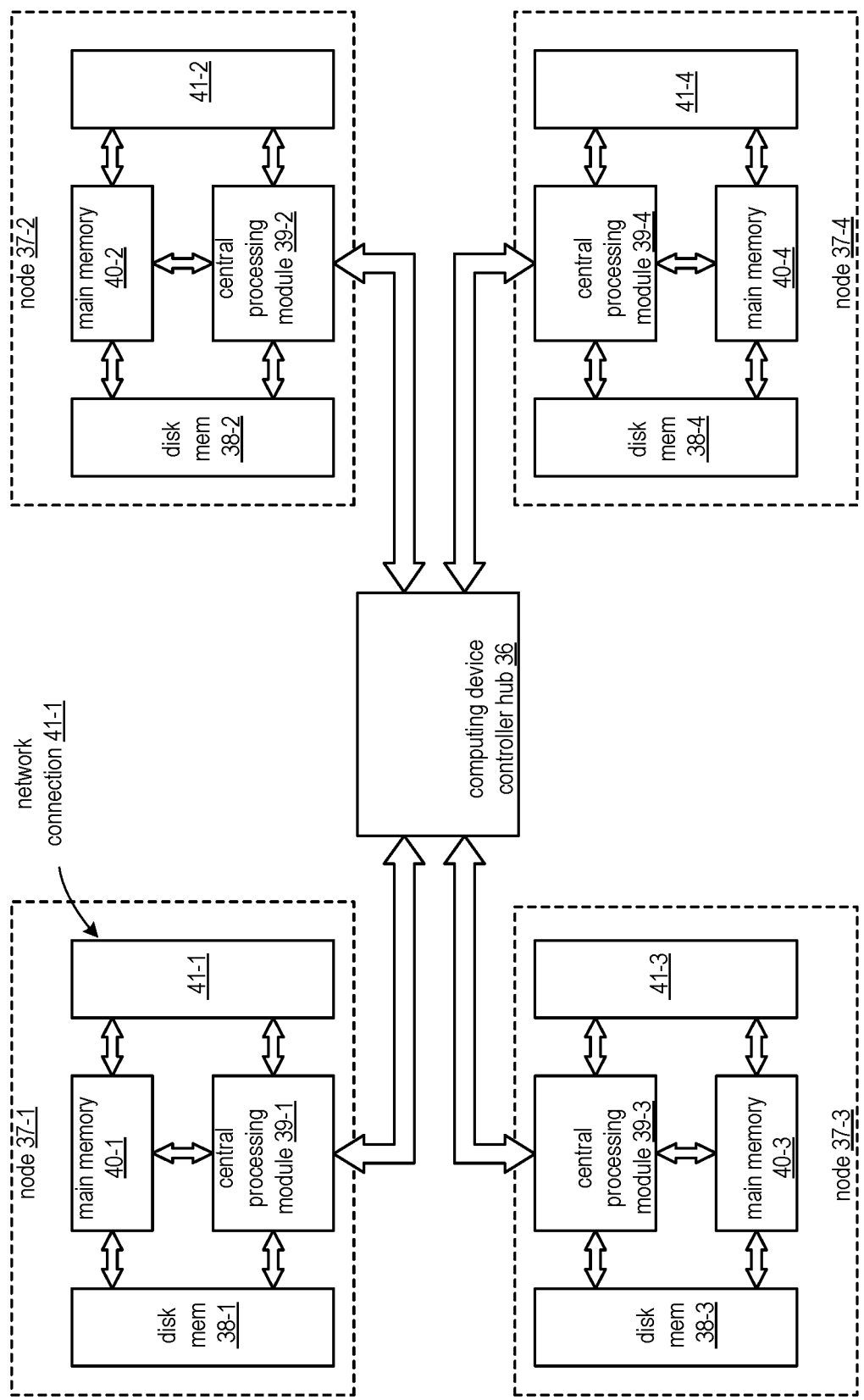
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
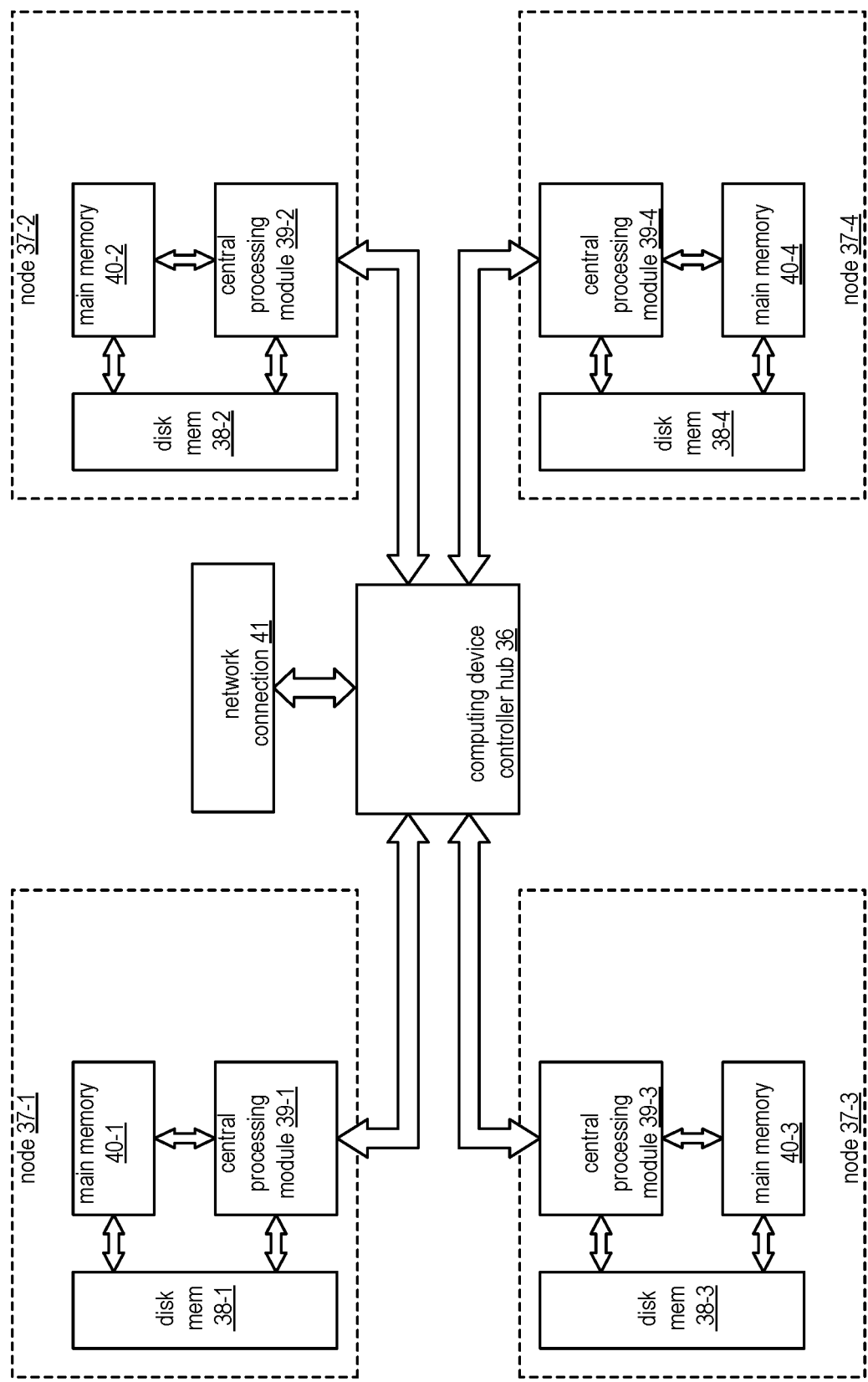
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
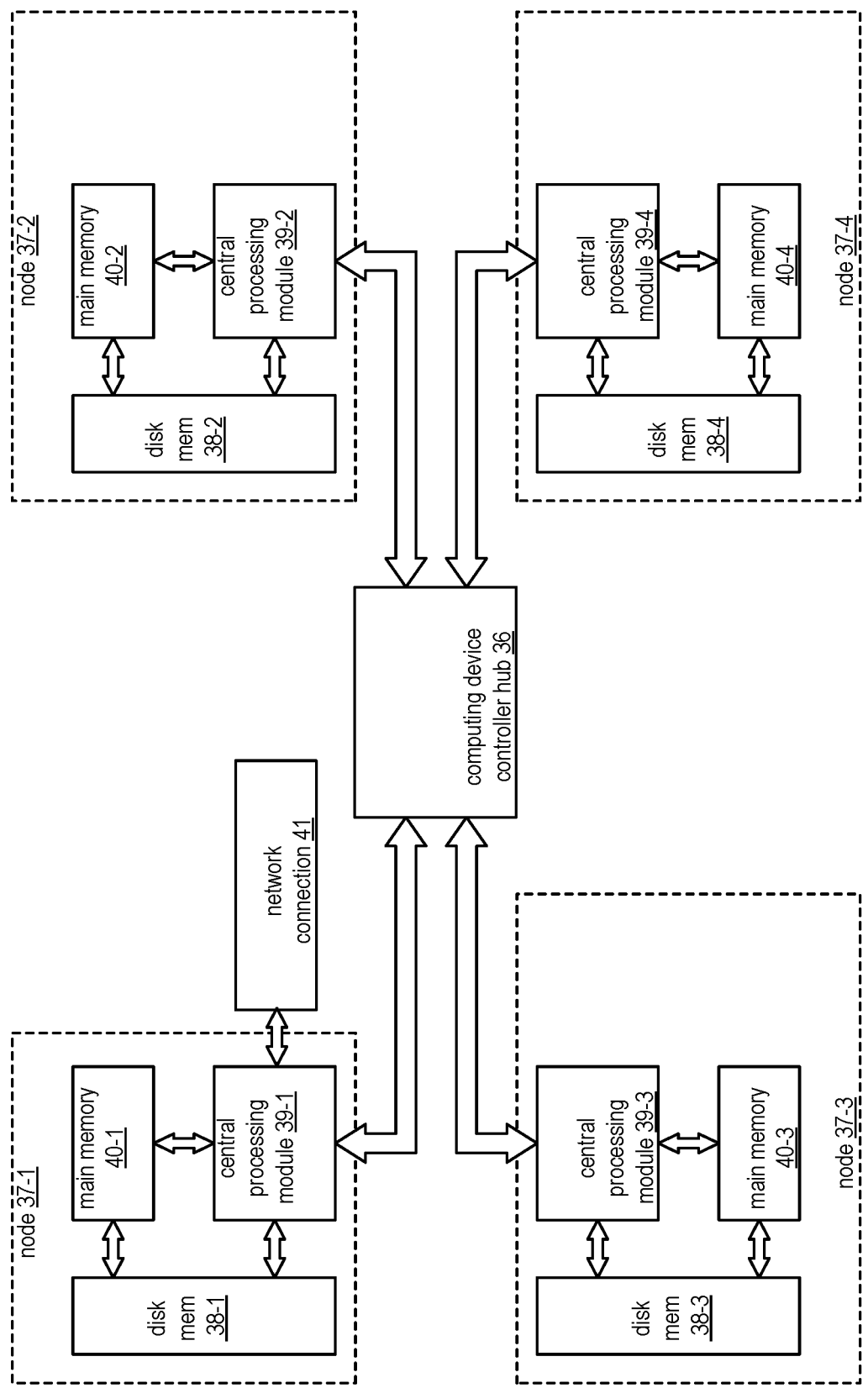
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
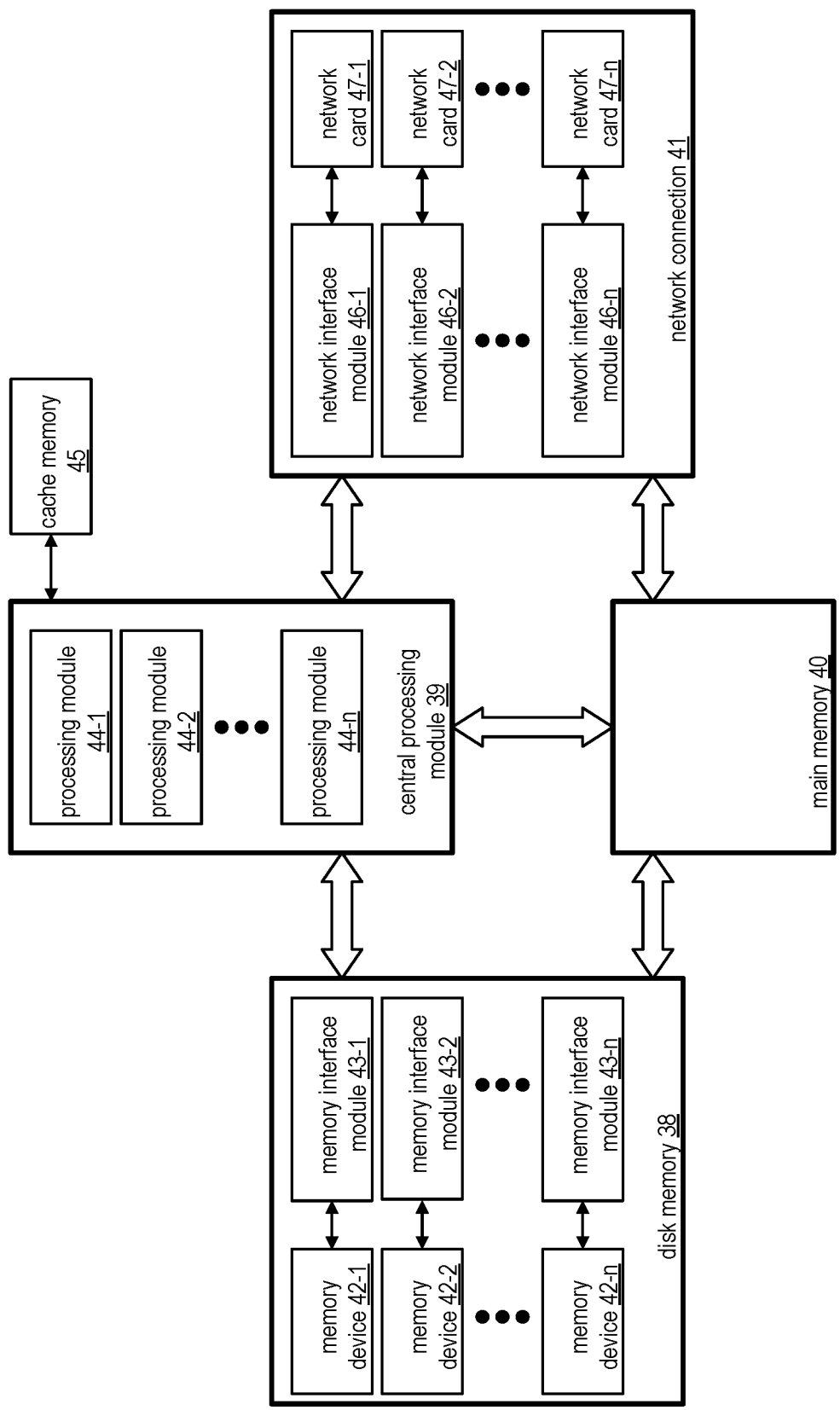
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
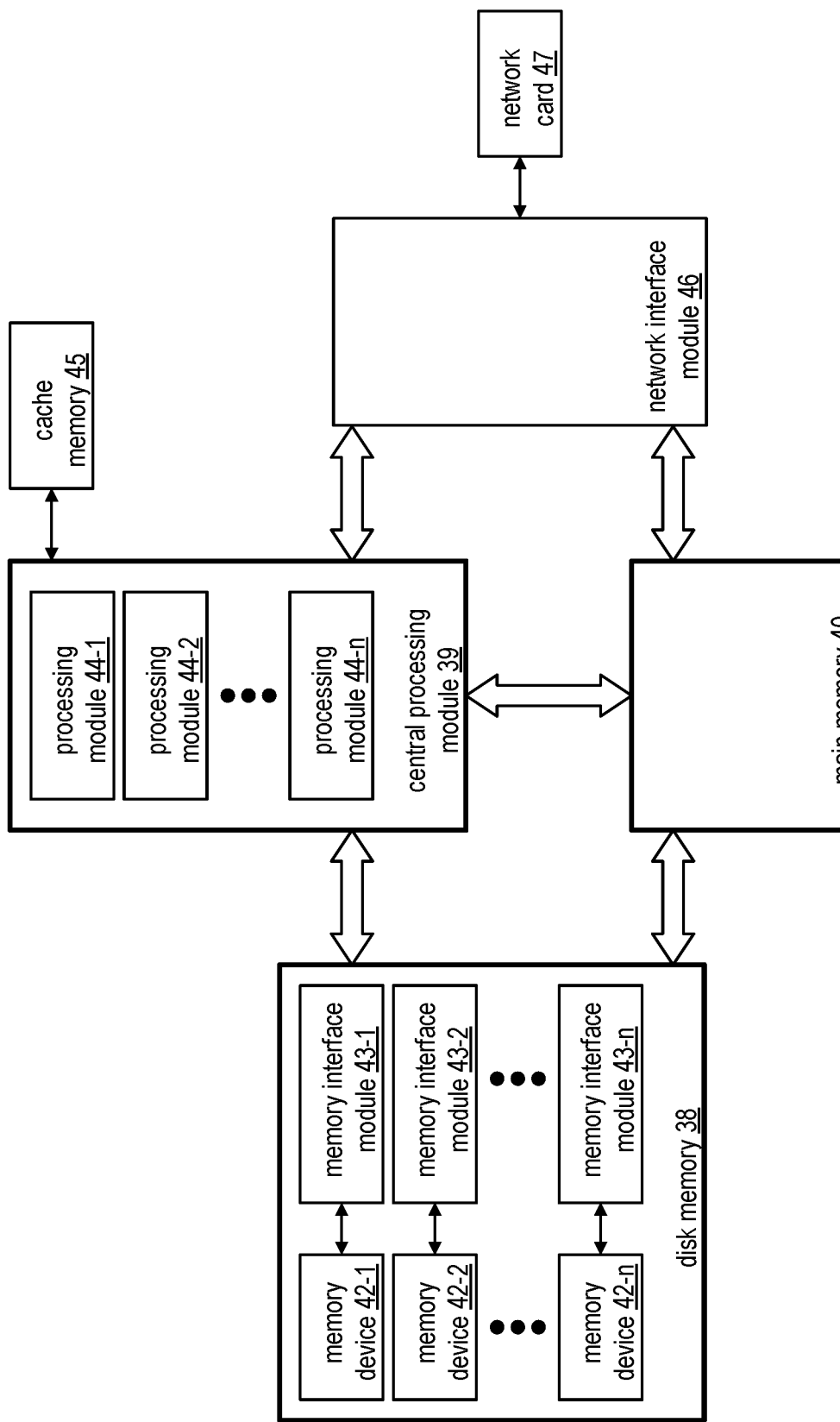
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
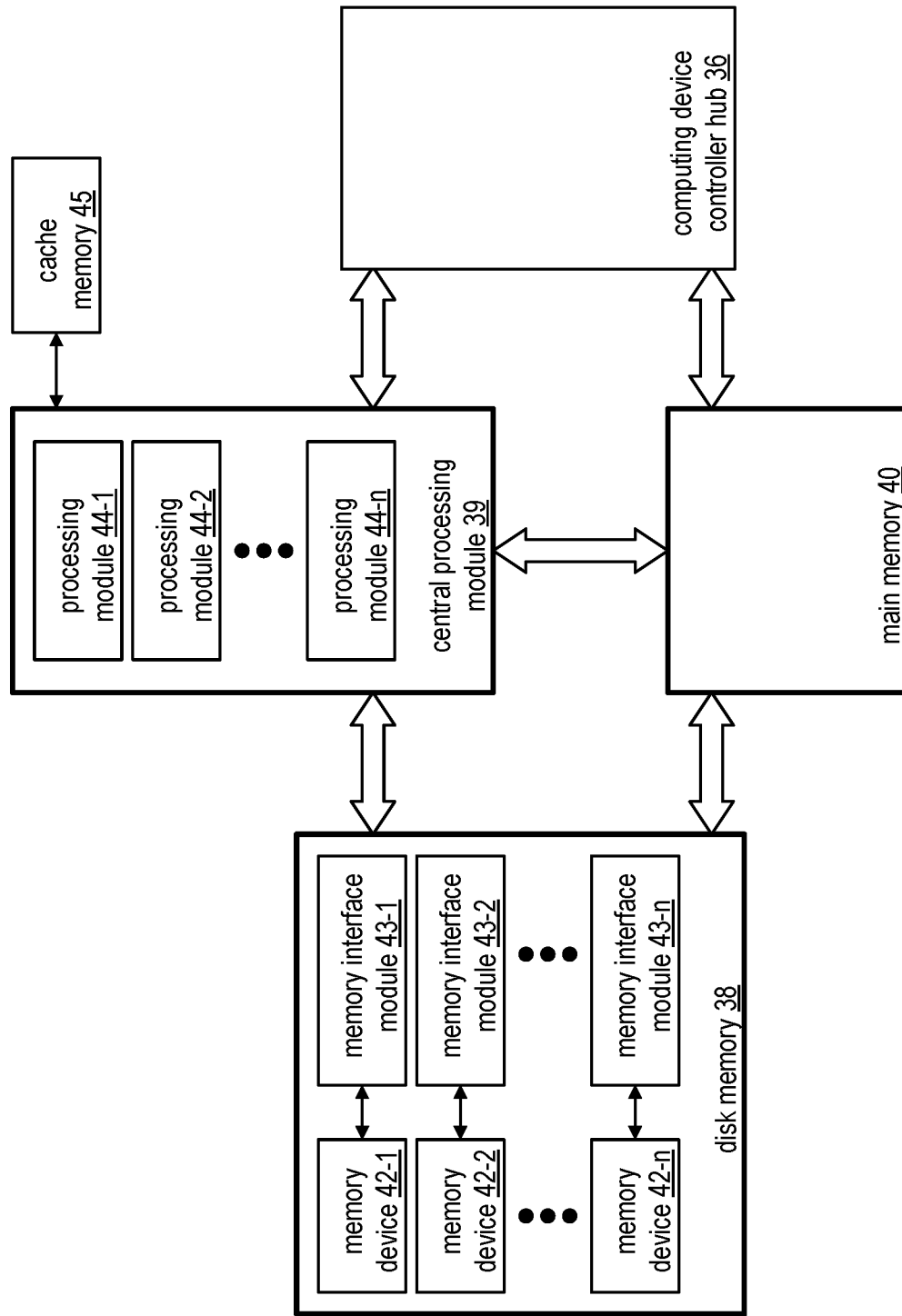
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
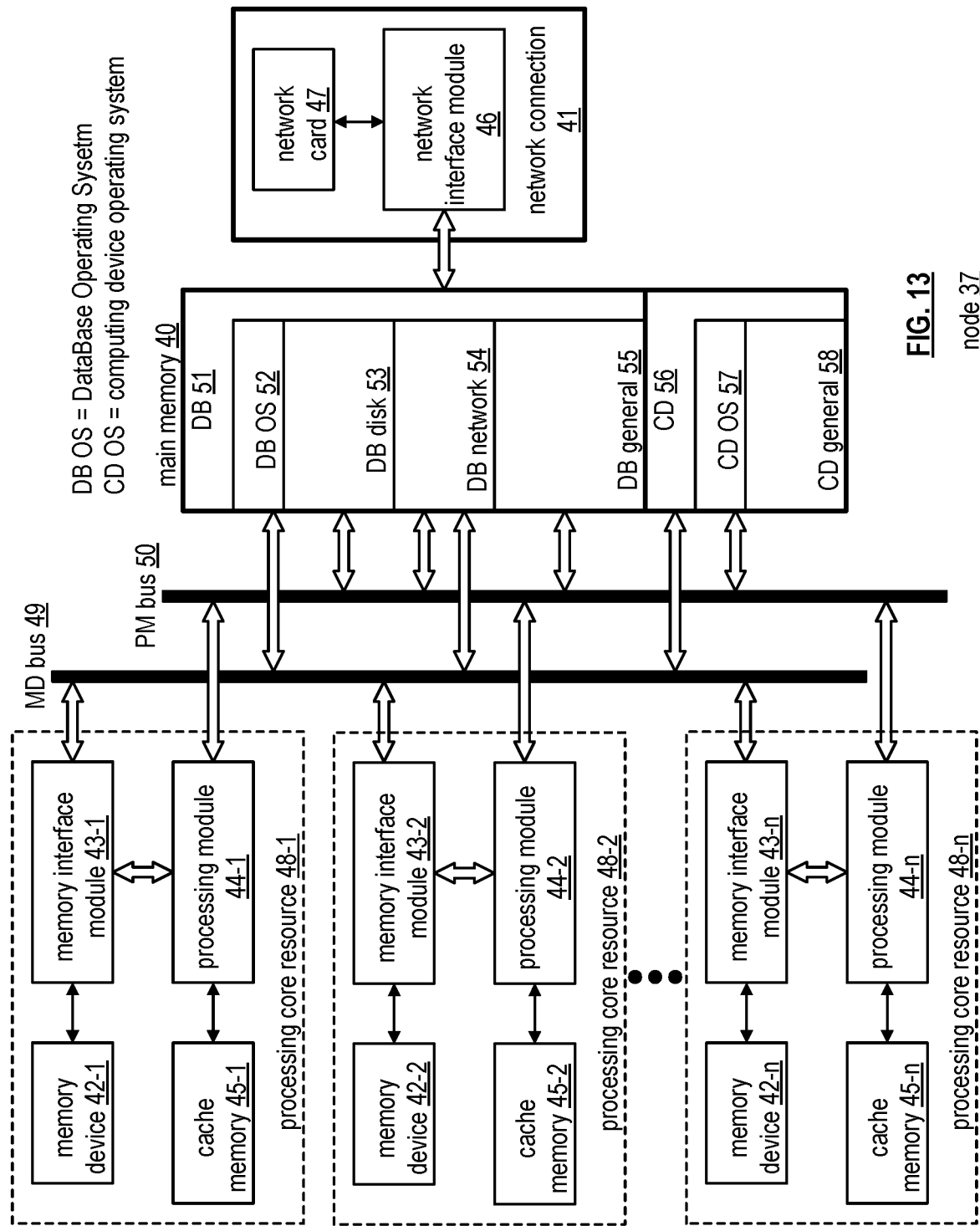
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
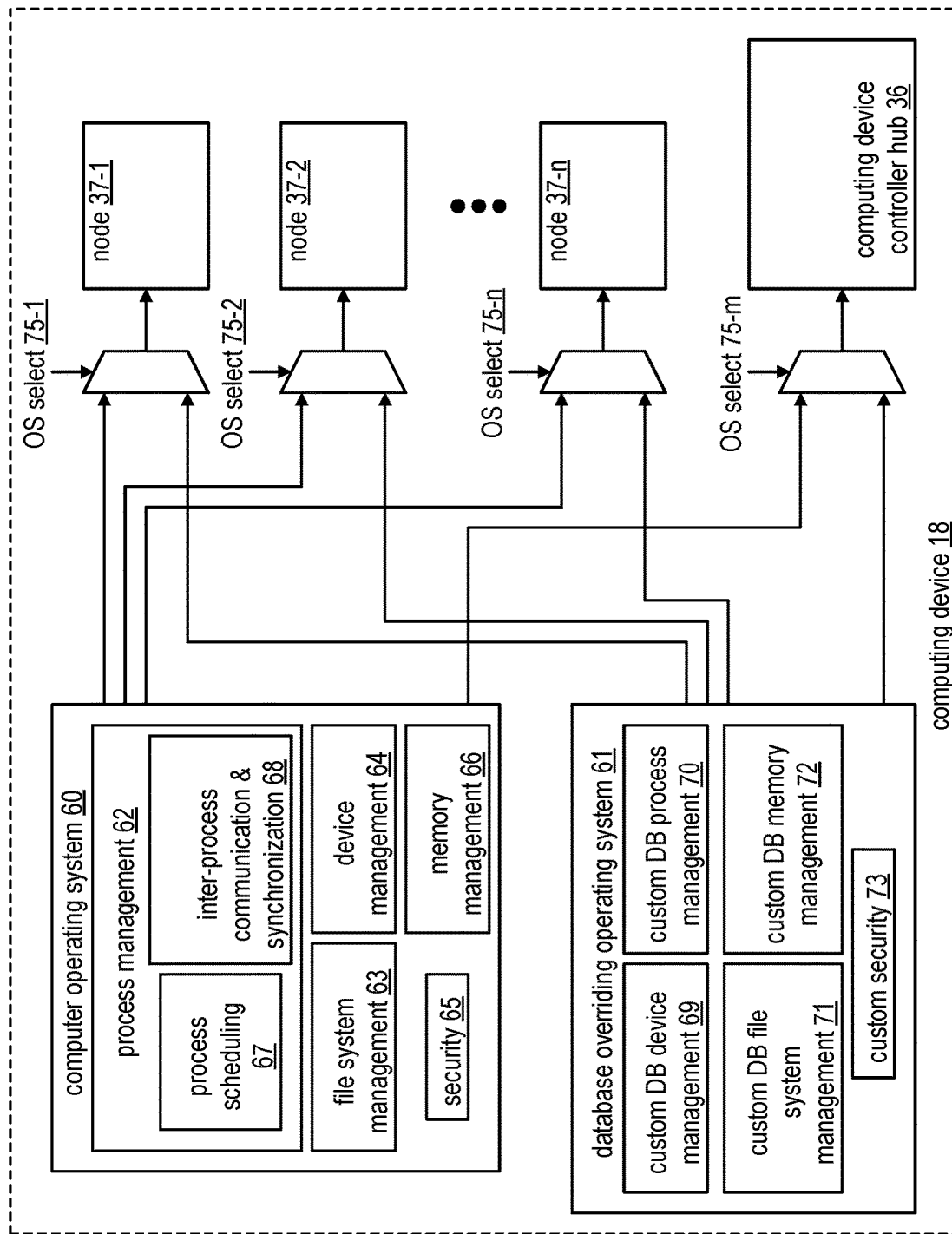
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
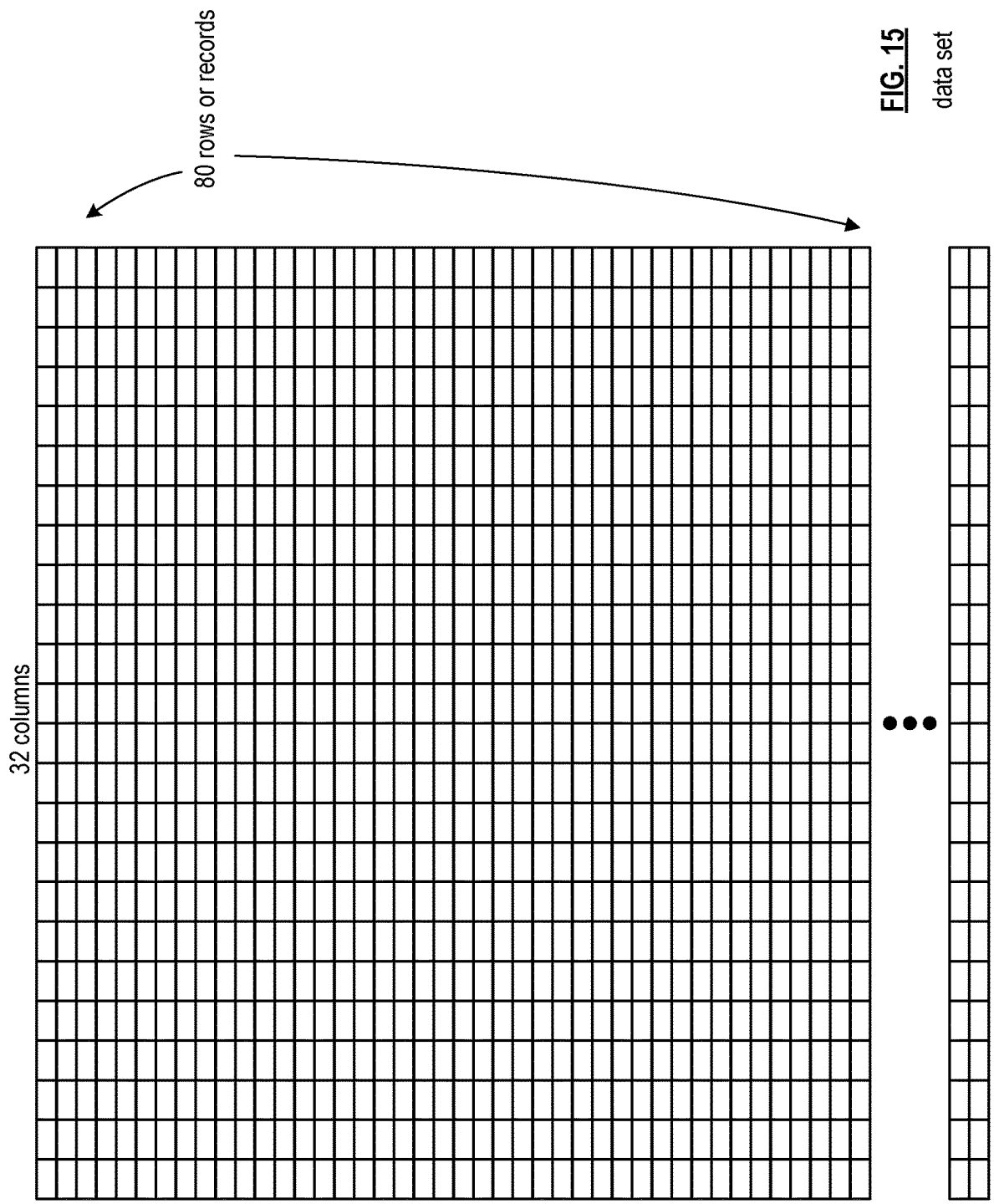

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
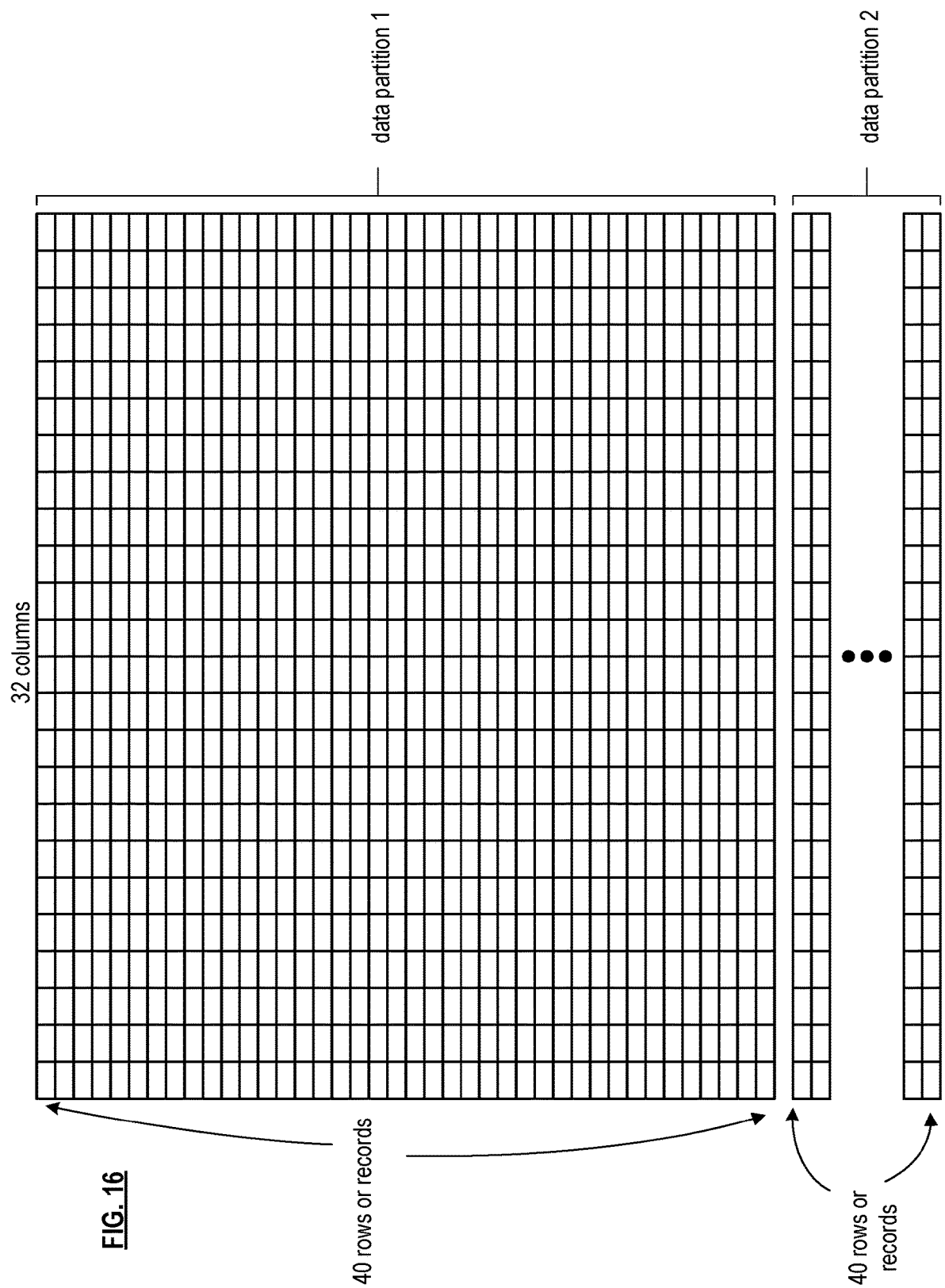

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
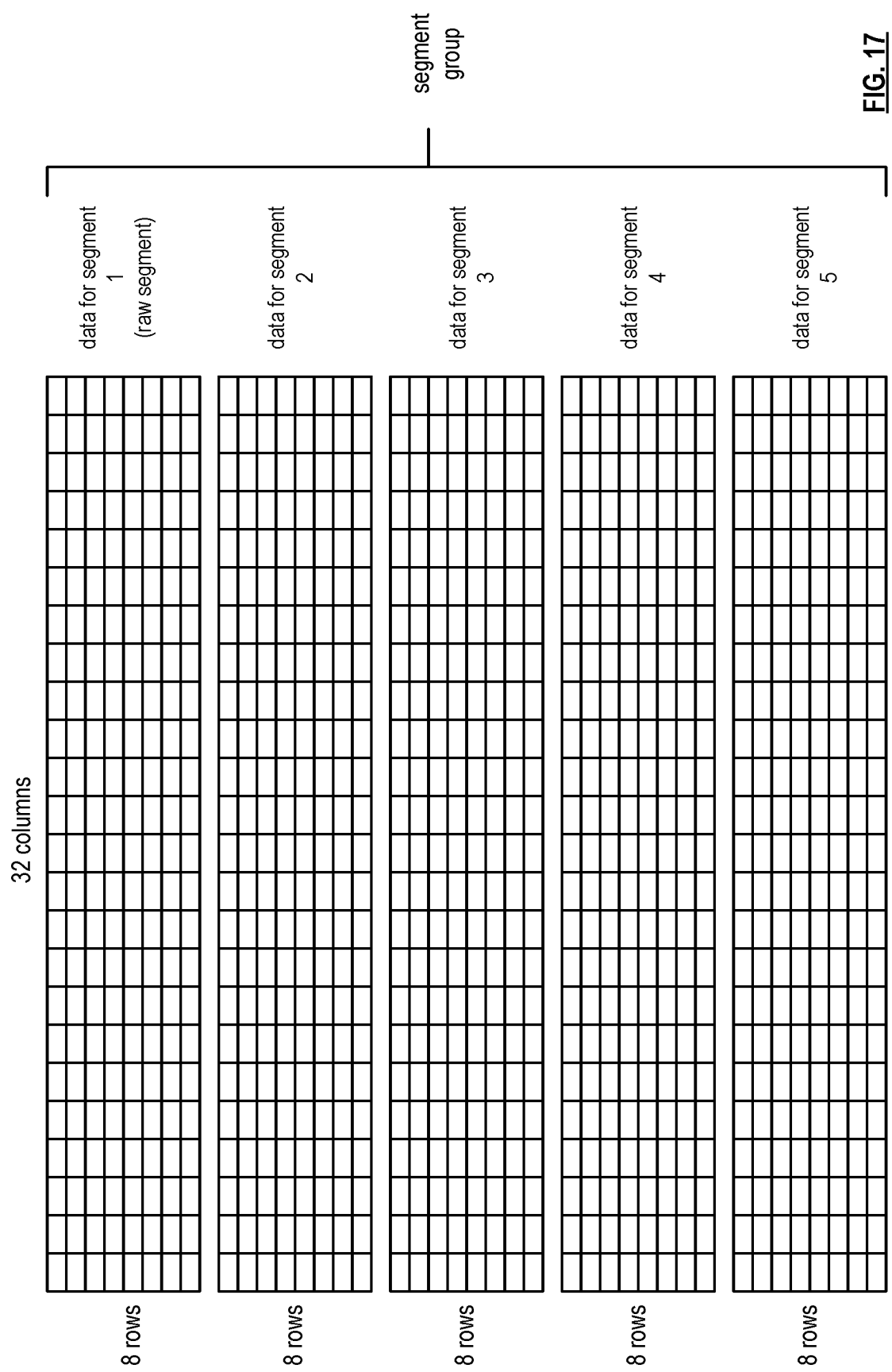

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
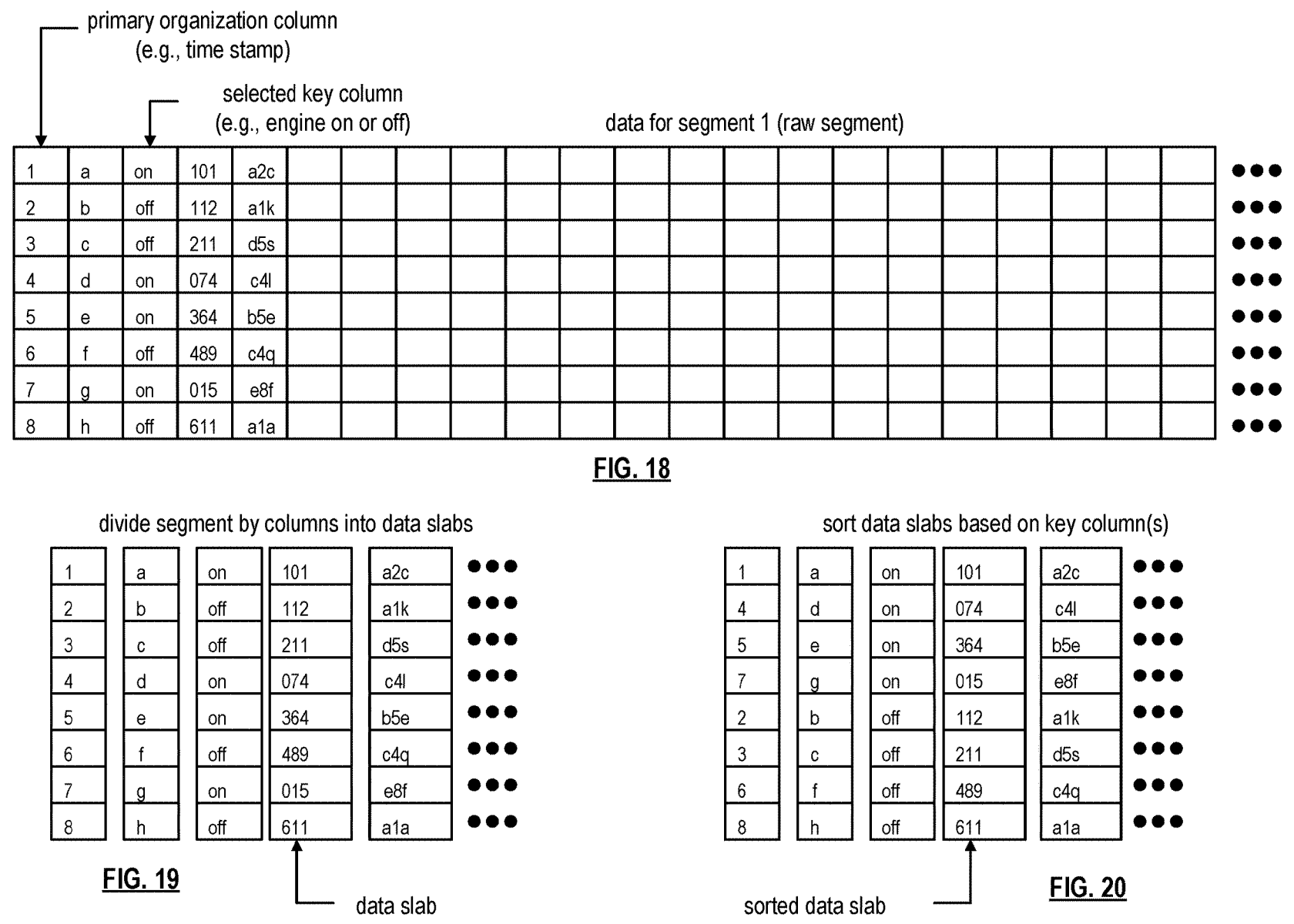

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
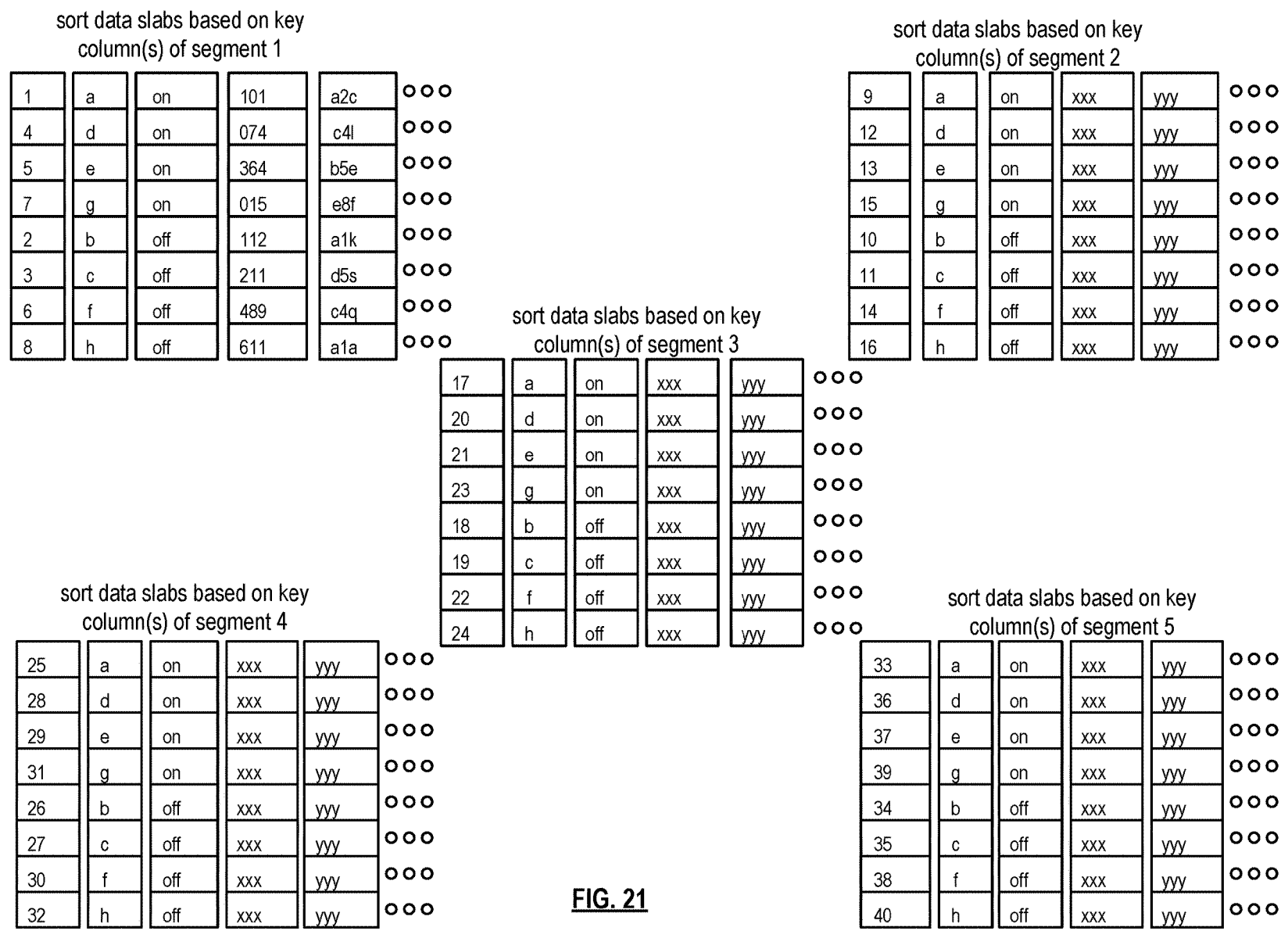

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
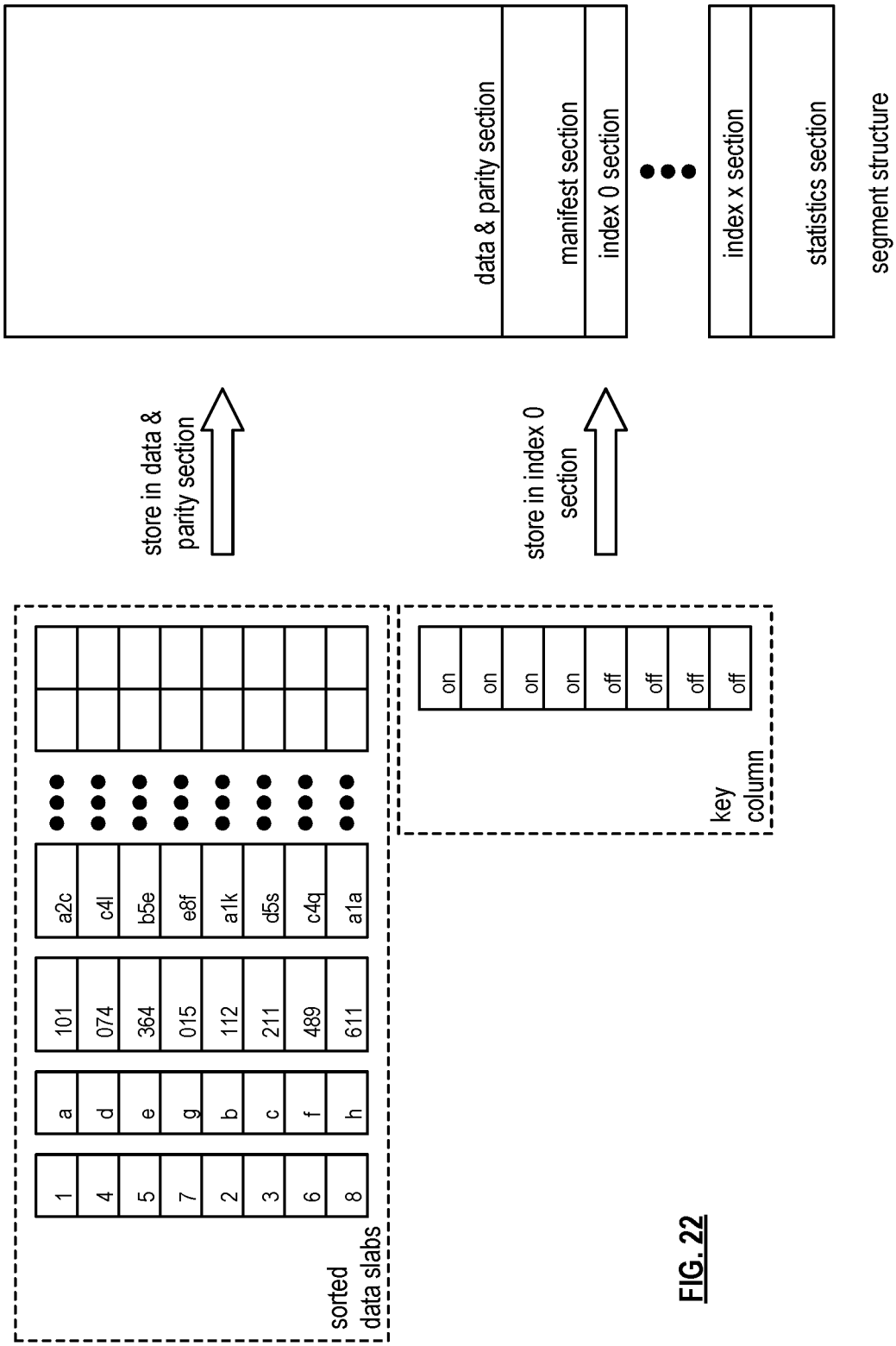

FIG. 22 illustrates an example of a segment structure for a segment of the segment group. The segment structure for a segment includes the data & parity section, a manifest section, one or more index sections, and a statistics section.

The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
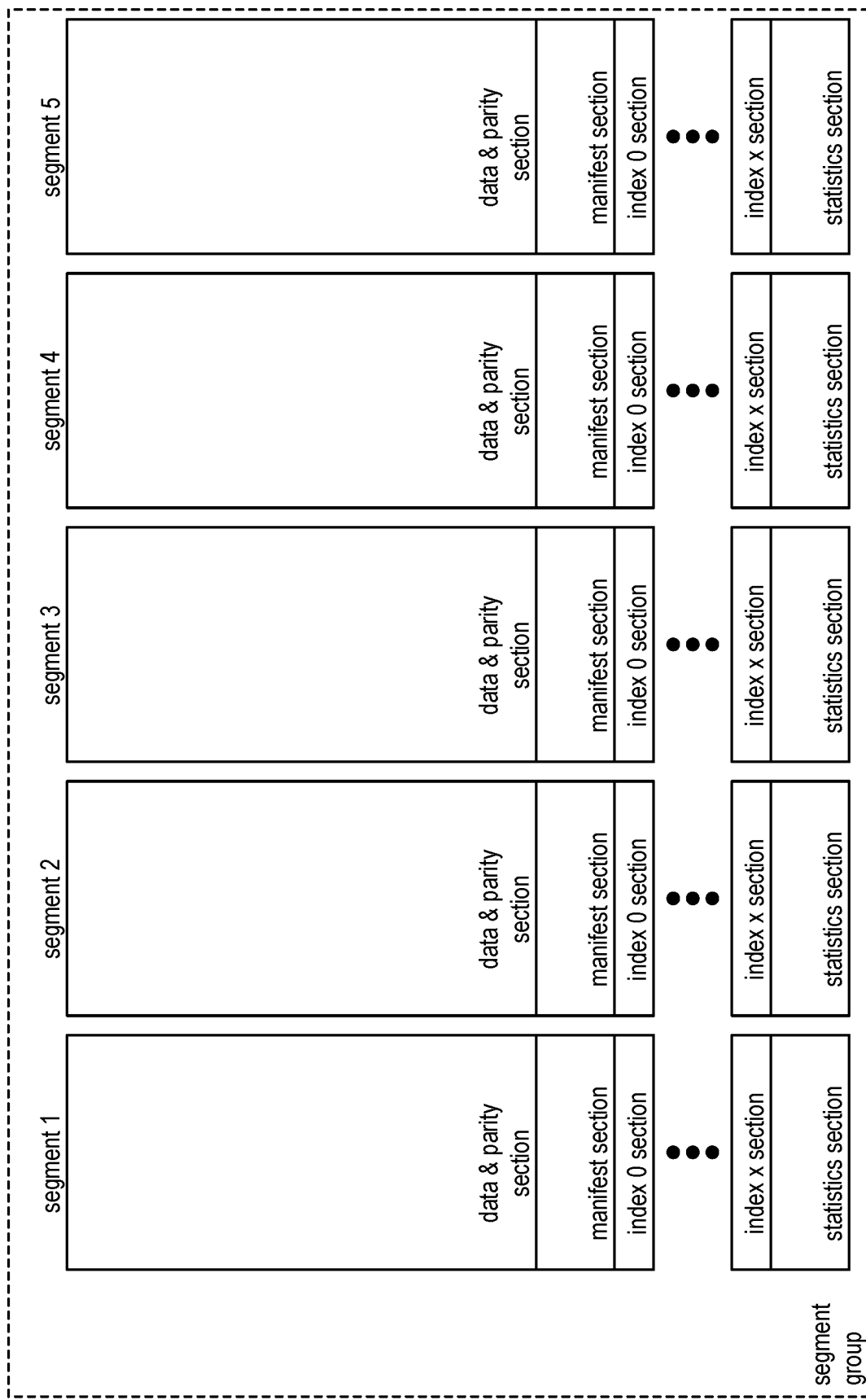

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
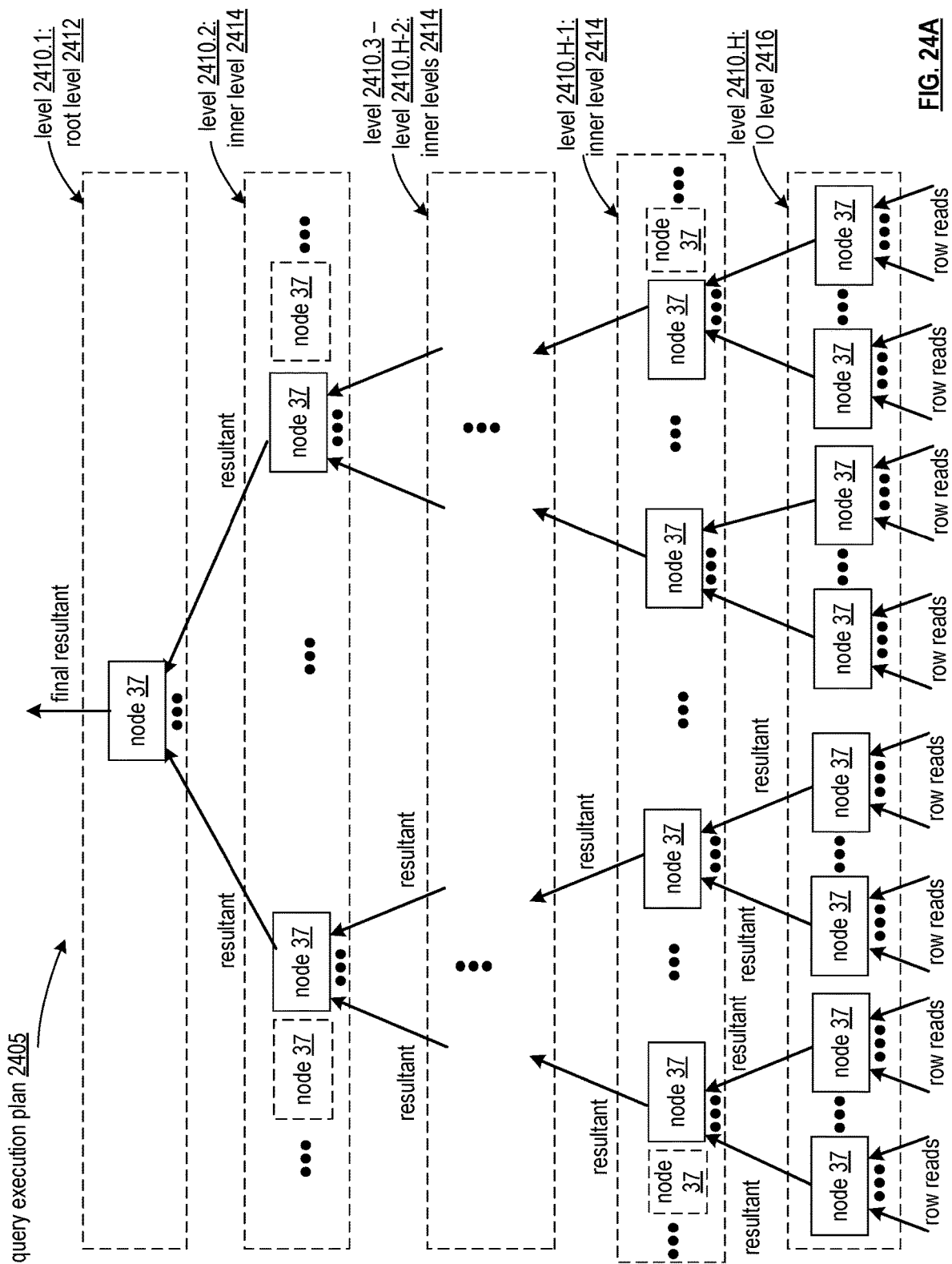
FIG. 24A is a schematic block diagram of a query execution plan implemented via a plurality of nodes in accordance with various embodiments of the present invention.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Execution of queries via a query execution plan 2405 can be ideal as processing of the query is distributed across a plurality of nodes 37 to enable decentralized query execution. At scale, this is ideal as retrieval of large numbers of records required for a query's execution and/or processing of this large number of records via query operators required for a query's execution can be dispersed across many distinct processing modules implemented by the separate nodes 37. This reduces coordination required for query execution, where some nodes 37 do not need to coordinate with and/or do not require knowledge of other nodes 37 of the query execution plan 2405 in performing their respective portion of a query's execution. This also enables queries to be executed upon data stored in separate memories of database system 10, while not requiring all required records to be first centralized prior to query execution, as nodes 37 at IO level 2416 can retrieve records from their own memory and/or from assigned memory devices with which they communicate. This mechanism of maintaining decentralization and/or reducing coordination via implementing a query execution plan 2405 increases query efficiency.

Figure 24B:
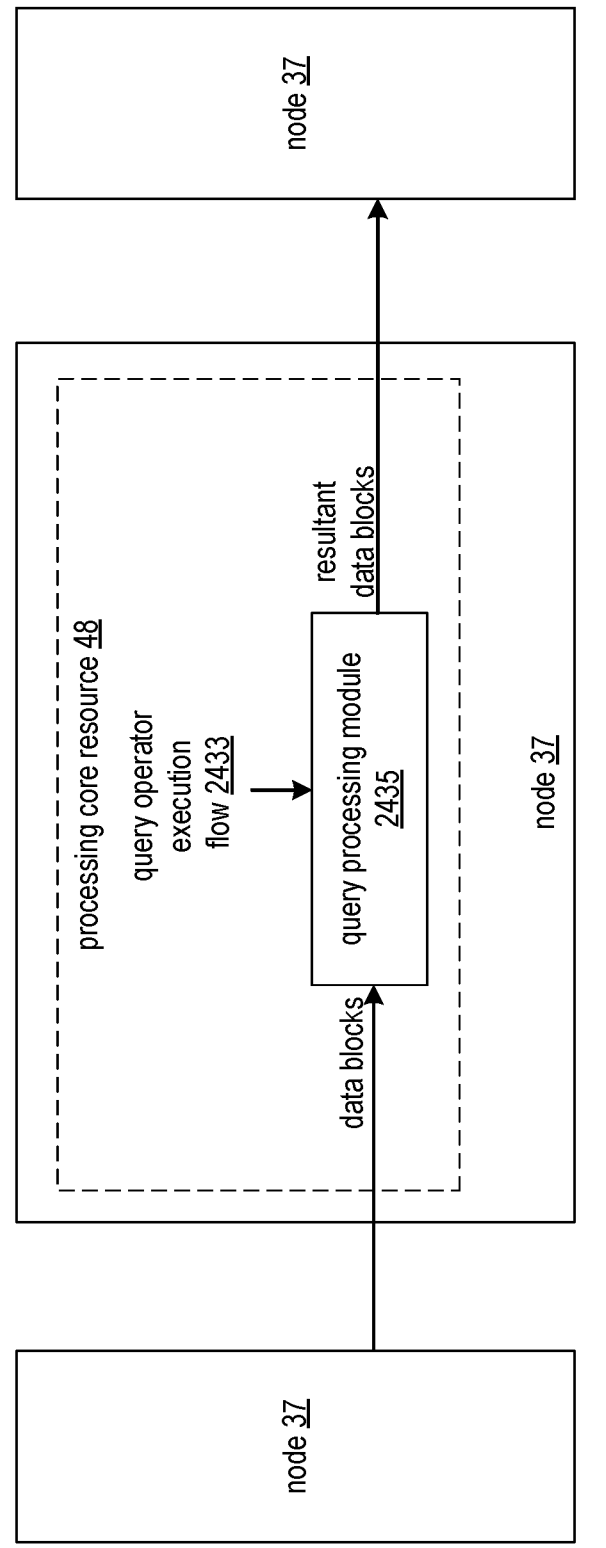
FIGS. 24B-24D are schematic block diagrams of embodiments of a node that implements a query processing module in accordance with various embodiments of the present invention.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figure 24C:
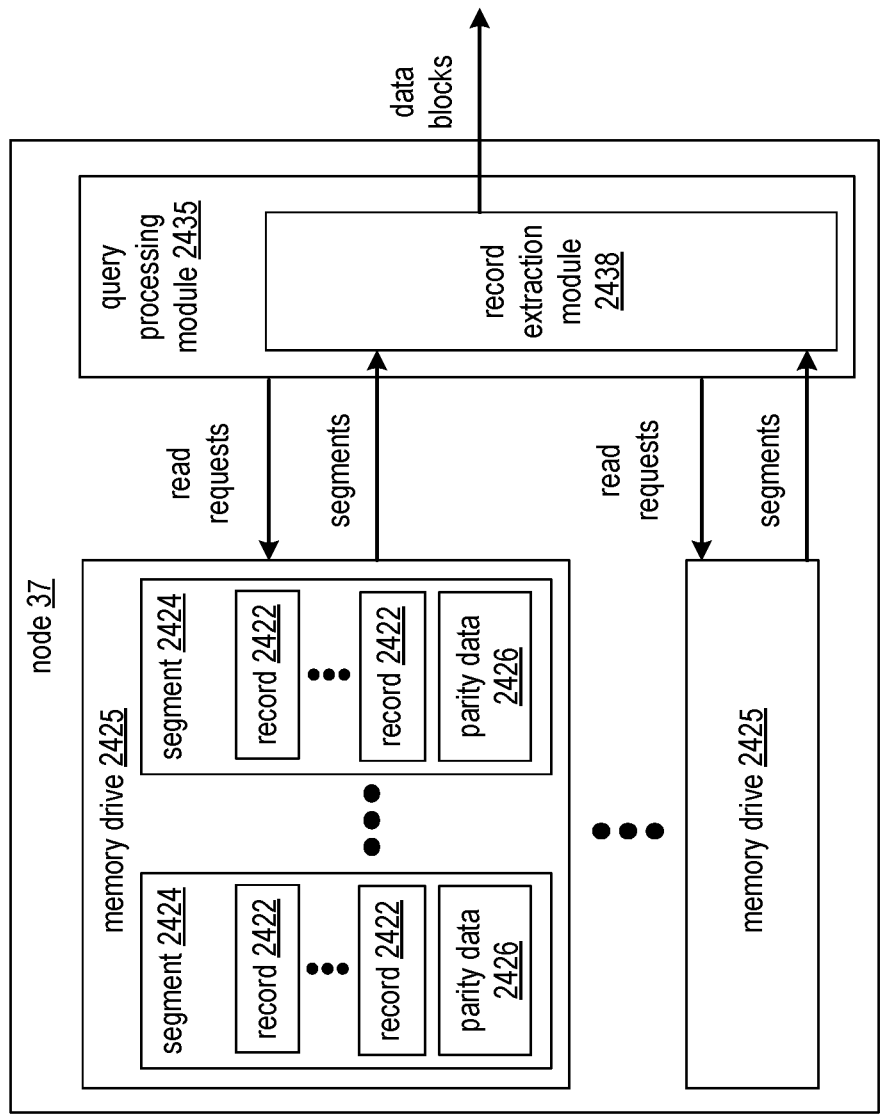

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted record data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24D:
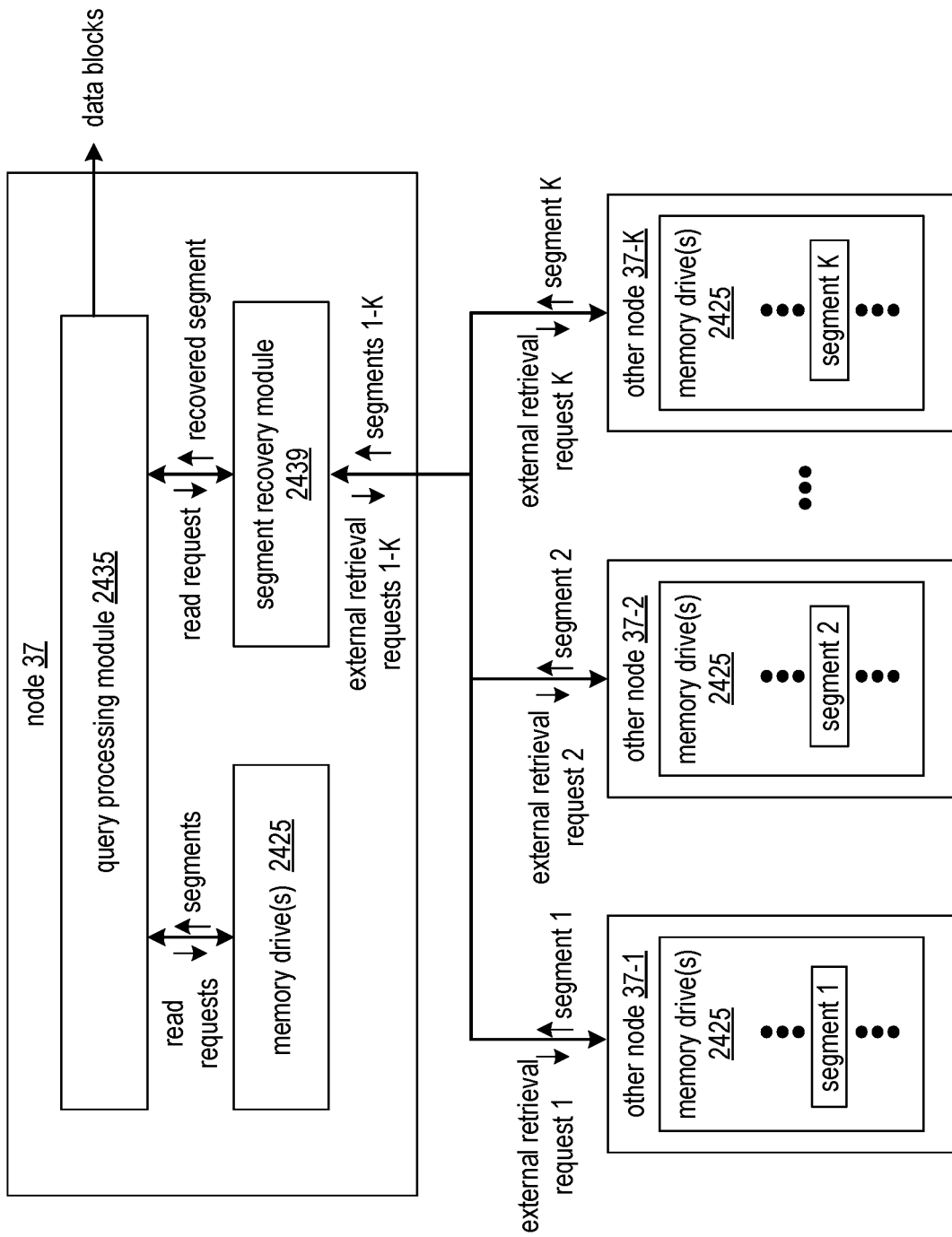

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 25A:
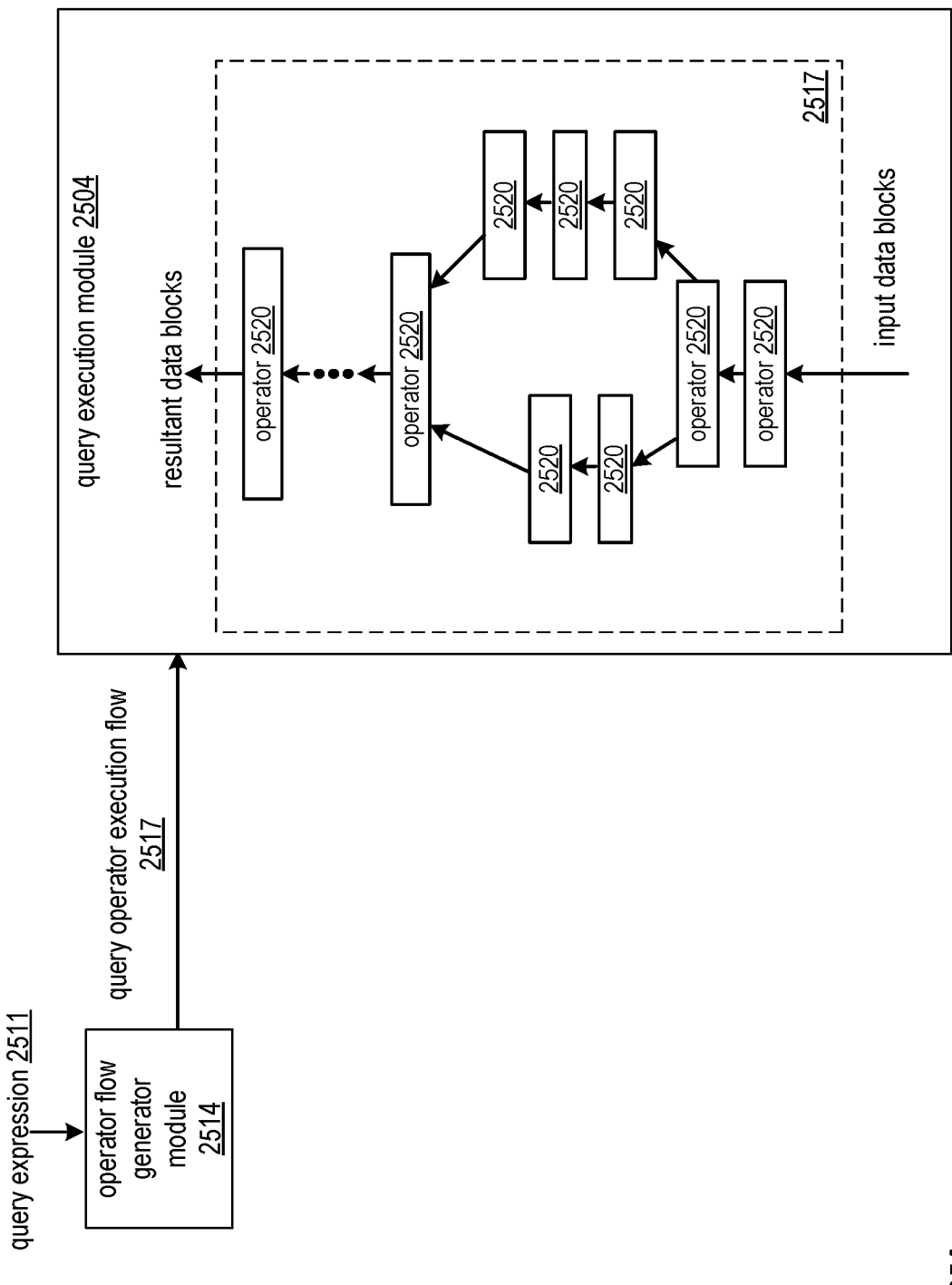
FIG. 25A is a schematic block diagram of a query processing system in accordance with various embodiments of the present invention.

FIG. 25A illustrates an embodiment of a query processing system 2510 that generates a query operator execution flow 2517 from a query expression 2511 for execution via a query execution module 2504. The query processing system 2510 can be implemented utilizing, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14.

As illustrated in FIG. 25A, an operator flow generator module 2514 of the query processing system 2510 can be utilized to generate a query operator execution flow 2517 for the query indicated in a query expression 2511. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2510 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

FIG. 25B presents an example embodiment of a query execution module 2504 that executes query operator execution flow 2517. Some or all features and/or functionality of the query execution module 2504 of FIG. 25B can implement the query execution module 2504 of FIG. 25A and/or any other embodiment of the query execution module 2504 discussed herein. Some or all features and/or functionality of the query execution module 2504 of FIG. 25B can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 25B as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2502 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2544 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2544 in the operator input data set 2522 were outputted by the one or more other operators 2520 that are immediately below the particular operator via one or more corresponding operator executions of one or more previous operator execution steps in the plurality of sequential operator execution steps. Pending data blocks 2544 of an operator input data set 2522 can be ordered, for example as an ordered queue, based on an ordering in which the pending data blocks 2544 are received by the operator input data set 2522. Alternatively, an operator input data set 2522 is implemented as an unordered set of pending data blocks 2544.

If the particular operator 2520 is executed for a given one of the plurality of sequential operator execution steps, some or all of the pending data blocks 2544 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2544 to generate one or more output data blocks, this data block is removed from the operator's operator input data set 2522. In some cases, an operator selected for execution is automatically executed upon all pending data blocks 2544 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 25A, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2544 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2544. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.$i$ this common query operator execution flow 2433 can be sent to the one or more other nodes 37 in a same shuffle node set as input data blocks to be added to the input data set 2522 the next operator 2520.$i$+1, with respect to the serialized ordering of the query of this common query operator execution flow 2433 of the one or more other nodes 37. For example, the output generated via a node's execution of a particular operator 2520.$i$ is added input data set 2522 the next operator 2520.$i$+1 of the same node's query operator execution flow 2433 based on being serially next in the sequential ordering and/or is alternatively or additionally added to the input data set 2522 of the next operator 2520.$i$+1 of the common query operator execution flow 2433 of the one or more other nodes in a same shuffle node set based on being serially next in the sequential ordering.

In some cases, in addition to a particular node sending this output generated via a node's execution of a particular operator 2520.$i$ to one or more other nodes to be input data set 2522 the next operator 2520.$i$+1 in the common query operator execution flow 2433 of the one or more other nodes 37, the particular node also receives output generated via some or all of these one or more other nodes' execution of this particular operator 2520.$i$ in their own query operator execution flow 2433 upon their own corresponding input data set 2522 for this particular operator. The particular node adds this received output of execution of operator 2520.$i$ by the one or more other nodes to the be input data set 2522 of its own next operator 2520.$i$+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.$i$+1 corresponds to and/or is utilized to implement JOIN operator and/or a custom join operator of the query operator execution flow 2517, and where the operator 2520.$i$+1 thus utilizes input received from many different nodes in the shuffle node set in accordance with their performing of all of the operators serially before operator 2520.$i$+1 to generate the input to operator 2520.$i$+1.

FIG. 25D illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 25A. This query operator execution flow 2433 utilized by the multiple nodes can be the full query operator execution flow 2517 generated by the operator flow generator module 2514 of FIG. 25A. This query operator execution flow 2433 can alternatively include a sequential proper subset of operators from the query operator execution flow 2517 generated by the operator flow generator module 2514 of FIG. 25A, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 25B. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 25B, where the operators 2520 of the query operator execution flow 2433 are implemented as operators 2520 of FIG. 25B. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

FIGS. 26A-26G present embodiments of a query processing system 2510 that executes query expressions by delaying exceptions. Some or all features and/or functionality of the query processing system 2510 of FIGS. 26A-26G can be utilized to implement the query processing system 2510 of FIG. 25A and/or any other embodiment of the query processing system 2510 discussed herein.

Consider a query expression indicating an expression evaluation be performed upon only output of one or more filtering operators. When optimizing a corresponding operator execution flow of a query plan to execute this query expression, it may be ideal in to push this expression down before these filtering operators for performance prior to performance of these filtering operators, for example to optimize and/or improve processing, resource utilization, and/or execution time in executing of the query expression. In this case, the expression evaluation is then performed upon more rows than it should due to being performed prior to filtering out rows. If the expression evaluation can result in an exception being thrown these exceptions could be thrown for rows that would have been filtered out if these steps were performed in the original order denoted by the query expression. To ensure the query expression is executed correctly, its execution should query should only fail if exceptions are thrown for rows that would not be filtered out by the filtering operators, and should continue if exceptions are thrown only for rows that would have been filtered out by the filtering operators.

Enabling this delay in exception throwing improves the technology of database systems by allowing expressions to be evaluated before corresponding filtering while not changing the query result. Enabling this functionality introduces a broader range of possible operator execution flows that can be utilized to execute queries, enabling an optimizer of an operator flow generator module to better select an operator execution flow that renders the optimal query performance from a broader set of options. In particular, enabling selection and execution of an operator execution flow by pushing expressions down for evaluation before corresponding filtering operators improves the technology of database systems by significantly improving query runtime, while still adhering to the original query expression.

Figure 26A:
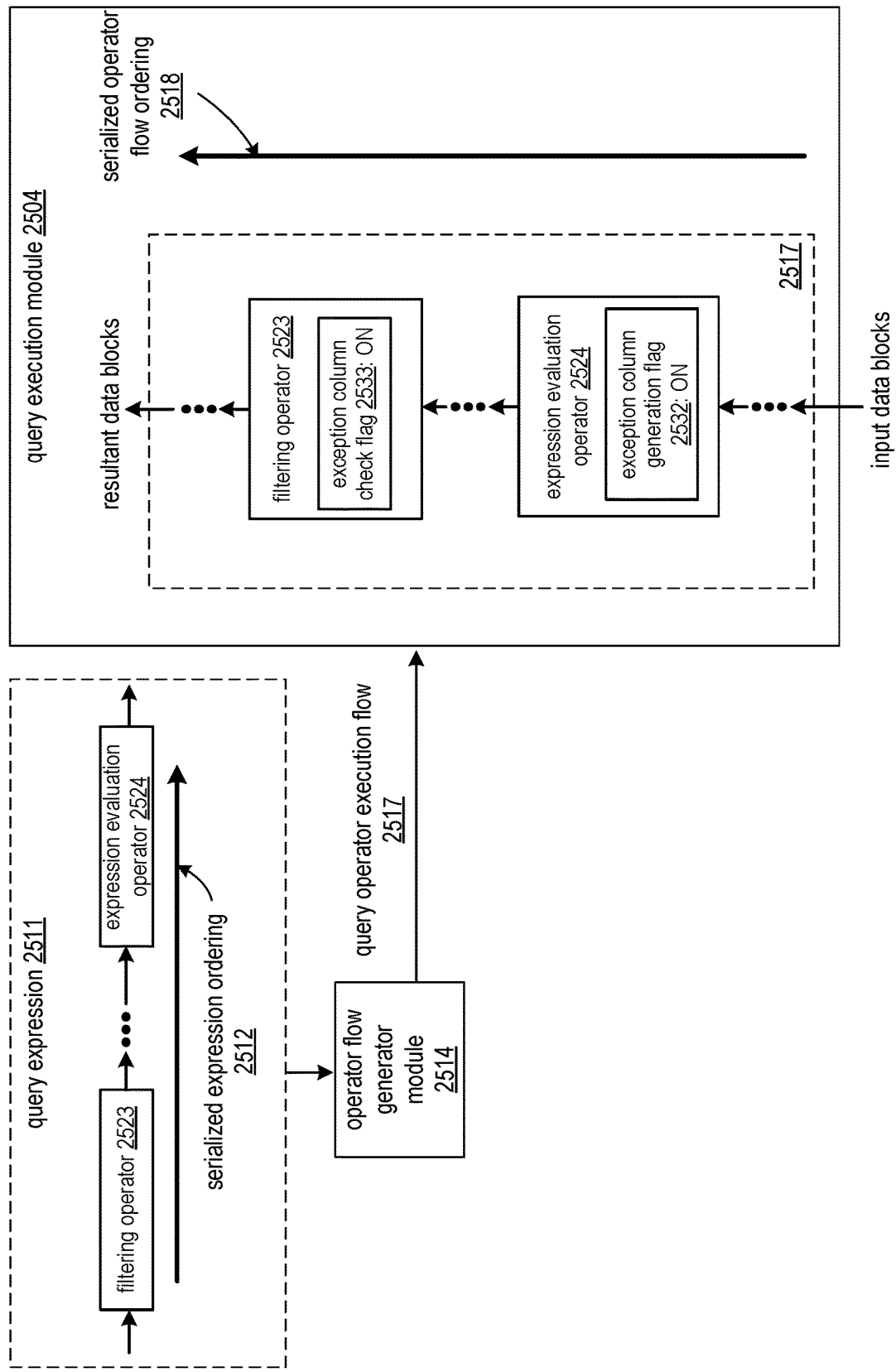
FIG. 26A is a schematic block diagram of a query processing system in accordance with various embodiments of the present invention.

FIG. 26A presents an embodiments of a query processing module that enables queries to be executed in this fashion. The operator flow generator module 2517 can be operable to generate query operator execution flows 2517 for incoming query expression 2511 as discussed in conjunction with FIG. 25A.

The query expression 2511 can indicate a plurality of operations be performed in accordance with a serialized expression ordering 2512. For example, as illustrated in FIG. 26A, the serialized expression ordering 2512 of the query expression 2511 can indicate that a particular expression evaluation operator 2524 be performed upon output of a filtering operator 2523, where the expression evaluation operator 2524 is thus only performed upon rows that satisfy filtering parameters of the filtering operator 2523. The query expression can be written as a SQL query expression and/or a query expression written in accordance with a different query and/or programming language.

The filtering operator 2523 can be implemented as a join operator, limit operator, offset operator, select operator, set operator, and/or any other operator that can filters out rows from given set of rows based on filtering parameters to output a subset of the set of rows. The expression evaluation operator 2524 can correspond to a mathematical expression, a Boolean expression, and/or any other expression that can be performed upon individual rows. The expression evaluation operator 2524 can optionally be implemented as any scalar query operator. Alternatively or in addition, the expression evaluation operator 2524 can be implemented as a type of operator that generates one or more output columns for a set of rows by computing a value for each given row in the set of rows as a function of other column values of the given row. The expression evaluation operator 2524 can correspond to an operator that can induce errors and/or cause exceptions to be thrown during its execution upon one or more rows, such as an expression that includes dividing by a value determined for each row that can cause exception being thrown due to the expression attempting to divide by zero for a given row.

The operator flow generator module 2517 can optionally generate a query operator execution flows 2517 by pushing down an expression evaluation operator 2524 of the query expression before one or more filtering operators 2523 of the query expression, for example, based on determining the ordering of the resulting query operator execution flow 2517 is optimal and/or has more favorable processing, resource utilization, and/or execution time than an alternative ordering of the resulting query operator execution flow 2517 where the expression evaluation operator 2524 indicated for performance after one or more filtering operators 2523 of the query expression. As illustrated in FIG. 26A, the serialized operator flow ordering 2518 can thus result in the expression evaluation operator 2524 being performed before the filtering operator 2523, despite the query expression indicating the expression evaluation operator 2524 being performed upon output of the filtering operator 2523, which could ordinarily require that the expression evaluation operator 2524 be performed after the filtering operator 2523.

Figure 25C:
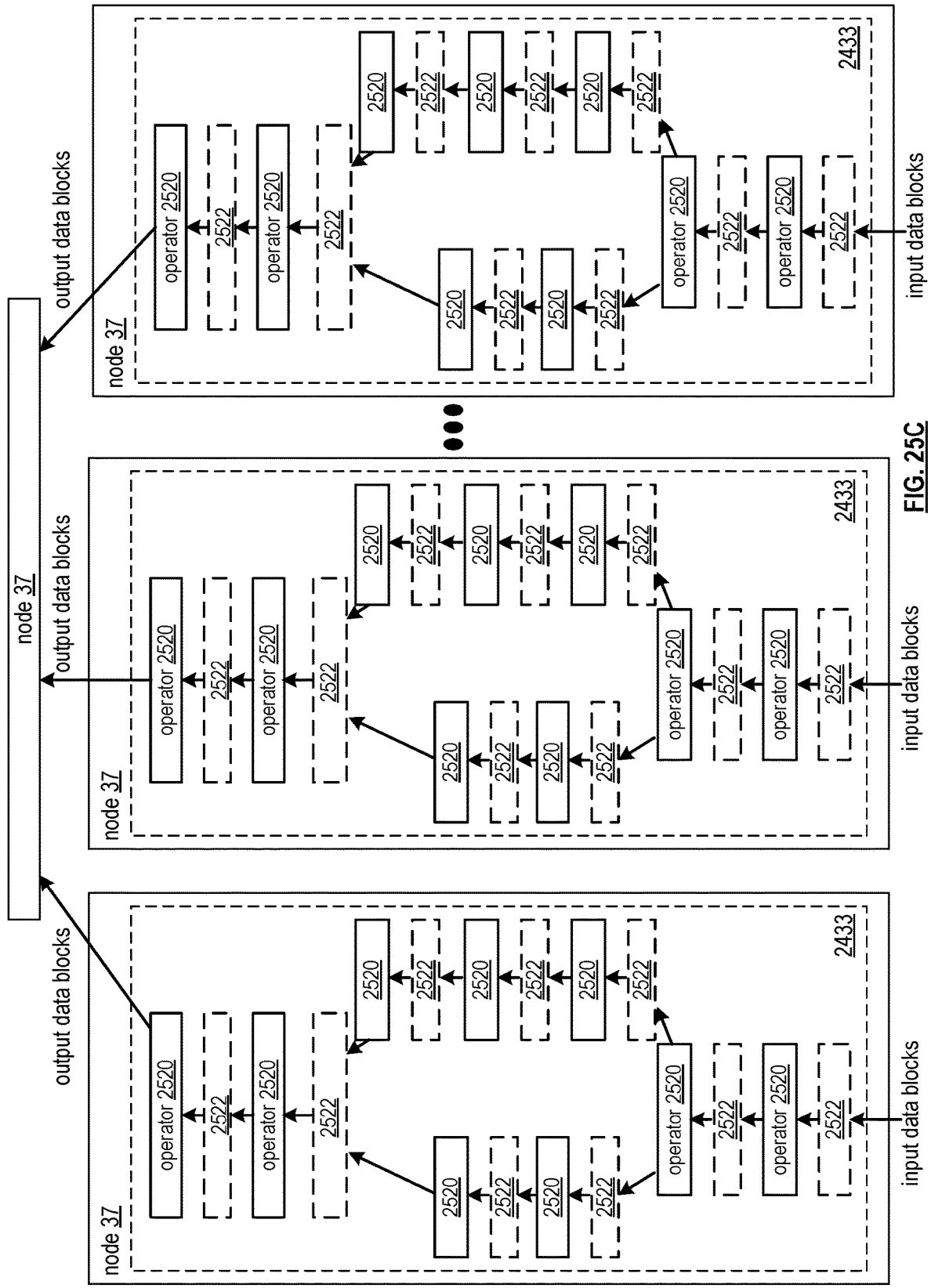
FIG. 25C is a schematic block diagram of a plurality of nodes that utilize query operator execution flows in accordance with various embodiments of the present invention.

The expression evaluation operator 2524 and/or the filtering operator 2523 can be implemented as particular operators 2520 of the operator execution flow 2517 as discussed in conjunction with FIGS. 25A-25C, where the operator execution flow 2517 is executed via the query execution module 2504 as discussed in conjunction with FIGS. 25A-25C. While not illustrated in FIG. 26A, the operator execution flow 2517 can include one or more other types of operators 2520 necessary for execution of the query expression 2511. While not illustrated in FIG. 26A, the operator execution flow 2517 can optionally a plurality of parallelized branches of operators 2520.

However, rather than performing the expression evaluation operator 2524 and/or the filtering operator 2523 in a conventional fashion, the expression evaluation operator 2524 and/or the filtering operator 2523 can have their respective executions modified to enable delaying of exception throwing, accounting for the fact that the expression evaluation operator 2524 is intended for execution upon only rows included in the filtered output of the filtering operator 2523. The modified implementation of the expression evaluation operator 2524 and/or the filtering operator 2523 to delay enable delaying of exceptions can be indicated by the operator flow generator module 2514 in generating the query operator execution flow 2517.

For example, as illustrated in FIG. 26A, an exception column generation flag 2532 can be included and/or denote an ON and/or other binary value indicating an exception column should be generated in executing the expression evaluation operator 2524. In other embodiments, any other metadata and/or indication denoting whether the expression evaluation operator 2524 should generate an exception column can be indicated in the query operator execution flow 2517 generated by the operator flow generator module 2514. Operator executions of the expression evaluation operator 2524 in executing the corresponding query operator execution flow 2517 of FIG. 26A can be implemented to generate an exception column in accordance with the modified functionality of the expression evaluation operator 2524, for example, as discussed in conjunction with FIG. 26B, based on the exception column generation flag 2532 and/or other indication that the exception column be generated. Operator executions of other expression evaluation operators 2524 in executing the same or different query operator execution flow 2517 can be implemented to execute conventionally, without generating an exception column, based on not having the exception column generation flag 2532 and/or based on not having any indication that the exception column be generated. In particular, in some embodiments, an exception column is only generated for expression evaluation operators 2524 that are applied to output of one or more filtering operators 2523 in query expression 2511, and that were also pushed down before the corresponding one or more filtering operators 2523 for execution serially before these one or more filtering operators 2523 in the resulting query operator execution flow 2517 generated by the operator flow generator module 2514.

Similarly, as illustrated in FIG. 26A, an exception column check flag 2533 can be included and/or denote an ON and/or other binary value indicating an exception column should be checked in executing the filtering operator 2523. In other embodiments, any other metadata and/or indication denoting whether the expression evaluation operator 2523 should check an exception column can be indicated in the query operator execution flow 2517 generated by the operator flow generator module 2514. Operator executions of the filtering operator 2523 in executing the corresponding query operator execution flow 2517 of FIG. 26A can be implemented to check an exception column in accordance with the modified functionality of the expression evaluation operator 2524, for example, as discussed in conjunction with FIG. 26C, based on the exception column check flag 2533 and/or other indication that the exception column be checked. Operator executions of other filtering operators 2523 in executing the same or different query operator execution flow 2517 can be implemented to execute conventionally, without checking an exception column, based on not having the exception column check flag 2533 and/or based on not having any indication that the exception column be checked. In particular, in some embodiments, an exception column is only checked for filtering operators 2523 where one or more expression evaluation operators 2524 is applied to output the filtering operators 2523 in query expression 2511, and where these one or more expression evaluation operators 2524 were pushed down before filtering operators 2523 for execution serially before these one or more filtering operators 2523 in the resulting query operator execution flow 2517 generated by the operator flow generator module 2514.

In some embodiments, an exception column is only checked by some or all filtering operators 2523 that are serially after an expression evaluation operators 2524 that generates the output column. In some embodiments, an exception column is only generated by some or all expression evaluation operators 2524 that are serially before one or more filtering operators 2523 that check this generated exception column.

Figure 26B:
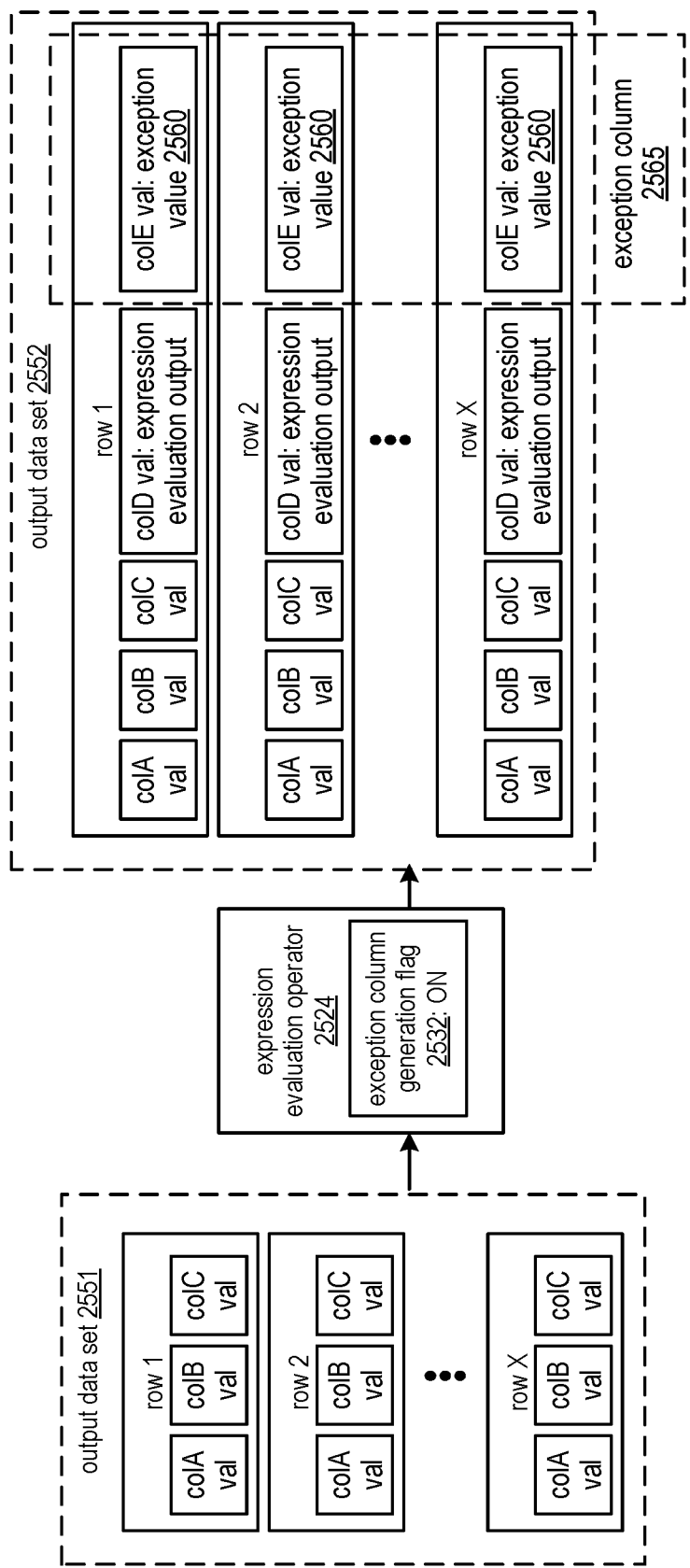
FIG. 26B illustrates a query execution module that executes an expression evaluation operator in accordance with various embodiments of the present invention.

FIG. 26B illustrates an embodiment of a query execution module 2504 that performs execution of an expression evaluation operator 2524. Some or all features and/or functionality of the query execution module 2504 of FIG. 26B can be utilized to implement the query execution module 2504 of FIG. 26A and/or any other embodiment of the query execution module described herein. Some or all features and/or functionality of execution of the expression evaluation operator 2524 of FIG. 26B can be optionally by performed by the query processing module 2435 of one or more individual nodes 37, for example, in accordance with executing a query operator execution flow 2433 that includes the expression evaluation operator 2524 and/or that is derived from the query operator execution flow 2517.

Executing the expression evaluation operator 2524 can include generating an exception column 2565. For example, the exception column 2565 is generated based on the expression evaluation operator 2524 being denoted to generate the exception column in the query operator execution flow 2517 via exception column generation flag 2532 and/or via a different indication.

In this example, the expression evaluation operator 2524 is performed upon an input data set 2551 that includes a plurality of rows 1-X. The plurality of rows 1-X can be received all at once, and/or can be received in a stream. The expression evaluation operator 2524 can be performed upon each row 1-X one at a time and/or multiple ones of the rows 1-X can be evaluated simultaneously and/or in parallel. For example, the expression evaluation operator 2524 is executed as a plurality of operator executions as rows in the set of rows 1-X are received one at a time, in data block groups, and/or all at once. The expression evaluation operator 2524 can be executed upon the set of rows 1-X based on: the plurality of rows 1-X being read from one or more segments and/or being read from memory; the plurality of rows 1-X being filtered and/or outputted by prior operators serially before the in the expression evaluation operator 2524 in the operator execution flow 2517, and/or based on rows 1-X being included in an operator input data set 2522 of the expression evaluation operator 2524 as discussed in conjunction with FIG. 25B.

Execution of the expression evaluation operator 2524 upon the plurality of rows 1-X can render generation of an output data set 2552. The output data set 2552 can include one or more column values for all of the plurality of rows 1-X based on the expression evaluation operator 2524 not filtering the plurality of rows 1-X. The rows in output data set 2552 can be generated and sent to other operators for processing one at a time, in data block groups, and/or all at once.

A corresponding expression of the expression evaluation operator 2524 can be evaluated for each row, for example, as a function of one or more columns of each row. In this example, the expression evaluation operator 2524 can be evaluated for each row as a function of the value of colA, colB, and/or colC. Output for each row 1-X indicating the result and/or output of the expression evaluated for each row can be generated, for example, as a new output column of the output data set 2552. For example, output for each row 1-X is generated in accordance with a conventional execution of the expression evaluation operator 2524. The output for some or all rows 1-X can be included in the query resultant and/or can be utilized by other operators, for example, where the output is included in an operator input data set 2522 of an operator that is serially after the expression evaluation operator 2524 in the serialized operator flow ordering 2518.

As the corresponding expression of the expression evaluation operator 2524 is evaluated for each row, an exception value 2560 can also be generated to render an exception column 2565, for example, based on the exception column generation flag of the expression evaluation operator 2524 and/or the indication to generate the exception column. A name identifying the exception columns can also be generated by the expression evaluation operator 2524, and can be guaranteed to be unique from names of other columns.

The exception value 2560 of each given row can denote whether or not an error condition occurred in evaluating the expression for the given row via expression evaluation operator 2524. For example, the exception value 2560 is optionally implemented as a binary value denoting whether or not an error occurred.

The exception value 2560 can optionally indicate further information, such as which one of a set of possible error types occurred. For example, if no error occurred and/or no exception would be thrown in performing the expression evaluation operator 2524 for a given row, the exception value for the given row can be set as zero, or a first value denoting no error occurred. If an error occurred in performing the expression evaluation operator 2524 for a given row, the particular type of error that occurred can be identified, and the exception value 2560 for the given row is set as one of a set of other values that are different from the first value, such as one of a set of different negative integer values, based on identifying which one of the set of other values corresponds to the particular type of error that occurred. As a particular example, the exception column 2565 can hold the values of SQLCode of the expression evaluation for each row indicating whether an exception would be thrown and/or which of a set of different exception types occurred.

The output data set 2552 can thus include the expression evaluation output generated for each row 1-X, the exception value 2560 generated for each row 1-X, and/or the values of one or more existing and/or previously generated columns such as colA, colB, and/or colC. The output data set 2552 can be processed by at least one subsequent operator 2520 of the plurality of operators in the operator execution flow 2517, such as filtering operator 2523 and/or one or more operators serially between the expression evaluation operator 2524 and the filtering operator 2523 in the serialized operator flow ordering 2518. For example, rows 1-X of output data set 2552 are included in the operator input data set 2522 of at least one subsequent operator 2520 of the plurality of operators in the operator execution flow 2517, such as filtering operator 2523 and/or one or more operators serially between the expression evaluation operator 2524 and the filtering operator 2523 in the serialized operator flow ordering 2518. In embodiments where one or more individual nodes execute the expression evaluation operator 2524, these nodes 37 can optionally send exception values 2560 of the exception column 2565 and/or other portions of output data set 2552 as output data blocks to a different node 37 for processing in accordance with the query execution plan 2405.

Generating the exception column 2565 in this fashion enables exception throwing and/or query aborting to be delayed, and for query execution to continue despite exceptions and/or errors that may have occurred in execution of expression evaluation operator 2524. In particular, by storing the information regarding these errors as exception values 2560 in exception column 2565, these exceptions can be delayed until the filtering operator 2523 is performed. Therefore, in these cases where the expression evaluation operator 2524 is indicated to generate an exception column 2565 as part of its execution, expression evaluation failure does not immediately terminate the query, it instead stores the corresponding SQLCode and/or information regarding the error in the exception column and continues. In particular, rather than throwing an exception and/or aborting the query execution when an error condition occurs in performing expression evaluation operator 2524 for a given row, information regarding the error is simply stored as the exception value 2560 for the corresponding row. The query execution can thus continue even when the exception value 2560 for one or more rows 1-X indicates an error condition occurred and/or an exception to be thrown, where the expression evaluation operator 2524 generates output data set 2552 to include all rows 1-X, and/or where other operators are optionally executed upon output data set 2552 despite any exceptions and/or errors that occurred in performing expression evaluation operator 2524 for one or more of the rows 1-X.

Figure 26C:
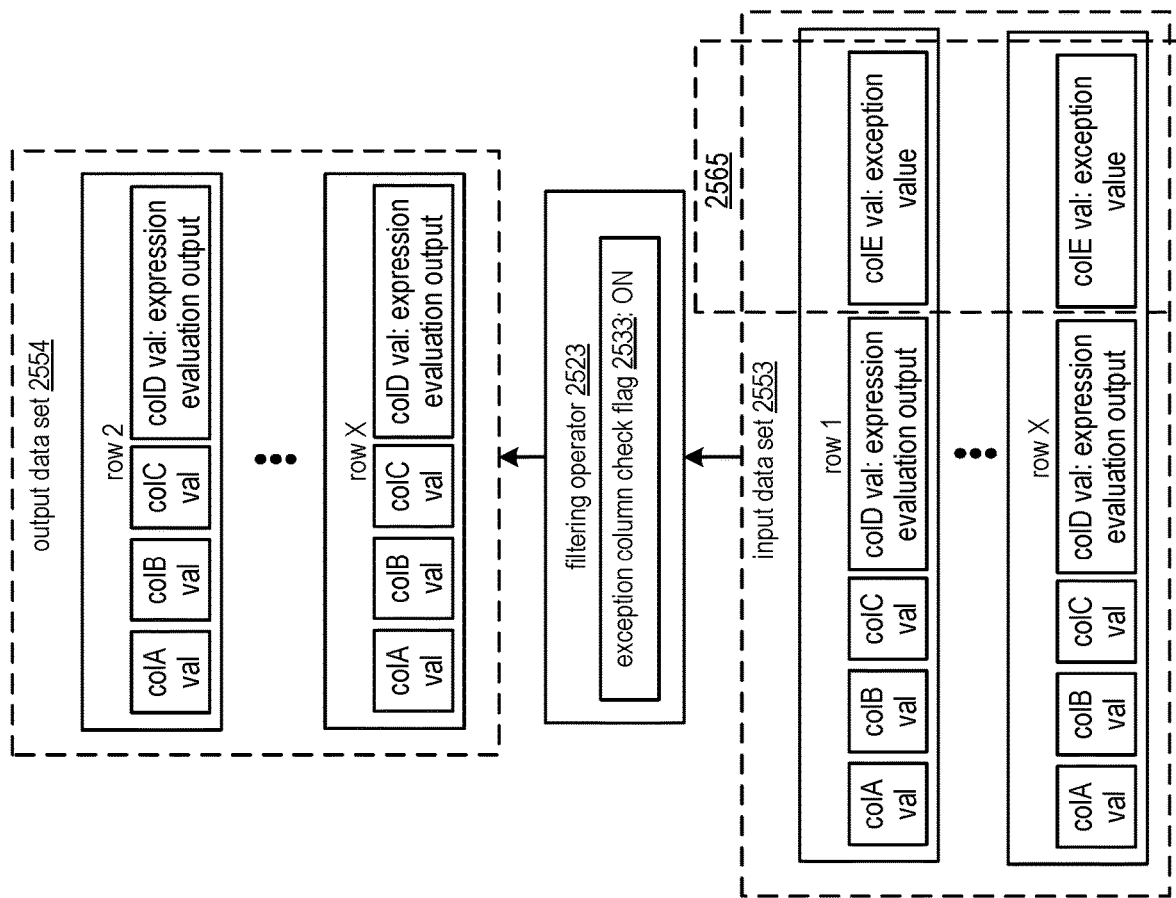
FIG. 26C illustrates a query execution module that executes a filtering operator in accordance with various embodiments of the present invention.

FIG. 26C illustrates an embodiment of a query execution module 2504 that performs execution of a filtering operator 2523. Some or all features and/or functionality of the query execution module 2504 of FIG. 26C can be utilized to implement the query execution module 2504 of FIG. 26A and/or any other embodiment of the query execution module described herein.

Executing the filtering operator 2523 can include checking an exception column 2565. for example, the exception column 2565 is checked based on the filtering operator 2523 being denoted to check the exception column in the query operator execution flow 2517 via exception column check flag 2533 and/or via a different indication.

In this example, the filtering operator 2523 is performed upon an input data set 2553 that includes plurality of rows 1-X. The plurality of rows 1-X can be received all at once, and/or can be received in a stream. The plurality of rows 1-X include an exception column 2565 that includes a plurality of exception values 2560. In some embodiments, this exception column 2565 was generated as output of an expression evaluation operator 2524 included in the same query operator execution flow 2517, for example, as discussed in conjunction with FIG. 26B.

The filtering operator 2523 can be performed upon each row 1-X one at a time and/or multiple ones of the rows 1-X can be evaluated simultaneously and/or in parallel. For example, the filtering operator 2523 is executed as a plurality of operator executions as rows in the set of rows 1-X are received one at a time, in data block groups, and/or all at once. The filtering operator 2523 can be executed upon the set of rows 1-X based on: the plurality of rows 1-X being outputted by the expression evaluation operator 2524; the plurality of rows 1-X being filtered and/or outputted by prior operators serially before the filtering operator 2523 and serially after the in the expression evaluation operator 2524 in the operator execution flow 2517; and/or based on rows 1-X being included in an operator input data set 2522 of the filtering operator 2523 as discussed in conjunction with FIG. 25B.

Execution of filtering operator 2523 upon the plurality of rows 1-X can render generation of an output data set 2554. The output data set 2554 can include a subset of the plurality of rows, where one or more column values for only ones of the of the plurality of rows 1-X that meet and/or otherwise compare favorably to filtering parameters of the filtering operator 2523. For example, the filtering parameters denote whether each given one of the plurality of rows be included in the output data set 2554 as a function of column values of colA, colB, and/or colC. Note that in some embodiments, the filtering parameters are not a function of the output values of the expression evaluation operator 2524 based on the expression evaluation operator 2524 being expressed to be performed upon output of the filtering operator 2523 in the query expression 2511. Rows in output data set 2552 can be generated and sent as resultant data blocks and/or data block for processing via other operators for processing one at a time, in data block groups, and/or all at once.

In this example, the subset of the plurality of rows 1-X includes at least row 2 and row X based on row 2 and row X adhering to the filtering parameters. However, the subset of the plurality of rows 1-X in this example does not include row 1 based on row 1 not adhering to the filtering parameters.

Once a given rows of the set of rows 1-X is processed via filtering operator 2523 and determined to meet the filtering parameters, rather than being included in the output data set 2554 automatically, these adhering rows first have their exception value 2560 checked. For example, the exception value 2560 of each row determined to meet the filtering parameters can be checked based on the exception column check flag of the expression evaluation operator 2524 and/or the indication to generate the exception column. In some embodiments, the exception values of the exception column 2565 are checked based on a name of the exception column 2565 generated by the expression evaluation operator 2524 that is known and/or communicated to the filtering operator 2523, for example, in conjunction with denoting checking of the exception column via the exception column check flag.

Note that any rows that are not determined to meet the filtering parameters need not have their exception value 2560 checked, as these rows were never intended to be evaluated via the expression evaluation operator 2524 based on the query expression 2511 indicating the expression evaluation operator 2524 be applied only to the output of the filtering operator 2523. In this example, row 2 and row X have their exception value 2560 checked based on adhering to the filtering parameters, while row 1 does not have its exception value 2560 checked based on not adhering to the filtering parameters.

As the filtering operator 2523 writes and/or otherwise outputs rows at runtime, it must check the exception column and make sure the corresponding exception value 2560 is zero and/or otherwise indicates no error. If exception value 2560 of a given row being checked is non-zero and/or otherwise indicates an error condition occurred when the expression was evaluated for the given row via expression evaluation operator 2524, the query can be aborted.

In cases where the exception value 2560 indicates the code for a particular exception, the particular exception can be thrown based on being indicated in exception value 2560. For example, the correct exception is generated and thrown at that time, based on the SQLCode value or other unique value of the exception value 2560 identifying the exception. This can include transmitting the exception value 2560 indicating the error condition occurred to a client device for display via a display device. If the exception value 2560 indicates a particular error, the error code of exception value 2560 and/or corresponding descriptive text mapped to the particular error code can be transmitted to the client device for display via a display device. For example, this client device can correspond to a particular client device and/or end user from which the query expression was received. As another example, this client device can correspond to a user and/or administrator of the database system 10, such as a client device implemented as a computing device 18 of administrative subsystem 15 and/or another computing device communicating with the database system 10. The exception value 2560 and/or other corresponding information regarding the error can be transmitted via external network 17 and/or system communication resources 14.

In some embodiments, the query is aborted immediately in response to checking the exception value 2560 of row that adheres to the filtering parameters of filtering operator 2523, and determining this exception value 2560 indicates an error condition and/or an exception be thrown. In such cases, the query can be aborted before the filtering operator 2523 has processed all input rows 1-X, for example, based on: processing rows one at a time and/or as a plurality of separate data blocks; one or more rows still pending in operator input data set 2522 filtering operator 2523 at the time the exception value 2560 indicating the error condition is checked; and/or based on not all rows having yet having been received from a prior operator 2520 at the time the exception value 2560 indicating the error condition is checked. In such cases, continuing to process these additional rows via filtering operator 2523 and/or proceeding with processing output of the filtering operator 2523 is not necessary and thus not performed due to the error being identified and/or the exception being thrown.

In some cases, any remaining input rows 1-X are processed and also have their exception value 2560 checked, even if the exception value 2560 of at least one row that was already processed indicated an error condition requiring aborting of the query. This can be ideal to determine whether multiple errors occurred for multiple rows. For example, all exception values 2560 for all rows that adhere to the filtering requirements are checked regardless of whether one of these checked exception values 2560 is already identified as having an error. In some cases, all exception values 2560 for all rows that adhere to the filtering requirements, and/or a subset of the exception values 2560 for rows that adhere the filtering requirements that indicate one or more types of errors occurred, are transmitted to a client device for display via a display device, for example, in conjunction with textual information mapped to the types of errors denoting the set of multiple errors that occurred.

If exception value 2560 of every given row that is checked by the filtering operator 2523 indicates no error condition occurred when the expression was evaluated for each of these given rows via expression evaluation operator 2524, the query can continue. In particular, the query only continues when every one of the set of rows 1-X identified to adhere to the filtering parameters of the filtering operator 2523, and that thus are outputted as the subset of rows in output data set 2554, have exception values 2560 indicating no error and/or no exception thrown. The output data set 2554 is thus generated normally, and can be included in a query resultant and/or can be sent to another operator for processing, for example, via inclusion in an operator input data set 2522 of a subsequent operator sequentially after the filtering operator 2523 in the operator execution flow 2517. As illustrated in FIG. 26C, the exception column 2565 can be projected out, where the output data set 2554 does not include exception values 2560 for any of its rows, as these exception values 2560 are no longer necessary.

Note that the query continues even if one or more rows 1-X in the input data set 2553 have exception values 2560 indicating errors occurred, so long as all of these more rows 1-X in the input data set 2553 have exception values 2560 indicating errors occurred do not adhere to the filtering parameters of the filtering operator 2523. In particular, these errors are not relevant, as the corresponding rows were never intended to have the expression evaluation operator 2524 performed because they are not included in the output of the filtering operator 2523 and because the query expression indicated the expression evaluation operator 2524 be performed upon only some or all rows that were outputted by the filtering operator 2523.

Some or all features and/or functionality of execution of the filtering operator 2523 of FIG. 26C can be optionally by performed by the query processing module 2435 of one or more individual nodes 37, for example, in accordance with executing a query operator execution flow 2433 that includes the expression evaluation operator 2524 and/or that is derived from the query operator execution flow 2517. As a particular example, a first one or more nodes 37 executes the expression evaluation operator 2524 for a given operator execution flow 2517 based on being included in a first level of the query execution plan 2405 assigned to execute the expression evaluation operator 2524, and a second one or more nodes 37 executes the filtering operator 2523 for the given operator execution flow 2517 based on being included in a second level of the query execution plan 2405 assigned to execute the filtering operator 2523 that is above the first level. The first set of nodes 37 can each send their output, including the exception values 2560 of the exception column 2565 and/or other portions of output data set 2552, to an assigned one of the second one or more nodes 37 included in the second level of the query execution plan 2405. Each of the second one or more nodes 37 can execute the filtering operator 2523 by accessing and checking exception values 2560 of the exception column 2565 received from one or more child nodes in the first level, or another level between the first level and the second level.

Figure 26D:
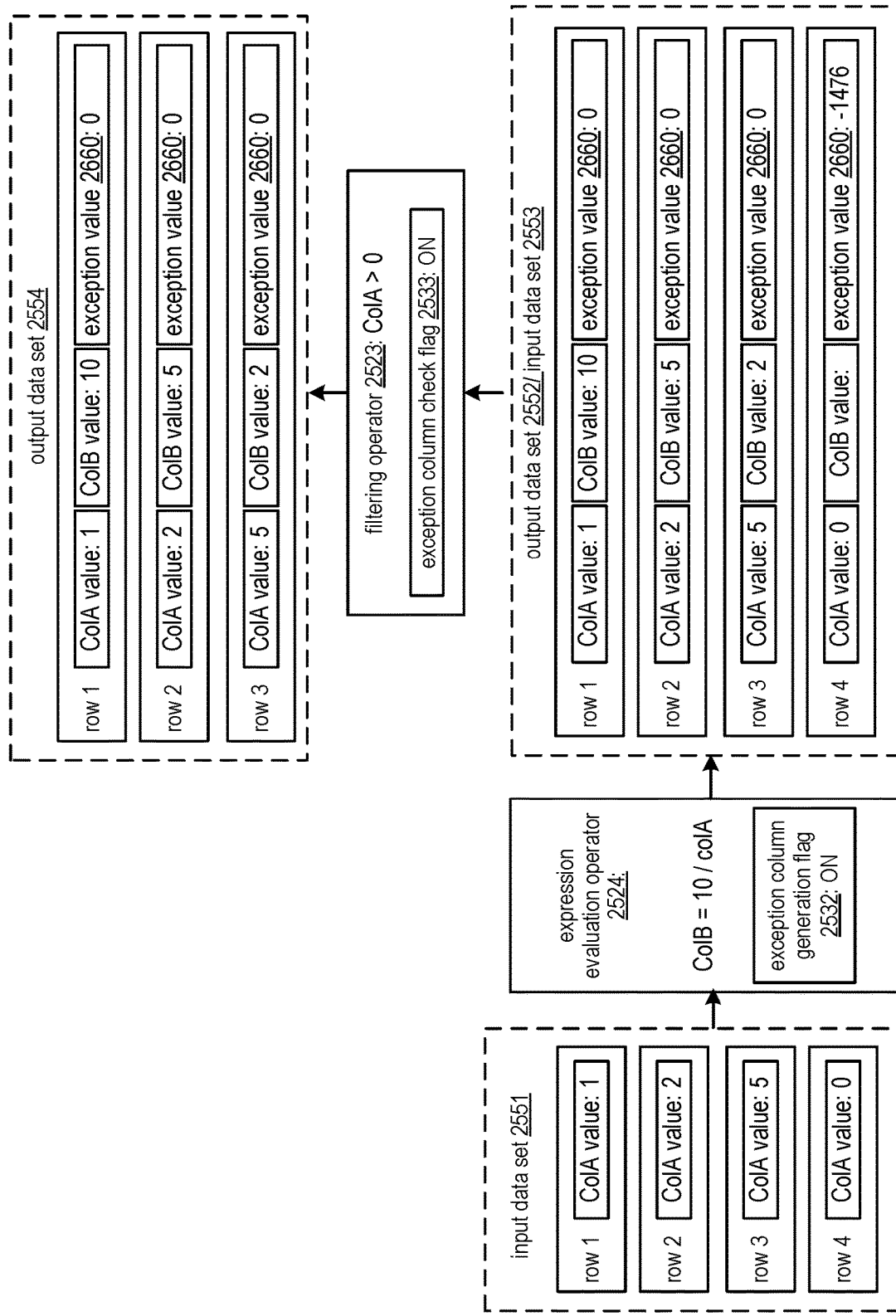
FIGS. 26D-26E illustrate query execution module that execute example query operator execution flows in accordance with various embodiments of the present invention.
Figure 26E:
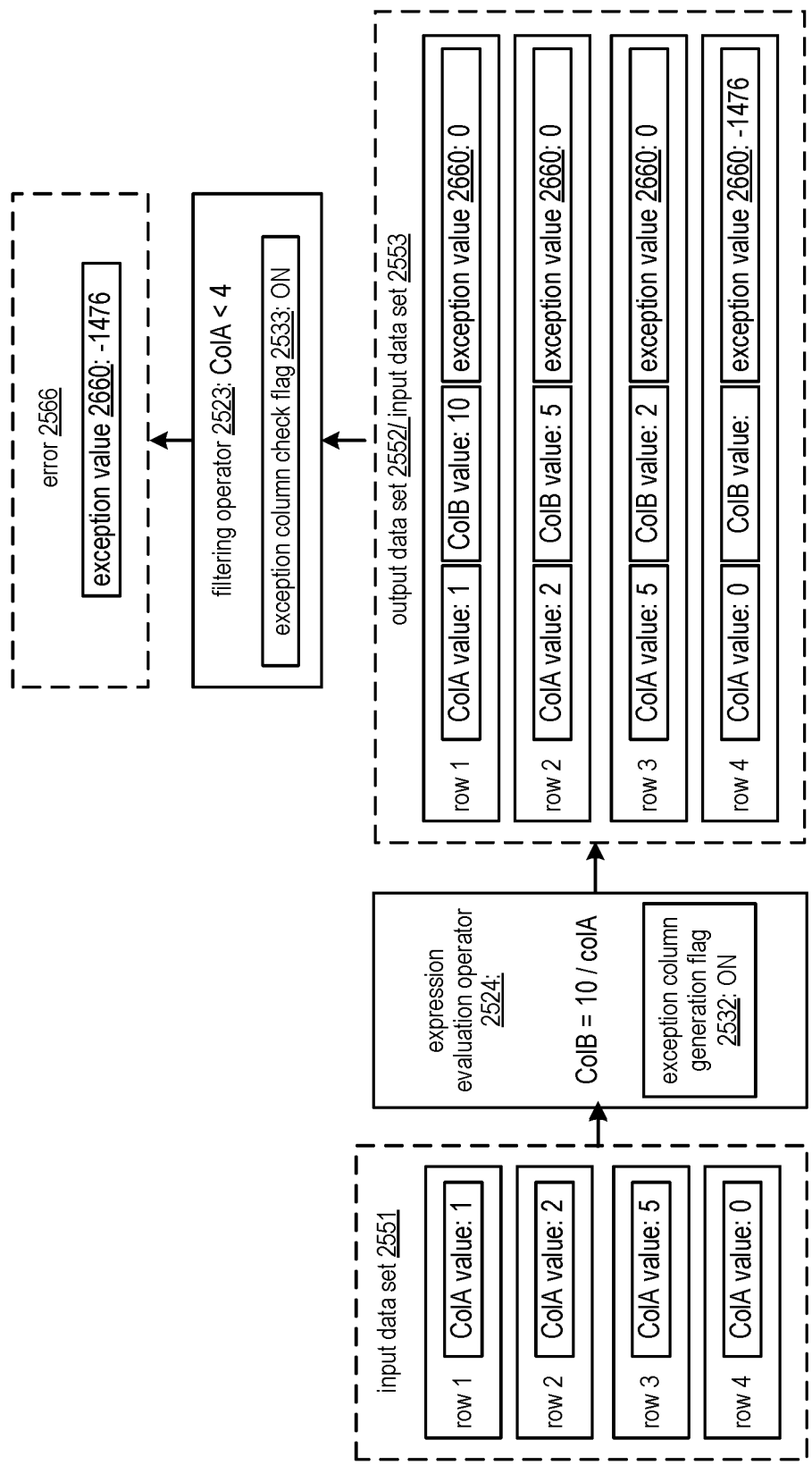

FIGS. 26D and 26E illustrate embodiments of a query execution module 2504 that executes example operator execution flows 2517 that include an expression evaluation operator 2524, and a filtering operator 2523 serially after the expression evaluation operator 2524. The expression evaluation operator 2524 of both FIG. 26D and FIG. 26E can have its exception column generation flag 2532 set to "ON" and/or can otherwise be denoted to generate the exception column as discussed in conjunction with FIG. 26B. The filtering operator 2523 of both FIG. 26D and FIG. 26E can have its exception column check flag 2533 set to "ON" and/or can otherwise be denoted to check the exception column as discussed in conjunction with FIG. 26C. Some or all features and/or functionality of the query execution module 2504 of FIG. 26D and/or FIG. 26E can be utilized to implement the query execution module 2504 of FIG. 26A and/or any other embodiment of the query execution module 2504 discussed herein.

FIG. 26D illustrates an example where the execution of the query continues and is not interrupted. In this example, the expression evaluation operator 2524 divides 10 by the value of colA of each row in the input data set 2551. In this example, row 4 thus renders an error in performing expression evaluation operator 2524 upon row 4 based on colA of row 4 having a value of zero. The exception value 2560 for row 4 can indicate an error occurred. In this example, the exception value 2560 for row 4 is set as −1476 to denote the SQLCode for the exception caused due to attempting to divide by zero.

In this example, the other rows 1, 2, and 3 render no errors when expression evaluation operator 2524 is performed upon these rows, and thus have exception values 2560 indicating no error occurred. In this the exception value 2560 for rows 1, 2, and 3 is set as 0 to denote the SQLCode indicating no exception.

These exception values 2560 are generated as output data set 2552 of expression evaluation operator 2524, which is utilized as input data set 2553 of filtering operator 2523. The filtering parameters of filtering operator 2523 in this example is colA >0. Only rows 1, 2, and 3 are identified to meet the filtering parameters of filtering operator 2523 and therefore, only the exception values 2560 of rows 1, 2, and 3 are checked. Because the exception values 2560 of all rows that pass the filtering parameters of filtering operator 2523 indicate no errors in this example, the execution continues with no errors. In particular, while row 4 has an exception value 2560 denoting an error, this exception value is not checked because row 4 does not meet the filtering parameters of filtering operator 2523 due to its value of colA being zero.

FIG. 26E illustrates a similar example where the execution of the query is aborted. In this example, the expression evaluation operator 2524 again divides 10 by the value of colA of each row in the input data set 2551. The same output data set 2552 as the example of FIG. 26D is therefore generated, where row 4 again renders an error in performing expression evaluation operator 2524 upon row 4 based on colA of row 4 having a value of zero, and where the other rows 1, 2, and 3 render no errors when expression evaluation operator 2524 is performed upon these rows.

In this example, the filtering parameters of filtering operator 2523 is colA >4. Therefore, rows 4 is identified to meet the filtering parameters of filtering operator 2523 and has its exception values 2560 checked. Because the exception values 2560 of row 4, which passes the filtering parameters of filtering operator 2523, indicates an error in this example, the execution aborts. In particular, an error 2566 can be generated and/or displayed, for example, as an exception that is thrown. In particular, the SQLCode for the exception caused due to attempting to divide by zero can be thrown and/or displayed to a user via a display device of a client device based on this type of error being mapped to row 4's exception values 2560 of −1476.

In some embodiments, one or more scalar functions can be designated to never throw exceptions and/or to never return an error, regardless of the input to these scalar functions. The corresponding expression evaluation operators 2524 are thus never designated to generate exception columns, and when these expression evaluation operators 2524 are pushed before one or more filtering operators 2523, none of the filtering operators 2523 need to perform exception column checks. The operator flow generator module 2514 can determine that the corresponding expression evaluation operators 2524 for one of these scalar functions that are identified to never throw exceptions and/or errors are not designated to generate exception columns in the resulting query operator execution flow, and/or can determine that any filtering operators 2523 after these expression evaluation operators 2524 not designated to check exception columns in the resulting query operator execution flow based on these expression evaluation operators 2524 never throwing errors.

In some embodiments, multiple expression evaluation operators 2524 are performed prior to a filtering operator, and all generate exception columns 2565. Thus, multiple exception columns 2565 can optionally be included in input data set 2553 of a filtering operator 2523 designated to perform an exception column check. This filtering operator 2523 can optionally check each of a plurality of exception values 2660 of each given row that meets the corresponding filtering parameters of the filtering operator 2523 based on the incoming rows having multiple exception values 2660 generated via performance of multiple expression evaluation operators 2524 upon these rows. If any of the plurality of exception values 2660 indicate an error for a given row that meets the filtering parameters, the query is aborted and/or the corresponding exception is thrown. The query continues only if all of the plurality of exception values 2660 for all row that meets the filtering parameters indicate no error.

In other embodiments, when multiple expression evaluation operators 2524 that generate exception columns are performed upon rows prior to a filtering operator 2523 designated to perform the exception column check, only one exception value ever persists for any given row, for example, to preserve memory resources as the query is executed. For example, if an expression evaluation operator 2524 is designated to generate an exception column 2560, and receives rows as input that already have an exception column 2565 generated via a prior expression evaluation operator 2524, the expression evaluation operator 2524 can generate its exception column 2560 by selecting the exception value for each given row as the lowest of: the exception value generated by evaluating the expression of the expression evaluation operator 2524, and the exception value already indicated in the row's exception column as input. The expression evaluation operator 2524 can then include only the exception values of this new exception column in its output, and project out or otherwise not include the previous exception values for the set of rows. This mechanism of only preserving the lowest exception value generated for each row can be guaranteed to preserve the instance of any errors in the corresponding rows when the errors are always indicated as negative exception values 2560 and when no error is always indicated an exception value 2560 of zero, while only requiring one exception column ever need be passed to the next operator.

Figure 26F:
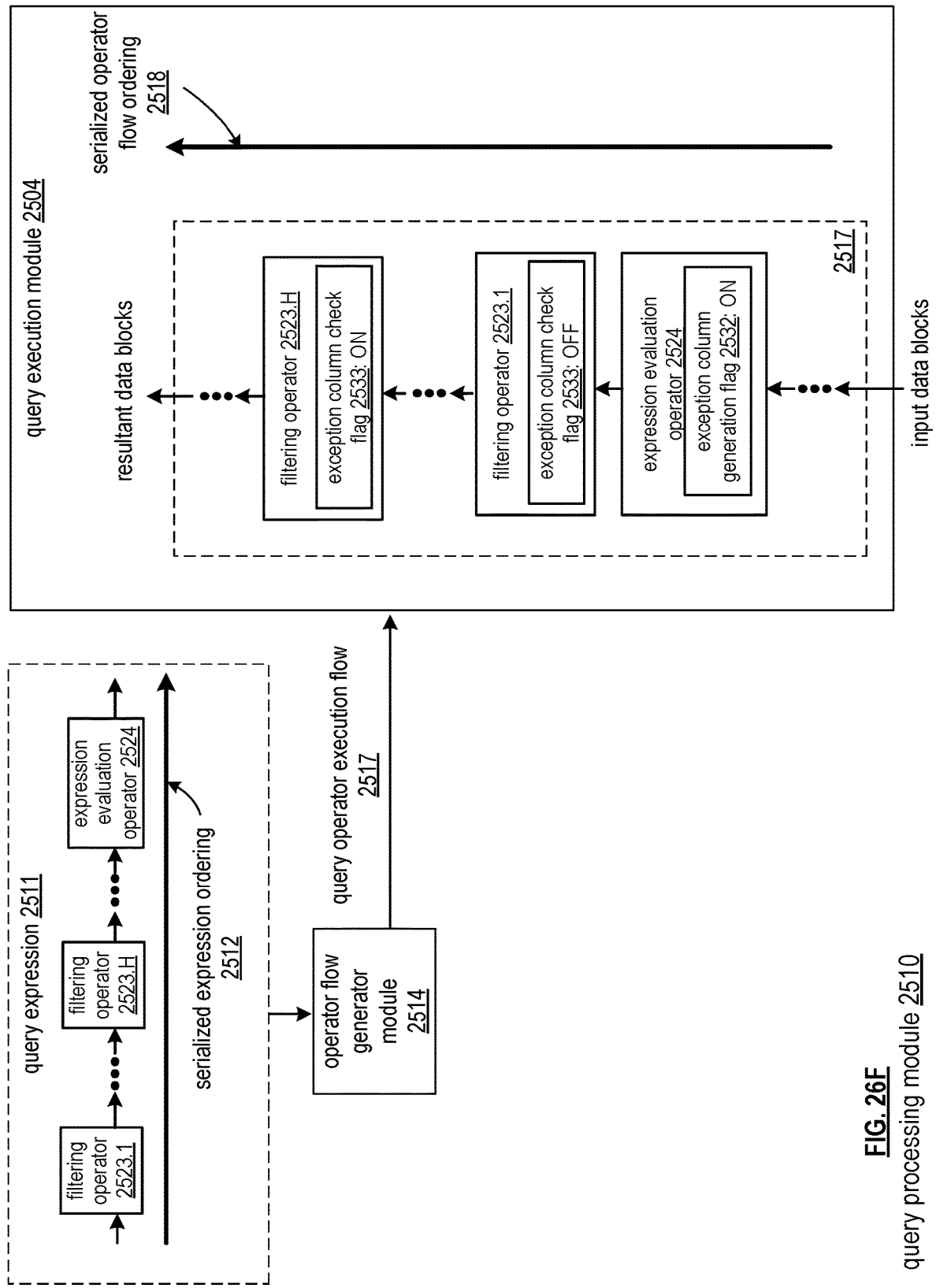
FIG. 26F illustrates a query processing system that executes a query operator execution flow with multiple filtering operators in accordance with various embodiments of the present invention.

FIG. 26F illustrates an embodiment of a query processing system 2510 that selects and executes a query operator execution flow 2517 where an expression evaluation operator 2524 is pushed down before multiple filtering operators 2523.1-2523.H. Some or all features and/or functionality of the query processing system 2510 of FIG. 26F can be utilized to implement the query processing system 2510 of FIG. 25A and/or any other embodiment of the query processing system 2510 discussed herein.

As illustrated in FIG. 26F, a query expression 2511 can include an expression evaluation operator 2524 to be performed upon output of multiple filtering operators 2523.1-2525.H. The filtering operators 2523.1-2523.H can correspond to the same or different type of operator, for example, where one of the set of filtering operators 2523.1-2523.H is a SELECT operator and another one of the set of filtering operators 2523.1-2523.H is a JOIN operator. The operator flow generator module 2514 can determine to push the expression evaluation operator 2524 before some or all of this set of multiple filtering operators 2523.1-2523.H, for example, based on an optimizer of the operator flow generator module 2514 determining that performance of the expression evaluation operator 2524 before some or all of this set of multiple filtering operators 2523.1-2523.H renders optimal and/or improved execution compared to performance of the expression evaluation operator 2524 after this set of multiple filtering operators 2523.1-2523.H. While not illustrated in FIG. 26F, the operator flow generator module 2514 can also optionally rearrange the ordering of the filtering operators 2523.1-2523.H in the serialized operator flow ordering 2518 to be different from a specified ordering of the filtering operators 2523.1-2523.H in the serialized expression ordering 2512.

Rather than checking the exception column via every filtering operator 2523.1-2523.H, the operator flow generator module 2514 can denote that only a final one of the set of filtering operators 2523.1-2523.H in the serialized operator flow ordering 2518 checks the exception column. In FIG. 26F, this is illustrated as only filtering operator 2523.H having its exception column check flag 2533 set to ON, while all other filtering operators 2523.1-2523.H-1 have their exception column check flags 2533 set to OFF. Thus, despite the expression evaluation operator 2524 being pushed down before all of these filtering operators 2523.1-2523.H, only the final filtering operator 2523.H performs the exception column check as discussed in conjunction with FIG. 25C, while the other filtering operators 2523.1-2523.H are executed to perform their filtering conventionally and/or without checking the exception column. This still renders a correct query result, as the subset of rows outputted by the final filtering operators 2523.1-2523.H corresponds to the subset of rows rendered by applying all filtering operators 2523.1-2523.H, due to the other filtering operators 2523.1-2523.H-1 being applied before the final filtering operators 2523.1-2523.H to perform their own respective filtering. Performing the exception column check via only one of these filtering operators, rather than all of these filtering operators, further improves the technology of database systems by decreasing the number of exception column checks that are performed, which improves query execution efficiency while still guaranteeing that exceptions are thrown correctly.

Figure 26G:
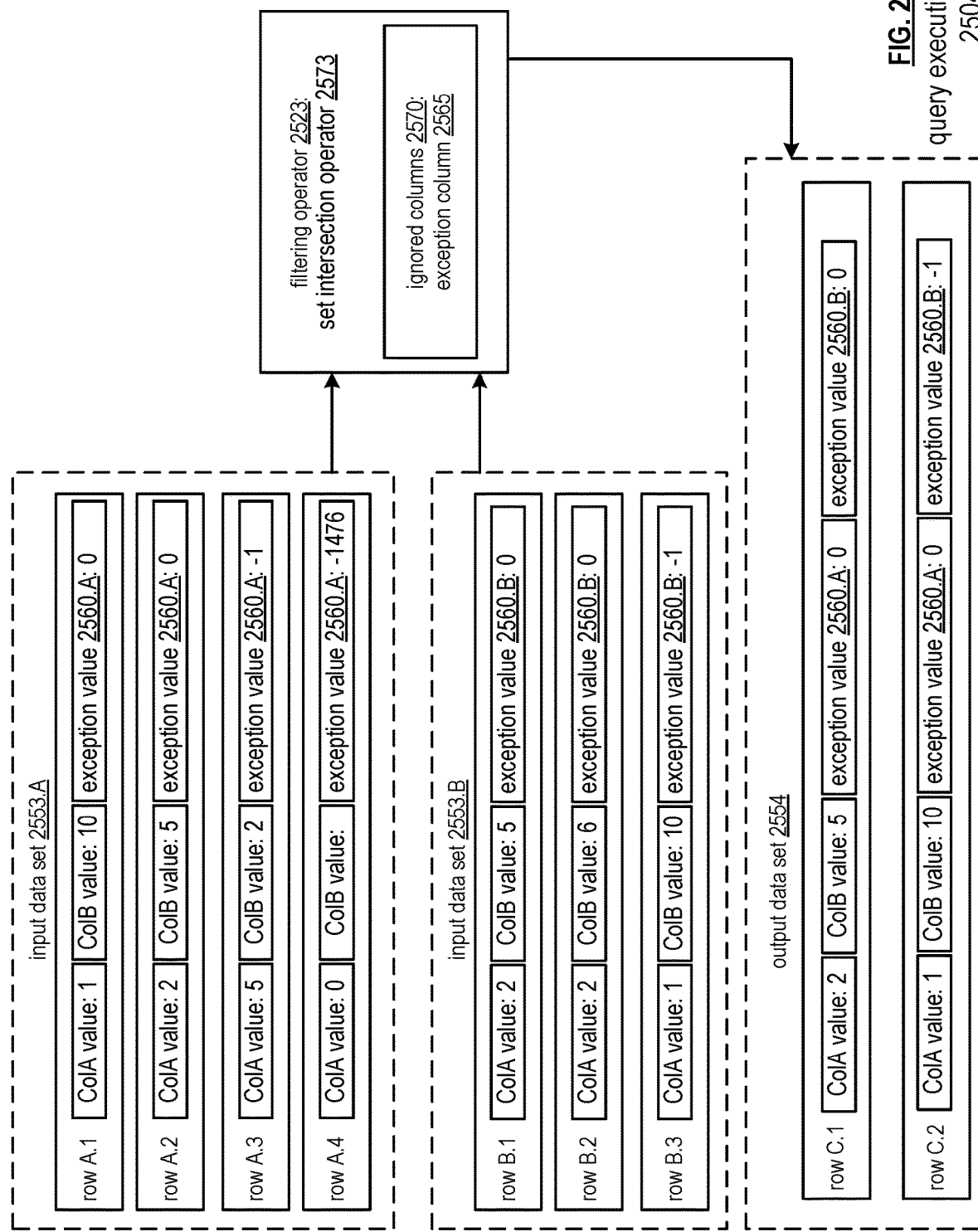
FIG. 26G illustrates a query execution module that executes an intersection operator in accordance with various embodiments of the present invention.

FIG. 26G presents an embodiment a query execution module 2504 illustrating execution of a filtering operator 2523 implemented as a set intersection operator 2573. Some or all features and/or functionality of query execution module 2504 of FIG. 26G can be utilized to implement the query processing system 2510 of FIG. 25A and/or any other embodiment of the query processing system 2510 discussed herein. The set intersection operator 2573 of FIG. 26G can implement the filtering operator 2523 of FIG. 26A and/or can implement any one of the filtering operators 2523.1-2523.H of FIG. 26F.

In particular, the set intersection operator 2573 of FIG. 26G is operable to handle exception columns 2560 generated by an expression evaluation operator 2524 that was pushed down before the set intersection operator in generating of the query operator execution flow. In this example, the set intersection operator 2573 of FIG. 26G does not check the exception columns 2560, for example, based on not having an exception column check flag 2533 turned ON and/or based on being performed before another filtering operator 2523 that is designated to perform the exception column check as discussed in conjunction with FIG. 26F. While not illustrated in FIG. 26G, the set intersection operator 2573 of FIG. 26G can be further operable to check and/or project out the exception columns 2560 as discussed in FIG. 26C, for example, when the set intersection operator is a final filtering operator of a set of filtering operators 2523.1-2523.H and/or is otherwise designated to perform the exception column check.

Whether the set intersection operator 2573 is performing the exception column check or not, the set intersection operator must be modified from its conventional execution to handle the exception column received as input. In particular, as the exception column 2565 is not an actual column of the corresponding rows and is only generated for the purposes of delaying exceptions, the exception values in these columns should not influence the output of the set intersection operator 2573, as doing so could render an incorrect query resultant.

This can be achieved via a denoted set of one or more ignored columns 2570. Any columns in the input data sets 2553.A and 2553.B to the set intersection operator 2573 that are denoted as ignored columns 2570 for the set intersection operator 2573 are thus ignored by the set intersection operator when determining output data set 2554 as the set interaction of input data sets 2553.A and 2553.B. In particular, rather than operating conventionally by using every column in the input data sets 2553.A and 2553.B to perform a hash computation to check for duplicates where these duplicates correspond to rows to of the set intersection of these input data sets to be included in the output, the set intersection operator 2573 can perform modified functionality by not utilizing the one or more ignored columns 2570 when performing this hash computation to check for duplicates. In some embodiments, other types of set operators that perform hash computations upon all column values of one or more input sets of rows can similarly be modified to not perform these hash computations upon a denoted one or more ignored columns 2570.

The ignored columns 2570 for one or more set intersection operators 2573 and/or one or more other operators 2520 optionally can be determined by the operator flow generator module 2514 and/or can be indicated as metadata or other information in the resulting operator execution flow 2517. The ignored columns 2570 can be denoted based on names of the corresponding columns or other identifiers of the corresponding columns.

In this case, the ignored columns 2570 denotes the exception column 2565. For example, the name of the exception column 2565 and/or other information identifying the exception column 2565 can be utilized by the set intersection operator 2573 and/or can be included in a set of ignored columns 2570 communicated to the set intersection operator 2573 and/or indicated in metadata of the query operator execution flow 2517. In particular, to ensure that all necessary exception values are preserved and eventually checked, the operator flow generator module 2514 can determine and exception column 2565 be indicated as ignored columns 2570 for one or more set intersection operators 2573 of the query operator execution flow 2517 based on these one or more set intersection operators 2573 being serially after one or more corresponding expression evaluation operators 2524 that generate exception columns, and based on these one or more set intersection operators 2573 being serially before a final filtering operator designated to check these exception columns.

Based on the ignored columns 2570 of the set intersection operator 2573 indicating the exception column 2565, the exception column is thus not utilized by the set intersection operator 2573 in generating its output data set 2554 as the set intersection of input data sets 2553.A and 2553.B. In the example illustrated in FIG. 26G, input data set 2553.A includes row A.1 with a colA value of 1, a colB value of 10, and an exception value 1660 of 0. Input data set 2553.B includes row B.3 with a colA value of 1, a colB value of 10, and an exception value 1660 of −1. If the set intersection operator 2573 was performed conventionally, these rows would not render an intersection between input data set 2553.A and 2553.B based on having different exception values, and thus not having all columns with equal values.

However, by ignoring the exception column 2565 of each of these input data sets 2553 based on the exception column 2565 being indicated as an ignored column 2570, only colA and colB values are evaluated, and the intersection is thus generated to include a row with a colA of value 1 and a colB value of 10. Note that other rows with equal column values, including equal exception values 2560, are also included in the set intersection, even though their exception values 2560 were ignored and did not influence their inclusion in the set intersection.

As illustrated in FIG. 26G, the set intersection operator 2573 can further preserve the exception columns 2565 of one or both input data sets in the output, despite these exception columns 2565 being ignored by the set intersection operator 2573. This can be important when these exception columns 2565 still need to be checked by a filtering operator 2523 that is serially after the set intersection operator 2573 in the operator execution flow 2517.

In the example illustrated in FIG. 26G, both exception values 2560 for each duplicate pair of rows are included in output data set 2554. The output data set 2554 can thus include two exception columns and/or a single exception column with an exception value expressed as a tuple indicating both exception values 2560. In such embodiments, a subsequently performed filtering operator 2523 that is denoted to check the exception column can check all exception values 2560 indicated for every row, such as both exception values 2560 indicated in output data set 2554, to ensure that any error in performing the corresponding expression evaluation operator 2524 is checked.

In some cases, only the lowest of the two exception values of a pair of rows rendering intersection is included in output data set 2554. This renders a single exception column in the intersection operator's output data set 2554, where each row still has only one exception value 2560. This mechanism can be guaranteed to preserve the instance of any errors in the corresponding rows of either input data set 2553.A and 2553.B when the errors are always indicated as negative exception values 2560 and when no error is always indicated an exception value 2560 of zero, while only requiring one exception column be passed to the next operator.

In some cases, only one of the input data sets 2553.A or 2553.B has an exception column. For example, input data sets 2553.A includes an exception column and input data set 2553.B does not include an exception column based on an expression evaluation operator 2524 denoted to generate an exception column being performed in a first parallelized track of the query operator execution flow 2517 that renders generation of input data sets 2553.A, and based on no expression evaluation operator 2524 denoted to generate an exception column being performed in a second parallelized track of the query operator execution flow 2517 that renders generation of input data sets 2553.B. In such cases, the exception column of input data sets 2553.A is ignored, and is not ignored for input data sets 2553.B based on input data set 2553.B not having the exception column.

In various embodiments, a query processing system includes at least one processor and a memory that stores operational instruction. The operational instructions, when executed by the at least one processor, cause the query processing system to receive a query expression for execution indicating a filtering operator and further indicating an expression evaluation for performance upon output of the filtering operator. An operator execution flow for the query expression that includes a serialized ordering of a plurality of operators indicating performance of the filtering operator serially after performance of the expression evaluation is generated, and execution of this operator execution flow is facilitated. Facilitating execution of the operator execution flow can include generating an exception column indicating an exception value generated for each of a set of rows based on performing the expression evaluation upon the each of the set of rows, and/or applying the filtering operator of the operator execution flow. Applying the filtering operator of the operator execution flow can include identifying a subset of the set of rows that meet filtering parameters of the filtering operator. When the exception value of at least one of the subset of the set of rows indicates an error condition in performing the expression evaluation, execution of the operator execution flow can be aborted. When the exception value of every one of the subset of the set of rows indicates no error in performing the expression evaluation, the subset of the set of rows can be outputted and execution of the operator execution flow can continue.

Figure 26J:
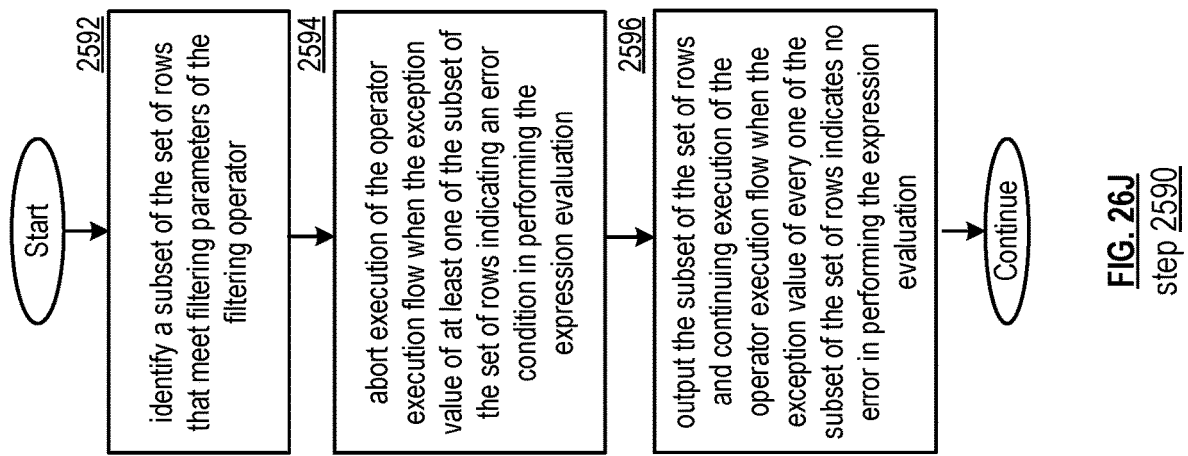
FIGS. 26H-26J are logic diagrams illustrating a method of executing a query by delaying exceptions in accordance with various embodiments of the present invention.
Figure 26I:
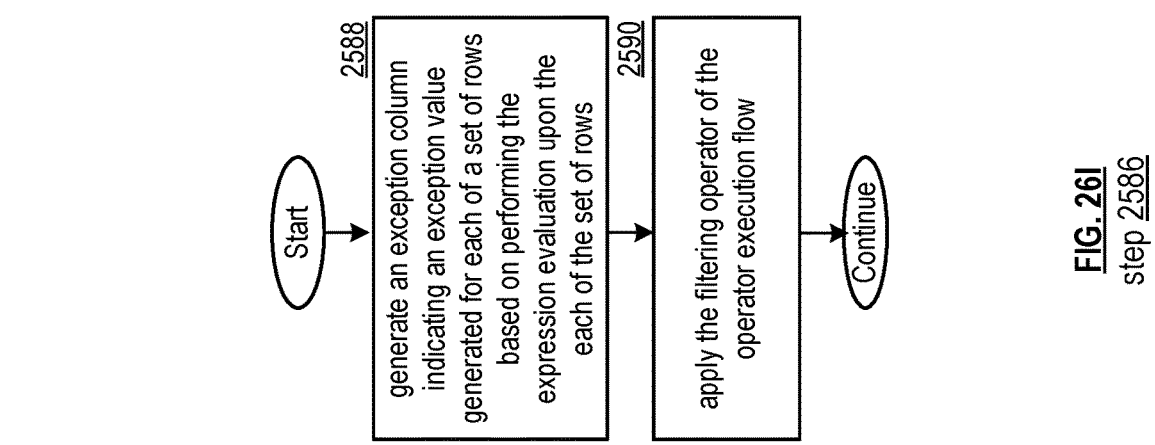
Figure 26H:
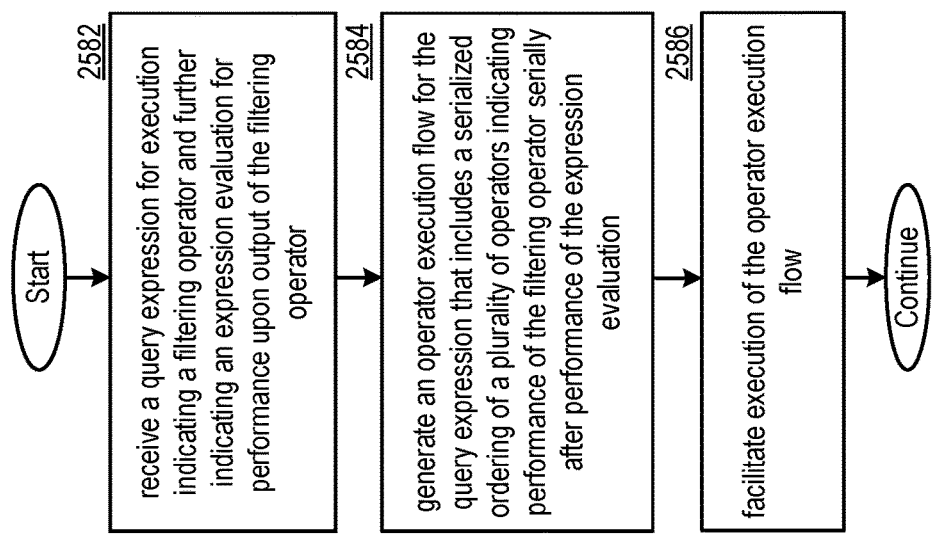

FIGS. 26H, 26I, and 26J illustrate methods for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIGS. 26H, 26I, and/or 26J. In particular, a node 37 can utilize the query processing module 2435 to execute some or all of the steps of FIGS. 26H, 26I, and/or 26J, where multiple nodes 37 implement their own query processing modules 2435 to independently execute the steps of FIGS. 26H, 26I, and/or 26J, for example, to facilitate execution of a query as participants in a query execution plan 2405. Some or all of the method of FIGS. 26H, 26I, and/or 26J can be performed by the query processing system 2510, for example, by utilizing an operator flow generator module 2514 and/or a query execution module 2504. In particular, some or all of the method of FIGS. 26H, 26I, and/or 26J can be performed via one or more operator executions of an expression evaluation operator 2524 and/or a filtering operator 2523. Some or all of the steps of FIGS. 26H, 26I, and/or 26J can optionally be performed by any other processing module of the database system 10. Some or all of the steps of FIGS. 26H, 26I, and/or 26J can be performed to implement some or all of the functionality of the query processing module 2510 as described in conjunction with FIGS. 26A-26G. Some or all of the steps of FIGS. 26H, 26I, and/or 26J can be performed to implement some or all of the functionality regarding execution of a query via the plurality of nodes in the query execution plan 2405 as described in conjunction with FIGS. 24A-24D. Some or all steps of FIGS. 26H, 26I, and/or 26J can be performed by database system 10 in accordance with other embodiments of the database system 10 and/or nodes 37 discussed herein.

Step 2582 includes receiving a query expression, such as query expression 2511, for execution indicating a filtering operator, such as filtering operator 2523, and further indicating an expression evaluation, such as expression evaluation operator 2524, for performance upon output of the filtering operator. The query expression can be received from a client device, can be generated via user input, and/or can otherwise be determined. The query expression can be in accordance with a query language such as the Structured Query Language (SQL) and/or another query language.

Step 2584 includes generating an operator execution flow, such as query operator execution flow 2517, for the query expression, for example, by utilizing the operator flow generator module 2514. The operator execution flow can include a serialized and/or parallelized ordering of a plurality of operators. This serialized ordering can indicate performance of the filtering operator serially after performance of the expression evaluation.

Step 2586 includes facilitating execution of the operator execution flow, for example, via query execution module 2504 and/or via a plurality of nodes 37 of a query execution plan 2405. Executing step 2586 of FIG. 26H can include executing some or all of the steps of FIG. 26I.

FIG. 26I presents a method of executing an operator execution flow that indicates performance of a filtering operator serially after performance of an expression evaluation. Step 2588 includes generating an exception column indicating an exception value generated for each of a set of rows based on performing the expression evaluation upon the each of the set of rows. For example, one or more exception values in the exception column can indicate an exception and/or other error in performing the expression evaluation upon a corresponding one of the set of rows. The method can include not throwing an exception and/or not aborting the query due to the exception and/or other error when identified via performance of the expression evaluation, where the exception and/or other error is only indicated in the exception column at this point in time. Step 2590 includes applying the filtering operator of the operator execution flow. Executing step 2590 of FIG. 26I can include executing some or all of the steps of FIG. 26J.

FIG. 26J presents a method of executing a filtering operator of the operator execution flow upon a set of rows after executing an exception value for each of the set of rows via execution of an expression evaluation operator. Step 2592 includes identifying a subset of the set of rows that meet filtering parameters of the filtering operator.

Step 2594 includes aborting execution of the operator execution flow when the exception value of at least one of the subset of the set of rows indicating an error condition in performing the expression evaluation. In various embodiments, aborting execution of the operator execution flow includes throwing an exception based on the exception value of the at least one of the subset of the set of rows. In various embodiments, the method further includes facilitating display, via a display device of a client device, of the exception value of the at least one of the subset of the set of rows based on aborting execution of the operator execution flow.

Step 2596 includes outputting the subset of the set of rows and continuing execution of the operator execution flow when the exception value of every one of the subset of the set of rows indicates no error in performing the expression evaluation. In various embodiments, continuing execution of the operator execution flow includes projecting out the exception column, where the subset of the set of rows does not include the exception column based on projecting out the exception column. For example, the query resultant does not include the exception column and/or the exception column is not utilized by any other operators that are serially after the filtering operator in the operator execution flow.

In various embodiments, execution of the operator execution flow is immediately aborted in response to identifying one of the set of rows that meets the filtering parameters of the filtering operator and that further has a corresponding exception value in the exception column indicating the error condition, and the execution of the operator execution flow is aborted prior to identifying all rows of the set of rows that the meet filtering parameters of the filtering operator as the subset of the set of rows. For example, the method includes determining whether the exception value of any rows in the subset of the set of rows indicates an error in performing the expression evaluation, where the query only continues via step 2596 when all rows in the subset of the set of rows indicate no error, and where the query is aborted if any of the rows in the subset of the set of rows indicates an error. In some cases, this determination is performed as incoming rows to the filtering operator are identified for inclusion in the subset of the set of rows, for example, one row at a time. For example, prior to evaluating all incoming rows outputted from a prior operator in the operator execution flow, the query is aborted based on the filtering operator identifying one of the rows for inclusion in the subset of the set of rows and further based on determining this identified row has a corresponding expression value indicating an error in performing the expression evaluation.

In various embodiments, generating the operator execution flow for the query expression includes indicating performance of an exception value check via the filtering operator, for example, via exception column check flag 2533. Applying the filtering operator of the operator execution flow can include determining whether the exception value of each one of the subset of the set of rows indicates the error condition based on the operator execution flow indicating performance of this exception value check via the filtering operator.

In various embodiments, generating the operator execution flow for the query expression includes indicating performance of the exception value check via the filtering operator is based on the query expression indicating the expression evaluation be performed upon output of the filtering operator and further based on the serialized ordering of the plurality of operators indicating performance of the filtering operator serially after performance of the expression evaluation.

In various embodiments, the operator execution flow includes a plurality of filtering operators, and the operator execution flow indicates performance of the exception value check via the filtering operator for only a proper subset of the plurality of filtering operators that includes the filtering operator. In various embodiments, the filtering operator is included in a proper subset of the plurality of filtering operators based on being identified as final one of the plurality of filtering operators in the serialized ordering of the plurality of filtering operators. In various embodiments, a second filtering operator is serially after the expression evaluation in the serialized ordering of the operator execution flow, and the second filtering operator is not included in the proper subset based on the second filtering operator being serially before the filtering operator in the serialized ordering of the operator execution flow.

In various embodiments, generating the operator execution flow for the query expression includes indicating generation of the exception column, for example, via exception column generation flag 2532. Facilitating execution of the operator execution flow can include generating the exception column based on the operator execution flow indicating generation of the exception column.

In various embodiments, the operator execution flow for the query expression includes a plurality of expression evaluations. The operator execution flow indicates generation of the exception column for a proper subset of the plurality of expression evaluations that includes the expression evaluation. The proper subset can be determined based on differences between an ordering of the plurality of evaluation expressions relative to one or more filtering operators in the query expression, and the ordering of the plurality of evaluation expressions relative to the one or more filtering operators in the operator execution flow.

In various embodiments, generating the operator execution flow for the query expression includes indicating generation of the exception column is based on the query expression indicating the expression evaluation be performed upon output of the filtering operator, and further based on the serialized ordering of the plurality of operators indicating performance of the filtering operator serially after performance of the expression evaluation.

In various embodiments, the exception value generated for at least one other row of the set of rows indicates the error condition based on performing the expression evaluation for the at least one other row. The subset of the set of rows can be outputted and execution of the operator execution flow can continue based on the at least one other row of the set of rows being included in a set difference between the set of rows and the subset of the set of rows.

In various embodiments, the filtering operator is a join operator, a limit operator, an offset operator, a select operator, and/or a set operator. In various embodiments, the expression evaluation includes a mathematical expression, Boolean expression, and/or other expression evaluated upon values in one or more columns of each row in the set of rows, for example, to render an output column for the set of rows whose values are outputted in the query resultant and/or whose values are utilized in one or more further operators of the query expression that are sequentially after the expression evaluation in the operator execution flow. In various embodiments, the expression evaluation is a type of expression that, when evaluated, can render an error and/or can render throwing of an exception.

In various embodiments, the filtering operator is a set intersection operator. Applying the filtering operator of the operator execution flow can include identifying at least one ignored column of the set intersection operator that includes the exception column, and/or can further include identifying the subset of the set of rows based on performing comparisons of a subset of columns of the set of rows that does not include the at least one ignored column.

In various embodiments, the exception value indicates a value of zero for ones of the set of rows where the error condition did not occur in performing the expression evaluation. The exception value indicates a non-zero value for ones of the set of rows where the error condition did occur in performing the expression evaluation. In various embodiments, the error condition includes at least one of a plurality of possible error condition types, and the exception value of the at least one of the subset of the set of rows indicates the at least one of the plurality of possible error condition types.

For example, the exception value indicates a negative integer value for ones of the set of rows where the error condition did occur in performing the expression evaluation, where the value of the negative integer denotes a corresponding one of the plurality of possible error condition types. As a particular example, the exception value can indicate the value of a SQLCODE for the corresponding exception and/or another predetermined value that corresponds to the at least one of the plurality of possible error condition types, for example, in accordance with the corresponding query language and/or the database system 10.

In various embodiments, a first one of the at least one of the subset of the set of rows has a first exception value indicating a first one of the plurality of possible error condition types, and second one of the at least one of the subset of the set of rows has a second exception value that is different from the first exception value and that indicates a second one of the plurality of possible error condition types. In various embodiments, the plurality of possible error condition types can include one or more user-defined error types, such as one or more user-defined exceptions for the expression evaluation, where one of the at least one of the subset of the set of rows has an exception value indicating a user-defined error type.

In various embodiments, a non-transitory computer readable storage medium includes at least one memory section that stores operational instructions. The operational instructions, when executed by a processing module that includes a processor and a memory, cause the processing module to: receive a query expression for execution indicating a filtering operator and further indicating an expression evaluation for performance upon output of the filtering operator; generate an operator execution flow for the query expression that includes a serialized ordering of a plurality of operators indicating performance of the filtering operator serially after performance of the expression evaluation; and/or facilitate execution of the operator execution flow. Facilitating execution of the operator execution flow can include generating an exception column indicating an exception value generated for each of a set of rows based on performing the expression evaluation upon the each of the set of rows; and/or applying the filtering operator of the operator execution flow. Applying the filtering operator of the operator execution flow can include identifying a subset of the set of rows that meet filtering parameters of the filtering operator; aborting execution of the operator execution flow when the exception value of at least one of the subset of the set of rows indicating an error condition in performing the expression evaluation; and/or outputting the subset of the set of rows and continuing execution of the operator execution flow when the exception value of every one of the subset of the set of rows indicates no error in performing the expression evaluation.

Figure 27A:
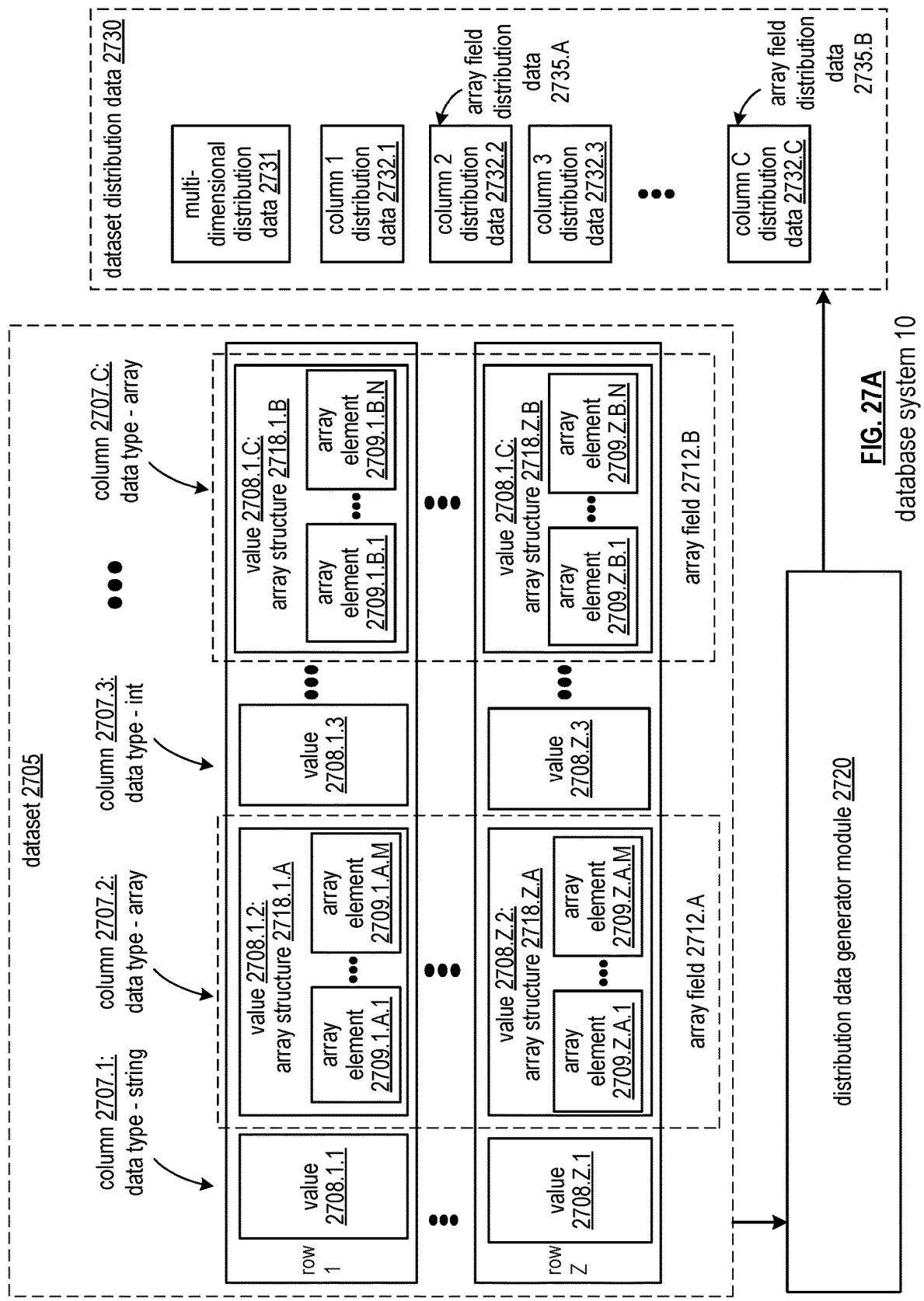
FIG. 27A illustrates an embodiment of a database system that implements a distribution data generator in accordance with various embodiments of the present invention.
Figure 27B:
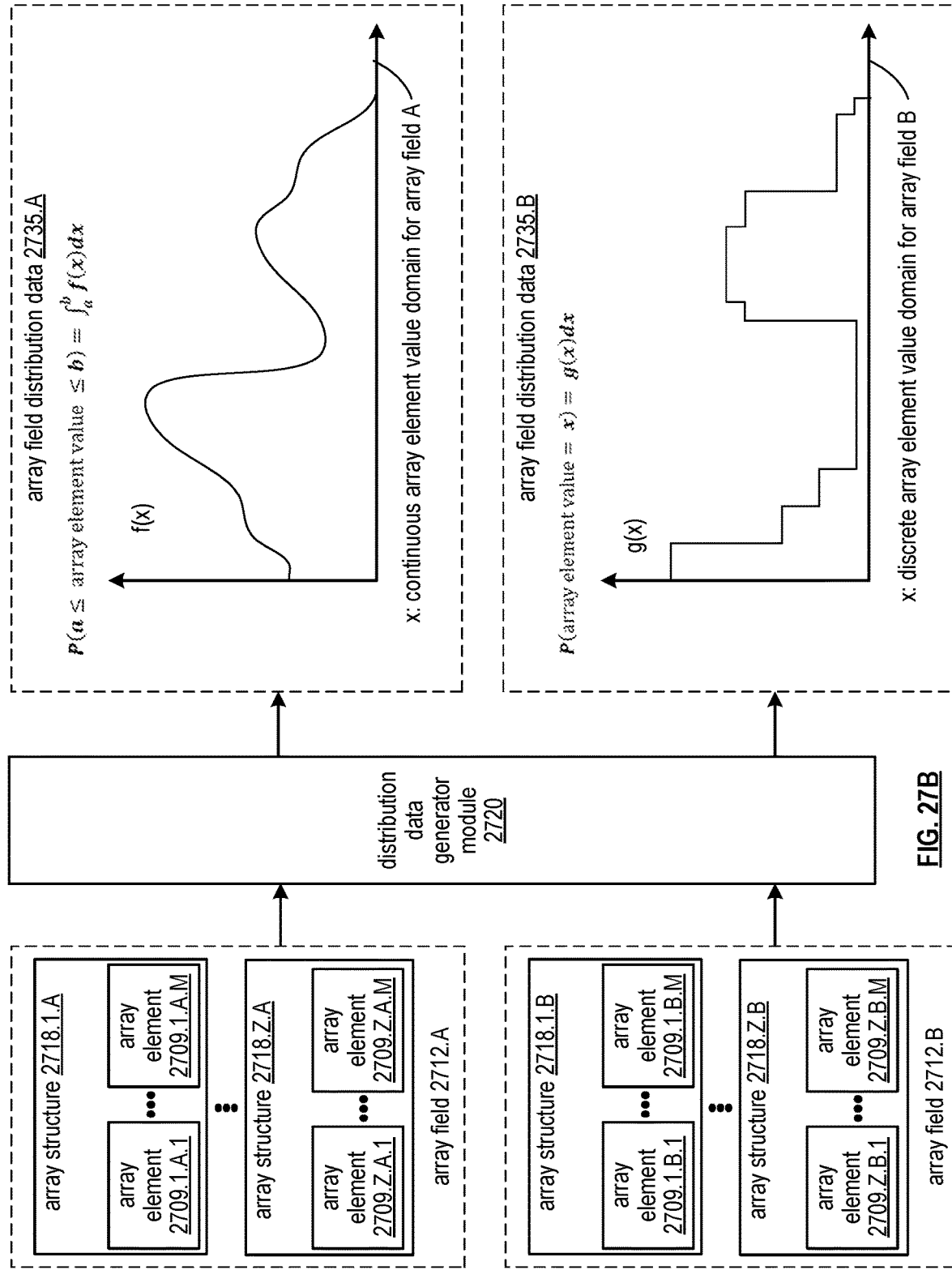
FIG. 27B illustrates an embodiment of example array field distribution data generated by a distribution data generator in accordance with various embodiments of the present invention.
Figure 27C:
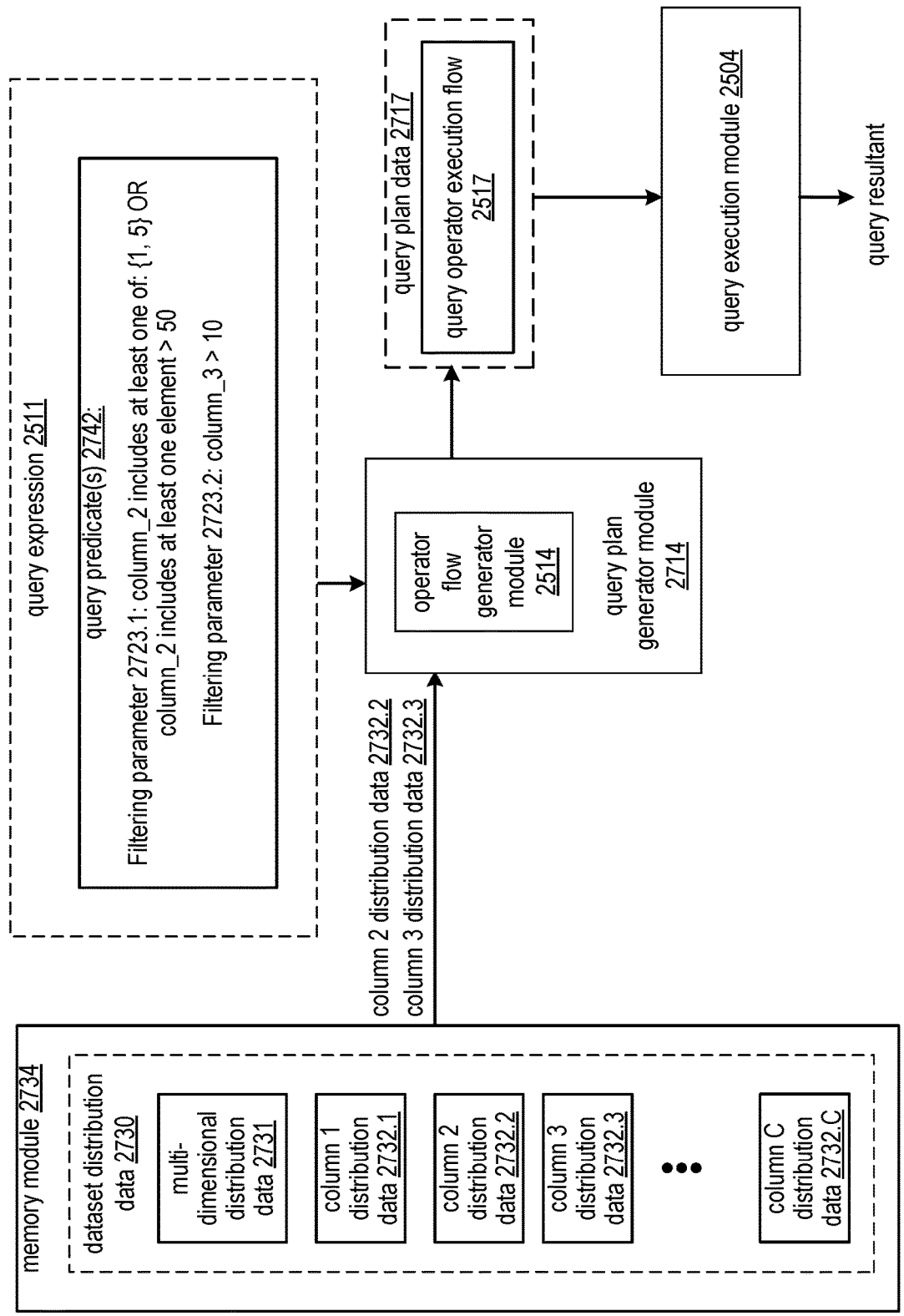
FIG. 27C illustrates an embodiment of a query processing system that stores dataset distribution data in accordance with various embodiments of the present invention.

FIGS. 27A-27C present embodiments of a database system 10 that implements a distribution data generator module 2720 that generates array field distribution data for datasets that include one or more array fields, for example, where one or more corresponding columns of the database store arrays of multiple array elements. This array field distribution data can be utilized by the database system 10 to generate query plan data to execute a corresponding query expressions based on indicating the array field in a predicate. In particular, characteristics of the array field distribution data can be leveraged in selecting query plans for incoming queries that require access to the array field to optimize and/or improve performance the execution of these queries. The embodiments of database system 10 of FIGS. 27A-27C can be utilized to implement any embodiment of the database system 10 discussed herein.

Distribution data indicating the distribution of values in various columns and/or fields of a dataset can be useful in optimizing queries performed upon the dataset. This distribution data can optionally include marginal PDFs for individual columns and/or multi-dimensional PDFs for multiple columns. For example a joint distribution PMF can be determined as P(colA==X, colB==Y) based on fraction of the Z rows having the value of X for colA and also the value of Y for colB). These multi-variable PDFs for columns values can be particularly useful in optimizing queries, especially where query predicates involve multiple columns (e.g. SELECT * where colA >10 and (colB=='A' or colB=='13')).

It can be ideal for datasets to have fields and/or columns that include data structures storing multiple values, such as arrays. One option for generating distribution data for columns that include such structures would include applying same notion of generating a PDF indicating the value of the fields, which would correspond to the exact value of the array as a whole (e.g. P(array structure=$[X_1, X_2, \ldots, X_M]$)). For example, this could include generating a multi-variable PDF indicating the probability each array element in a set of array elements of the array falls within a corresponding one of a set of ranges. This highly specific information is not very useful in optimizing queries, and is even less useful in cases where array structures are not of fixed length. In particular, it can be uncommon for common query predicates indicating filtering requirements based on whether the array structure in an array field of each of set of rows includes one or more particular values in particular indices of the array.

Instead, distribution information for these array fields can be generated in a different fashion to indicate whether a given array element of an array is likely to have a given value, whether a given array element of an array is likely to fall within a particular range of vales, whether a given value is likely to appear as one or more elements of a given array, and/or whether a value in a particular range of values is likely to appear as one or more elements of a given array. This more general information is much more useful in optimizing query plans. especially due to many common query predicates indicating filtering requirements based on whether the array structure in an array field of each of set of rows includes one or more particular values, in any order. Generating distribution data for array fields based on the distribution of values of array elements, rather than the set of values of array structures as a whole, improves database systems by enabling more intelligent query plans to be selected to improve and/or optimize query execution.

FIG. 27A illustrates a distribution data generator module 2720 of a database system 10. The distribution data generator module 2720 can be operable to generate dataset distribution data 2730 for one or more datasets 2705 that are received for storage by the database system 10, that are currently stored by the database system 10, and/or that are accessed by the database system 10 for query executions.

A given dataset 2705 can include a plurality of rows 1-Z. For example, each row is implemented as a record 2422. The plurality of rows 1-Z can be received over time as a stream or rows and/or can be received as a bulk set of rows.

A given dataset 2705 can include some or all of a same database table and/or a same set of rows with a common schema and/or common set of fields and/or columns. In this example, the dataset 2705 includes C fields as columns 2707.1-2707.0 of the dataset 2705. Each column can have a corresponding value 2708 for some or all of the set of rows 1-Z. The values 2708 for each given column can be in accordance with a particular data type of fixed and/or variable size, where different columns can be in accordance with different data types.

At least one of the columns of dataset 2705 can be designated to store array structures 2718 as its values 2708. In this example, at least two of the columns, column 2707.2 and column 2707.C, correspond to array fields 2712.A and 2712.B, and are designated to store array structures 2718. Some or all array structures 2718 can include a plurality of array elements 2709. For example, a given array element 2709 of an array structure 2718 has a corresponding value as a primitive data variable, a literal, a data object, a data structure, and/or other data, for example, that can be expressed as a singular value. Array structures 2718 can be implemented as arrays, matrices, and/or array constructs of any dimension. Array structures 2718 can be implemented as lists, sets, tuples, objects, and/or other data structures that store multiple elements. The set of array element 2709 of the array structure 2718 can be ordered and/or unordered. For example, the array structures 2718 can be implemented as an ordered list, where its array elements are accessed and/or denoted via a corresponding one of a set of indexes.

A given array fields 2712 can require that corresponding array structures be of a fixed size, and/or can include array structures of variable sizes. For example, a first array field 2712 requires that all of its array structures 2718.1-2718.Z include exactly 5 array elements, while a second array field 2712 allows different ones of its array structures 2718.1-2718.Z to include different numbers of array elements. In this example, all of the array structures 2718.1.A-2718.Z.A of array field 2712.A include exactly M array elements, and all of the array structures 2718.1.B-2718.Z.B of array field 2712.B include exactly N array elements, where N can be the same as or different from M.

A given array field 2712 can require that all array structures each include elements of a particular type and/or a same primitive type. For example, a first array field 2712 requires that all of its array structures 2718.1-2718.Z include a set of integer values, while a second array field 2712 requires all of its array structures 2718.1-2718.Z to include a set of string values.

Alternatively, the given array field 2712 can require a given array structure includes all array elements as a same type, but allows different array structures to include array elements of different types. For example, array field 2712 can include a first array structure 2718 that includes a set of float values as its set of array elements 2709, first array structure 2718 that includes a set of Boolean values as its set of array elements 2709. Alternatively, the given array field 2712 allow a given array structure to include different array elements of different types. For example, array field 2712 can include an array structure 2718 that includes one string value and one integer value.

In some embodiments, the dataset 2705 can be stored across a plurality of more segments 2424 across one or more nodes 37 and/or one or more computing devices 18, for example, where the segments are generated in a same or similar fashion as discussed in conjunction with FIGS. 15-23. In such cases, the corresponding dataset distribution data 2730 reflects global distribution data for records 2422 of the dataset 2705 as a whole, and can be generated prior to a plurality of segments being generated from a corresponding plurality of rows 1-Z of the dataset and/or can be generated based on accessing the plurality of segments being generated in storage, such as in a memory drives 2425 of corresponding nodes 37.

Alternatively or in addition, the dataset 2705 corresponds to a set of rows stored in a single segment 2424, stored in a single node 37 of a single computing device 18. This segment can be generated from a subset of rows that are part of a larger dataset, for example, where the segment is generated in a same or similar fashion as discussed in conjunction with FIGS. 15-23. In such cases, the corresponding dataset distribution data 2730 reflects local distribution data for the segment 2424, where different segments of a same database table have different local distribution data. This dataset distribution data 2730 can be generated when the corresponding segment is generated from a corresponding plurality of rows 1-Z and/or can be generated based on accessing the segment in storage, such as in a memory drives 2425 of corresponding nodes 37.

The distribution data generator module 2720 can be operable to generate column distribution data 2732 for some or all columns 2707 of the dataset 2705. The column distribution data 2732 a given column 2707 can indicate an empirical and/or probabilistic distribution of values 2708 of the given column 2707, for example, based on the respective values 2708 of the column 2707 for some or all the set of rows 1-Z of the dataset 2705. The column distribution data 2732 can be generated via different distribution schemes based on whether the corresponding column stores a singular value, or an array of multiple values.

A first type of distribution scheme can be utilized to generate the column distribution data for some or all columns 2707 that store singular values as its values 2708, such as primitive data types, strings, and/or other data objects that can be expressed as a single value and/or that is best expressed as a single value. For example, column 1's distribution data 2732.1 and column 3's distribution data 2732.3 are generated via this first type of distribution scheme based on column 1 and column 3 having data types of string and int, respectively.

In some embodiments, the corresponding column distribution data 2732 generated via this first type of distribution scheme can indicate a set of probabilities that a given row's column 2707 has a value 2708 that is equal to each of a set of values 2708, and/or can indicate a probability that a given row's column 2707 has a value 2708 that falls within a given range of values. For example, the corresponding column distribution data 2732 generated via this first type of distribution scheme can indicate a probability mass function (PMF) and/or a probability density function (PDF) of the given column, for example, based on a proportion of rows 1-Z with each of a possible set of values 2708, and/or with values 2708 that fall within different ranges of values, for the corresponding column. In particular, the value 2708 of the given column can be utilized as the random variable for the PMF and/or PDF of the column distribution data 2732. The proportion of rows 1-Z with each of a possible set of values 2708 for a given column can be determined based on utilizing values stored in all rows 1-Z for the given column. Alternatively, as the dataset 2705 may be very large and thus computationally expensive to iterate over to determine empirical distribution data as a histogram and/or based on the actual proportions, the dataset 2705 can be sampled, for example, via a statistical process, where only a proper subset of rows 1-Z have their corresponding values utilized for a given column to determine the dataset distribution data 2730.

In some embodiments, applying the first type of distribution scheme can further include generating multi-dimensional distribution data 2731 for multiple ones of the columns storing singular values. For example, the multi-dimensional distribution data 2731 can indicate joint distribution data and/or conditional distribution data, such as a joint PMF, a joint PDF, one or more conditional PMFs, one or more conditional PDFs, another multi-variable distribution, and/or other distribution data that utilizes multiple random variables and/or involves multiple columns. In particular, the values 2708 of each of a set of multiple columns storing singular values can be utilized as the set of random variables for the joint PMF and/or a joint PDF. As another example, a conditional PMF and/or conditional PDF for a given column can be expressed based on the probability that the value of the given column has a particular value, conditioned on the values of one or more other columns. Each column can optionally have one or more of its own conditional PMFs and/or conditional PDFs. The multi-dimensional distribution data 2731 can include other distribution data, covariance data, correlation data, and/or other information denoting dependencies and/or relationships between values of different columns for rows of the dataset 2705.

The column distribution data 2732 for columns 2707 that store array structures 2718 can be generated differently than column distribution data 2732 for rows that store array structures 2718. A second type of distribution scheme can be utilized to generate the column distribution data for some or all columns 2707 correspond to an array field 2712 and/or that otherwise store multiple elements and/or are best expressed as multiple, distinct values. For example, column 2 distribution data 2732.2 and column C distribution data 2732.0 are generated via this second type of distribution scheme based on column 2 and column C being array fields 2712. The second type of distribution scheme can be different from the first distribution scheme.

Rather than applying the first type of distribution scheme, for example, where the column distribution data 2732 would indicate the probability that a given array structure is equal to a particular ordered and/or unordered set of array element values, applying the second type of distribution scheme can render column distribution data 2732 that simply indicates the probability that a given array element 2709 of a given array structure 2718 is equal to a particular value and/or falls within a particular range. While differences in distribution for different indices of the array structures is lost in utilizing the second type of distribution scheme, this differentiation is not necessarily important when the values of different indices are distributed in a similar fashion and/or when query predicates generally do not filter based on values for particular array indices. In particular, applying this second type of distribution scheme can be preferred in cases where common query predicates correspond to set-based query predicates for the array elements, where the array structure is treated as an unordered set of elements.

For example, this array field distribution data 2735. for a given array field 2712 generated via this second type of distribution scheme can indicate a probability mass function (PMF) and/or a probability density function (PDF) for values of array elements 2709 of the array structure 2718 of the given array field 2712. This can be determined, for example, based on a proportion of all array elements across the array structures 2718 of all rows 1-Z for the given array field 2712 with each of a possible set of values, and/or with values that fall within different ranges of values. In particular, the value of a given array element 2709 of a given array structure 2718 in a particular column 2707 can be utilized as the random variable for the PMF and/or PDF of the column distribution data 2732 for the particular column 2707. The proportion of array elements 2709 across the array structures 2718 of all rows 1-Z for the given array field 2712 with each of a possible set of array element values can be determined based on utilizing all values stored in all array elements 2709 for all rows 1-Z for the given array field 2712. Alternatively, as the dataset 2705 may be very large and thus computationally expensive to iterate over to determine empirical distribution data as a histogram and/or based on the actual proportions, the dataset 2705 can be sampled, for example, via a statistical process, where only a proper subset of array elements 2709 1-Z have their corresponding values utilized for a given array field to determine the array field distribution data 2735.

In some embodiments, the multi-dimensional distribution data 2731 further includes and/or is based on these PMFs and/or PDFs of the array field distribution data 2735 of one or more array fields 2712. For example, the multi-dimensional distribution data 2731 can indicate joint distribution data and/or conditional distribution data, such as a joint PMF, a joint PDF, one or more conditional PMFs, one or more conditional PDFs, another multi-variable distribution, and/or other distribution data that utilizes multiple random variables including the random variable for the value of array elements 2709 of a given array field 2712, and/or involves multiple columns including one or more array fields 2712.

The distribution data generator module 2720 can be implemented via one or more computing devices 18 and/or one or more other processing modules and/or memory modules of the database system 10. For example, the distribution data generator module 2720 can be implemented utilizing the parallelized data input sub-system 11 to generate distribution data for sets of rows received in a dataset all at once and/or received in a dataset as a stream over time. As another example, the distribution data generator module 2720 can be implemented utilizing the parallelized query and results sub-system 13 to generate distribution data for stored datasets utilized to process query requests received by the database system over time.

In some embodiments, one or more individual computing devices 18 and/or nodes 37 implement their own distribution data generator module 2720, for example, upon their own subsets of a plurality of rows that they each respectively receive and/or store in their memory drives 2425. For example, when the dataset 2705 corresponds to rows of a given segment 2424 and/or the distribution data 2730 corresponds to local distribution data for the given segment 2424, a corresponding node 37 that generates the segment and/or that stores the segment 2424 can implement its own distribution data generator module 2720 to generate the dataset distribution data 2730 for the segment 2424. As a particular example, some or all of the dataset distribution data 2730 of a given segment can implement some or all of the statistics section of the given segment 2424 for storage in conjunction with the given segment 2424 as illustrated and discussed in conjunction with FIG. 23.

FIG. 27B illustrates a particular example of array field distribution data 2735 that is generated for one or more corresponding array fields 2712 via distribution data generator module 2720. Some or all features and/or functionality of the distribution data generator module 2720 and/or the array field distribution data 2735 of FIG. 27B can be utilized to implement the distribution data generator module 2720 and/or the array field distribution data 2735 of FIG. 27A, and/or any other embodiments of the distribution data generator module 2720 and/or the array field distribution data 2735 discussed herein.

In this example, array field distribution data 2735.A and 2735.B is generated by the distribution data generator module 2720 for the respective array fields 2712.A and 2712.B based on applying the second type of distribution scheme. Other column distribution data 2732 can optionally be generated for other ones of the set of columns 1-C, for example, based on applying the second type of distribution scheme.

In this example, the array field distribution data 2735.A is implemented as a PDF for values of the array elements 2709 in array structures 2718 of array field 2712.A. For example, the PDF is implemented in this case due to the domain of values for array elements array structures 2718 of array field 2712.A corresponding to a continuous variable with an infinite, or extremely large, set of options. The probability that the value that an array element 2709 included in array structures 2718 of array field 2712 falls within a range of values bounded by a first value a and a second value b can be expressed as:

$$P(a \leq \text{array element value} \leq b) = \int_a^b f(x)dx$$

The PDF function f(x) can be determined based on the values for some or all array elements 2709 for some or all rows 1-Z for the given array field 2712 as discussed previously. The distribution indicated by f(x) in FIG. 27B serves as an illustrative example, and other PDF functions f(x) can have any other types of distribution.

In this example, the array field distribution data 2735.B is implemented as a PMF for values of the array elements 2709 in array structures 2718 of array field 2712.B. For example, the PMF in this case is implemented due to the domain of values for array elements array structures 2718 of array field 2712.A corresponding to a discrete variable with a discrete set of options. The probability that the value that an array element 2709 included in array structures 2718 of array field 2712 is equal to a particular value x can be expressed as:

$$P(\text{array element value} = x) = g(x)$$

The PMF function g(x) can be determined based on the values for some or all array elements 2709 for some or all rows 1-Z for the given array field 2712 as discussed previously. The distribution indicated by g(x) in FIG. 27B serves as an illustrative example, and other PMF functions g(x) can have any other types of distribution. Note that in some embodiments, all array field distribution data 2735 for all array fields are implemented as PDFs. In other embodiments, all array field distribution data 2735 for all array fields are implemented as PMFs.

In some embodiments, the array field distribution data 2735 can alternatively or additionally include and/or otherwise indicate distribution information indicating the probability that a given array structure includes at least one array element with a given value, and/or includes at least one array element with a value that falls within a given range of array element values. This information can be useful in optimizing query plans for queries with set-based query predicates for the array field, which can be a common type of query predicates. These set-based query predicates can filter rows based on whether their array structures include one or more particular values as array elements.

In cases where the second type of distribution scheme applied to an array field includes generating a PMF and/or PDF for the values of array elements in array structures of the array field, this PMF and/or PDF can be utilized to derive distribution data indicating the probability that a given array structure includes at least one array element with a given value, and/or includes at least one array element with a value that falls within a given range of array element values, for example, as part of applying the second type of distribution scheme.

For example, the array elements of array structures can be treated as independently and identically distributed (i.i.d) random variables. This assumption of the array elements as i.i.d variables can be utilized to derive the probability that a given array structure includes at least one array element with a given value, and/or includes at least one array element with a value that falls within a given range of array element values from the PDF and/or PMF function for the array field distribution data 2735.

Consider the case where a PMF for a particular array field 2712 is generated for random variable X, where random variable X corresponds to the random variable for value that a given array elements in a given array structure of this array field. The probability that X equals x, for any possible value x for array elements in the array field, can be determined based on an empirical distribution of array element values across all rows, as discussed previously. This PMF can thus indicate probability that a given array element 2709 has value of x. For example, P(X=x)=proportion of the M*Z total array elements with values equal to x).

The probability that X is included as an array element in a given array structure can be derived as a function of this PMF based on the i.i.d. assumption:

$P(\text{array structure includes at least one array element } 2709.i \text{ with value } x)$ $= 1 - P(\text{array includes no array elements } 2709.i \text{ with value } x)$
$= \prod_{i=1}^{M} P(\text{array element } 2709.i\,!= x)[\text{using } i.i.d. \text{ assumption}]$
$= 1 - PP(\text{array element } 2709\,!= x)^{\wedge}M[\text{using } i.i.d. \text{ assumption}]$
$= 1 - (1 - P(X = x))^{\wedge}M$ Note that the value of M can be equal to the length of the array structure if the given array field requires array structures be of a fixed length, as illustrated in FIG. 27A. Alternatively, if the array structures of the given array field are variable length, the value of M can be equal to mean length across all lengths of array structures in the given array field. The probability that an array structure has at least one array element with a value within a given range can be derived from a PDF of random variable X in a similar fashion.

In other embodiments, rather than deriving this probability that an array structure has at least one array element with a given value, and/or with a value within a particular range from the PMF and/or PDF for random variable X utilizing the i.i.d assumption, this probability that an array structure has at least one array element with a given value can be determined directly from the dataset. For example, a distribution/mapping indicating the probability that a given array will include an array element with each of a set of values can be determined directly from the rows 1-Z of the dataset. In particular, the probability P(value x is included in given array)=proportion of the Z total array structures 2718 with at least one array element 2709 with value x. The distribution for this set of probabilities across all possible array element values for the array field can optionally be generated as the array field distribution data 2735 instead of and/or in addition to the PMF and/or PDF for random variable X.

FIG. 27C illustrates an embodiment of a query processing system 2510 that utilizes dataset distribution data 2730 to generate query plan data 2717 utilized to execute queries. Some or all features and/or functionality of the query processing system 2510 of FIG. 27C can be utilized to implement the query processing system 2510 of FIG. 25A and/or any other embodiment of the query processing system 2510 discussed herein.

The query processing system 2510 can include and/or access one or more memory modules 2734 that stores one or more dataset distribution data 2730 for one or more corresponding datasets 2705. For example, the distribution data generator module 2720 of FIG. 27A can facilitate storage of its generated distribution data 2730 in memory module 2734 based on generating the distribution data generator module 2720. The one or more memory modules 27314 can be implemented as memory drives 2425 of one or more nodes 37; can be implemented as disk memory 38 and/or main memory 40 of one or more computing devices 18; and/or can be implemented utilizing any other memory resources of the database system 10 accessible by the query processing system 2510.

The dataset distribution data 2730 of FIG. 27C can be generated by the distribution data generator module 2720 of FIGS. 27A and/or 27B from the example dataset 2705 of FIG. 27A. The dataset distribution data 2730 of FIG. 27C can be implemented utilizing some or all features of the dataset distribution data 2730 of FIG. 27A. The column distribution data 2732 of column 2 and/or column C can be generated as array field distribution data 2735, for example, as discussed in conjunction with FIG. 27C.

For a given query expression 2511, a query plan generator module 2714 can generate query plan data 2717 that is utilized by query execution module to execute the corresponding query and generate a query resultant. The query plan generator module 2714 can be implemented via one or more computing devices 18 and/or via other processing resources and/or memory resources of the query processing system 2510.

The query plan generator module 2714 can be implemented utilizing the query operator execution flow 2517 of FIG. 25A, where the query plan data 2717 includes and/or is based on the corresponding query operator execution flow 2517 as discussed previously. The query plan generator module 2714 can optionally generate other information relevant to execution of the query, such as assignment of nodes 37 for participation in a corresponding query execution plan 2405 and/or assignment to these participating nodes to one or more levels of the query execution plan. The query plan generator module 2714 can optionally sub-divide the query operator execution flow 2517 into a plurality of discrete portions for performance by nodes at different levels of the query execution plan 2405, where the assignment of each node to their respective query operator execution flow 2433 is indicated in by the query plan data 2717.

The query plan generator module 2714 can optionally select the query plan data 2717, such as the query operator execution flow 2517, the assignment of nodes to query execution plan 2405, and/or sub-dividing of the query operator execution flow 2517 into sub-flows, such as the query operator execution flows 2433 assigned to each level of the query execution plan 2405, from a plurality of valid options that would each render correct execution of the query. In particular, the query plan generator module 2714 can implement an optimizer and/or can otherwise intelligently select some or all of these portions of the query plan data 2717 to: minimize and/or improve processing resources required to execute the query; minimize and/or improve memory resources required to execute the query; minimize and/or improve execution time required to execute the query; minimize and/or improve computational complexity required to execute the query; minimize and/or improve the number of nodes 37 required to participate in execute the query via query execution plan 2405; minimize and/or improve the number or rows required and/or expected to be processed in each operator execution of the query operator execution flow 2517; arrange the query operator execution flow 2517 based on applying filtering operators expected to filter a larger number of rows before applying filtering operators expected to filter a smaller number of rows; and/or based on other optimizations and/or improvements to the query execution.

The dataset distribution data 2730 can be utilized by the query plan generator module 2714 in selecting the query plan data 2717 intelligently. For example, information regarding the distribution of values of various columns indicated by dataset distribution data 2730 and/or correlations between columns can be highly relevant in determining and/or estimating which filtering parameters specified by query predicates of the query expression will filter out the most columns. The query plan generator module 2714 can determine which filtering parameters that will be applied via one or more filtering operators, such as a join operator, a limit operator, an offset operator, a select operator, and/or a set operator, are expected to output small proportions of the set of rows and/or which filtering parameters that will be applied via one or more filtering operators are expected to output large proportions of the set of rows based on the column distribution data 2732 of dataset distribution data 2730 for one or more individual columns indicated in these various filtering parameters and/or based on multi-dimensional distribution data for a set of columns indicated in these various filtering parameters. Filtering operators that are expected to output small proportions of the set of rows can optionally be arranged before filtering operators that are expected to output large proportions of the set or rows, for example, to minimize the total number of operator executions required; to minimize the amount of memory required to store operator input data sets 2522, and/or to minimize the amount of data blocks being passed between nodes 37 of the query execution plans 2405.

As another example, information regarding the distribution of values in particular segments 2424 can be highly relevant in determining and/or estimating which segments storing rows of the dataset that need be accessed to execute the query. In some cases, a subset of segments can be determined to not store any rows meeting specified parameters of the query expression based on the dataset distribution data 2730, such a local distribution data generated for a plurality of segments of the dataset 2705. In such cases, the query plan generator module 2714 can indicate that this subset of segments need not be read at all via query execution module 2405, despite including rows of the specified dataset 2705.

The query predicates 2742 of a given query expression can optionally filter rows based on characteristics of the array structures included in one or more columns. For example, the query predicates 2742 can filter rows in the dataset 2705 based on at indicating selection of only rows with array structures 2718 that include: every value in a given list of literals identified in the query predicate as one or more of its array elements 2709; at least one value in a given list of literals identified in the query predicate as one or more of its array elements 2709; no values in given list of literals identified in the query predicate in its array elements 2709; and/or not all of the values in the given list of literals identified in the query predicate in its array elements 2709. In some cases, the query predicate indicates selection and/or filtering of rows in the dataset based on indicating selection of only rows with array structures that include values for array elements a one or more specified indexes of the array structure that meet criteria indicated in the query predicate. These set-based query predicates can optionally correspond to common types of query predicates performed upon the dataset.

In this example, the query predicates 2742 can indicate a first filtering parameter 2723.1 for rows outputted and/or processed by the query, requiring that the array structure in column 2 include either the value 1 or the value 5 as at least one of its array elements, or includes at least one element >50. The query predicates 2742 can indicate a second filtering parameter 2723.2 for rows outputted and/or processed by the query, requiring that the value 2708 of the integer stored in column 3 be greater than ten. The column 2 distribution data 2732.2 and/or column 3 distribution data 2732.3 of dataset distribution data 2730 can be utilized by the query plan generator module 2714 in selecting the query plan data 2717 based on the query predicates indicating column 2 and column 3. The multi-dimensional distribution data 2731 can optionally be utilized, for example, if the multi-dimensional distribution data 2731 involves both column 2 and column 3.

For example, if the first filtering parameter 2723.1 is expected to filter more rows than the second filtering parameter 2723.2, the query plan generator module 2714 can generate the query operator execution flow 2517 such that a first filtering operator corresponding to the filtering parameter 2723.1 can be applied to filter rows via access to values of column 2 serially before a second filtering operator corresponding to the filtering parameter 2723.1. The query plan generator module 2714 can perform other optimizations and/or further utilize the column 2 distribution data 2732.2 and/or column 3 distribution data 2732.3 in generating the resulting query plan data 2717.

In various embodiments, a database system includes at least one processor and a memory that stores operational instructions. The operational instructions, when executed by the at least one processor, cause the database system to generate array field distribution data for an array field of a dataset. A query expression is received for execution that includes a query predicate indicating the array field of the dataset. The array field distribution data is utilized for the array field to generate a query plan data for the query expression based on the query expression including the query predicate indicating the array field. Execution of the query expression is facilitated in accordance with the optimized query plan data.

Figure 27D:
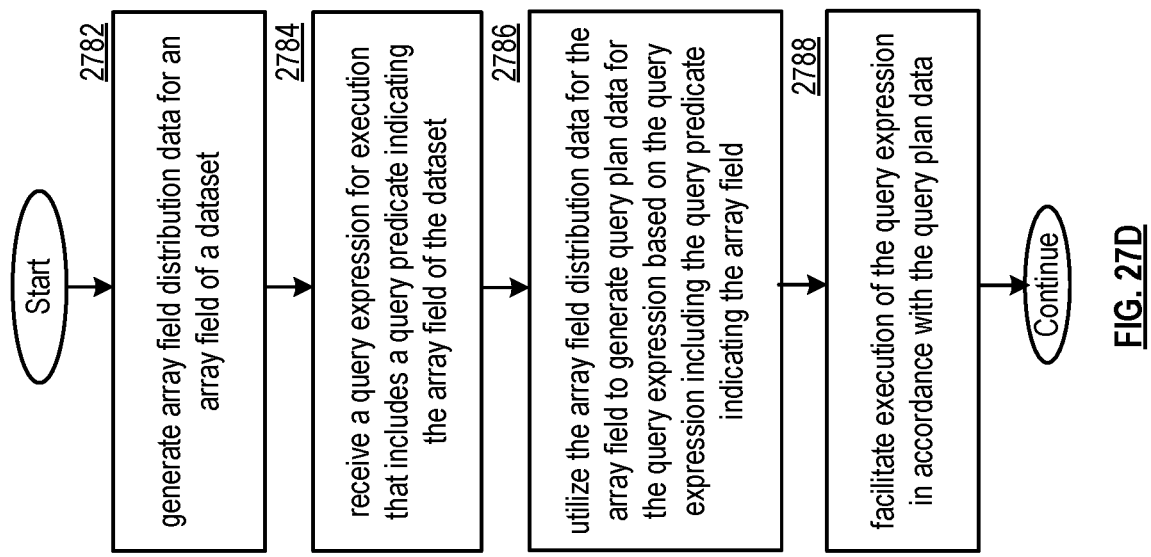
FIG. 27D is a logic diagram illustrating a method of utilizing array field distribution data in accordance with various embodiments of the present invention.

FIG. 27D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27D. In particular, a node 37 can utilize the query processing module 2435 to execute some or all of the steps of FIG. 27D, where multiple nodes 37 implement their own query processing modules 2435 to independently execute the steps of FIG. 27D, for example, to facilitate execution of a query as participants in a query execution plan 2405 based on query plan data 2717. Some or all of the method of FIG. 27D can be performed by the query processing system 2510, for example, by utilizing a query plan generator module 2714 and/or a query execution module 2504. Some or all of the method of FIG. 27D can be performed by a distribution data generator module 2720 and/or can be performed based on accessing dataset distribution data 2730 that was generated by a distribution data generator module 2720 and/or that is stored in a memory module 2734. Some or all of the steps of FIG. 27D can optionally be performed by any other processing module of the database system 10. Some or all of the steps of FIG. 27D can be performed to implement some or all of the functionality of the distribution data generator as described in conjunction with FIGS. 27A and/or 27B. Some or all of the steps of FIG. 27D can be performed to implement some or all of the functionality of the query processing module 2510 as described in conjunction with FIG. 27C. Some or all steps of FIG. 27D can be performed by database system 10 in accordance with other embodiments of the database system 10 and/or nodes 37 discussed herein.

Step 2782 includes generating array field distribution data for an array field of a dataset. In various embodiments, the dataset includes a plurality of rows that each include one of a plurality of array structures for the array field of the dataset, wherein each of the plurality of array structures includes a corresponding set of array elements; and wherein the array field distribution data is generated based on a distribution of values included in each corresponding set of array elements of a plurality of sets of array elements corresponding to the plurality of rows of the dataset.

In various embodiments, generating the array field distribution data for the array field of the data set is based on generating statistical data indicating values of array elements included in array structures of the array field. In various embodiments, generating the array field distribution data includes generating probability density function (PDF) data for the array field of the data set, such as a single dimensional PDF corresponding to the value of individual array elements as the random variable. In various embodiments, generating the PDF data for the array field of the data set is based on sampling a proper subset of values of array elements included in array structures of the array field. In various embodiments, generating the PDF data for the array field of the data set is based on all values of array elements included in array structures of the array field.

In various embodiments, the array field distribution data indicates a first plurality of probabilities, where each probability of the first plurality of probabilities indicates the probability that a given array element of a given array structure has a corresponding one of a plurality of possible array element values. In various embodiments, the array field distribution data alternatively or additionally indicates a second plurality of probabilities, where each probability of the second plurality of probabilities indicates the probability that an array structure includes an array element of a corresponding one of a plurality of possible array element values. In various embodiments, the second plurality of probabilities is derived from the first plurality of probabilities.

In various embodiments, the first plurality of probabilities and/or the second plurality of probabilities are independent of a plurality of indices of the array structure and/or are independent of an ordering of the array structure. In various embodiments, the values of array elements at different indices of a given array are treated as independent random variables and/or identically distributed random variables in generating the first plurality of probabilities and/or the second plurality of probabilities of the array field distribution data.

In various embodiments, the array field distribution data can be updated over time as new rows are received. For example, the array field distribution data is replaced with updated array field distribution data based on receiving at least one new row for the dataset and/or in response to regenerating the array field distribution data based on array structure included in the array field of the at least one new row.

Step 2784 includes receiving. a query expression for execution that includes a query predicate indicating the array field of the dataset. In various embodiments, the query predicate indicates selection and/or filtering of rows in the dataset based on at indicating selection of only rows with array structures that include: every value in a given list of literals identified in the query predicate; at least one value in a given list of literals identified in the query predicate; no values in given list of literals identified in the query predicate; and/or not all of the values in the given list of literals identified in the query predicate. In various embodiments, the query predicate indicates selection and/or filtering of rows in the dataset based on indicating selection of only rows with array structures that include values for array elements a one or more specified indexes of the array structure that meet criteria indicated in the query predicate.

Step 2786 includes utilizing the array field distribution data for the array field to generate query plan data (e.g. denoting an optimized query plan) for the query expression based on the query expression including the query predicate indicating the array field. For example, the query plan data is generated by a query plan generator module 2714 that accesses the array field distribution data. In various embodiments, this can include accessing the array field distribution data in a memory module that stores the array field distribution data. In various embodiments, this can include selecting arrangement of a set of filtering operators of a query operator execution flow corresponding to a set of query predicates of the query based on identifying which one of the set of query predicates are known and/or expected to filter out a greatest proportion of rows, where the known and/or expected proportion of rows filtered via each filtering operator for predicates that correspond to the array field is estimated and/or calculated based on the array field distribution data.

Step 2788 includes facilitating execution of the query expression in accordance with the query plan data (e.g. denoting the optimized query plan). For example, a query execution module 2504 executes the query plan data in accordance with a query operator execution flow 2517 indicated in the query plan data. As another example, a plurality of nodes 37 participate in a query execution plan 2405 based on the query plan data, for example, where a plurality of levels of the query execution plan 2405 are determined based on the query plan data in accordance with a query operator execution flow 2517 indicated in the query plan data 2717.

In various embodiments, the dataset includes a plurality of array fields that includes the array field. The method can further include generating the array field distribution data for each of the plurality of array fields. Different array fields of the plurality of array fields can have different array field distribution data. In various embodiments, generating the array field distribution data for each of the plurality of array fields includes generating single-dimensional PDF data for each of the plurality of array fields. In various embodiments, the random variable of the single-dimensional PDF data corresponds to the value of an array element of a given array structure of the given array field.

In various embodiments, the dataset includes a plurality of other fields that includes the array field. The method can further include generating multi-dimensional PDF data for the other plurality of fields. The method can further include generating the query plan data further based on the multi-dimensional PDF data for at least one of the other plurality of fields based on the query expression including at least one query predicate indicating the at least one of the other plurality of fields of the dataset.

In various embodiments, the multi-dimensional PDF data can be generated to indicate the array field and at least one of the other plurality of fields. The multi-dimensional PDF data can be generated based on a marginal PDF of the array field indicated by the array field distribution data. The method can further include generating the query plan data further based on the multi-dimensional PDF data for at least one of the other plurality of fields based on the query expression including at least one query predicate indicating the array field in conjunction with at least one of the other plurality of fields of the dataset.

In various examples, the dataset includes a plurality of rows that each include one of a plurality of array structures for the array field of the dataset. In various examples, each of the plurality of array structures includes a corresponding set of array elements. In various examples, the array field distribution data is generated based on a distribution of values included in each corresponding set of array elements of a plurality of sets of array elements corresponding to the plurality of rows of the dataset.

In various examples, the dataset is stored as at least one relational database table in storage resources of the database system. In various examples, the plurality of rows are implemented as relational database rows of the at least one relational database table having column values for a plurality of columns of the at least one relational database table. In various examples, array field corresponds to one of the plurality of columns. In various examples, the plurality of array structures correspond to column values for the one of the plurality of columns.

In various examples, generating the array field distribution data includes generating one of: a probability density function (PDF) data for the array field of the data set, or a probability mass function (PMF) data for the array field of the data set.

In various examples, generating the one of: the PDF data or the PMF data for the array field of the data set is based on sampling a proper subset of values of array elements included in array structures of the array field.

In various examples, generating the array field distribution data includes generating one of: single-dimensional PDF data for the array field as the PDF data, or single-dimensional PMF data for the array field as the PMF data.

In various examples, generating the array field distribution data includes generating distribution data for values of array elements included in array structures that is independent of a plurality of indices of the array structure, and that is further independent of an ordering of the array elements of the array structure.

In various examples, the dataset includes a plurality of fields that includes the array field, In various examples, the method further includes generating multi-dimensional PDF data for a set of multiple fields in the plurality of fields; and/or generating the query plan data further based on the multi-dimensional PDF data for the set of multiple fields based on the query expression including at least one query predicate indicating the set of multiple fields of the dataset.

In various examples, the dataset includes a plurality of array fields that includes the array field. In various examples, the method further includes generating a plurality of array field distribution data by generating corresponding array field distribution data for each of the plurality of array fields. In various examples, generating the array field distribution data for each of the plurality of array fields includes generating, for each of the plurality of array fields, one of: single-dimensional PDF data, or single-dimensional PMF data.

In various examples, generating the array field distribution data for the array field of the dataset is based on generating statistical data indicating values of array elements included in array structures of the array field.

In various examples, the array field distribution data is generated in accordance with a first distribution scheme. In various examples, second field distribution data is generated for a second field of the dataset in accordance with a second distribution scheme different from the first distribution scheme. In various examples, the second distribution scheme different from the first distribution scheme.

In various examples, the second field has first corresponding field values expressing a singular value. In various examples, the array field storing has second corresponding field values expressing array structures that each contain a set of multiple values. In various examples, the second distribution scheme different from the first distribution scheme based on the second distribution scheme being based on a distribution of different singular values of the first corresponding field values, and/or based on the first distribution scheme being based on a distribution of different values included within different sets of multiple values of the second corresponding field values.

In various examples, the query predicate further indicates at least one other field of the dataset. In various examples, generating the query plan data for the query expression includes selecting an ordering by which filtering denoted by the query predicate be applied to different fields of the dataset based on the array field distribution data for the array field and further based at least one other field distribution data that includes the second field distribution data for the second field.

In various examples, the dataset includes a plurality of rows. In various examples, the query predicate indicating the array field of the dataset indicates a filtering parameter for filtering the plurality of rows of the dataset based on identifying ones of the plurality of rows of the dataset having array structures in the array field with at least one array element meeting an array element value condition, and wherein the array field distribution data is utilized to estimate a proportion of rows expected to meet the array element value condition.

In various examples, the array element value condition indicates a requirement that a given value be included in array structures. In various examples, executing the query expression includes only identifying ones of the plurality of rows having the given value included as at least one array element in a corresponding array structure of the array field. In various examples, the array field distribution data is utilized to estimate the proportion of rows expected to include the given value in their corresponding array structure.

In various examples, array field distribution data is utilized to estimate the proportion of rows expected to include the given value in their array structure based on the array field distribution data being generated to denote, for each of a set of value ranges, a probability that a given array structure of the array field includes values within the each of the set of value ranges as at least one of its array elements. In various examples the set of value ranges are discrete values based on the array field distribution data being generated in accordance with a probability mass function (PMF). In various examples, the set of value ranges are continuous ranges of values based on the array field distribution data being generated in accordance with a probability density function (PDF).

In various examples, the method further includes, prior to receiving the query expression: receiving the dataset for storage; processing the dataset for storage, wherein the array field distribution data is generated for the array field of the dataset in conjunction with processing the dataset for storage; and/or storing the dataset and the array field distribution data in storage resources of the database system.

In various examples, utilizing the array field distribution data to generate the query plan data for the query expression is based on accessing the array field distribution data in the storage resources. In various examples, facilitating execution of the query expression in accordance with the query plan data includes accessing at least a portion of the dataset in the storage resources.

In various examples, processing the dataset for storage includes generating a plurality of segments based on segregating different portions of the dataset into different segments. In various examples, a first portion of each segment indicates array structures of the array field for a corresponding portion of the dataset. In various examples, a second portion of the each segment indicates corresponding array field distribution data for the array structures of the array field for the corresponding portion of the dataset. In various examples, the different segments include different corresponding array field distribution data based on corresponding distribution differences across the different portions of the dataset.

In various embodiments, any one of more of the various examples listed above are implemented in conjunction with performing some or all steps of FIG. 27D. In various embodiments, any set of the various examples listed above can be implemented in tandem, for example, in conjunction with performing some or all steps of FIG. 27D.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27D described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27D, for example, in conjunction with further implementing any one or more of the various examples described above.

In various embodiments, the operational instructions, when executed by the at least one processor, cause the database system to: generate array field distribution data for an array field of a dataset; receive a query expression for execution that includes a query predicate indicating the array field of the dataset; utilize the array field distribution data for the array field to generate query plan data for the query expression based on the query expression including the query predicate indicating the array field; and/or facilitate execution of the query expression in accordance with the query plan data.

In various embodiments, a non-transitory computer readable storage medium includes at least one memory section that stores operational instructions. The operational instructions, when executed by a processing module that includes a processor and a memory, cause the processing module to: generate array field distribution data for an array field of a dataset; receive a query expression for execution that includes a query predicate indicating the array field of the dataset; utilize the array field distribution data for the array field to generate query plan data for the query expression based on the query expression including the query predicate indicating the array field; and/or facilitate execution of the query expression in accordance with the query plan data.

In various embodiments, a query processing system includes at least one processor and a memory that stores operational instructions. The operational instructions, when executed by the at least one processor, can cause the query processing system to: generate array field distribution data for an array field of a dataset; receive a query expression for execution that includes a query predicate indicating the array field of the dataset; utilize the array field distribution data for the array field to generate query plan data for the query expression based on the query expression including the query predicate indicating the array field; and/or facilitate execution of the query expression in accordance with the query plan data.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by at least one processor of a database system, comprising:
generating array field distribution data for an array field of a dataset;
receiving a query expression for execution that includes a query predicate indicating the array field of the dataset;
utilizing the array field distribution data for the array field to generate query plan data for the query expression based on the query expression including the query predicate indicating the array field; and
facilitating execution of the query expression in accordance with the query plan data;
wherein the array field distribution data is generated in accordance with a first distribution scheme, further comprising: generating second field distribution data for a second field of the dataset in accordance with a second distribution scheme different from the first distribution scheme;

wherein the second field has first corresponding field values expressing a singular value, wherein the array field storing has second corresponding field values expressing array structures that each contain a set of multiple values, and wherein the second distribution scheme different from the first distribution scheme based on the second distribution scheme being based on a distribution of different singular values of the first corresponding field values and based on the first distribution scheme being based on a distribution of different values included within different sets of multiple values of the second corresponding field values.

2. The method of claim 1, wherein the dataset includes a plurality of rows that each include one of a plurality of array structures for the array field of the dataset, wherein each of the plurality of array structures includes a corresponding set of array elements, and wherein the array field distribution data is generated based on a distribution of values included in each corresponding set of array elements of a plurality of sets of array elements corresponding to the plurality of rows of the dataset.

3. The method of claim 2, wherein the dataset is stored as at least one relational database table in storage resources of the database system, wherein the plurality of rows are implemented as relational database rows of the at least one relational database table having column values for a plurality of columns of the at least one relational database table, wherein the array field corresponds to one of the plurality of columns, and wherein the plurality of array structures correspond to column values for the one of the plurality of columns.

4. The method of claim 1, wherein generating the array field distribution data includes generating distribution data for values of array elements included in array structures that is independent of a plurality of indices of the array structure, and that is further independent of an ordering of the array elements of the array structure.

5. The method of claim 1, wherein generating the array field distribution data includes generating one of: a probability density function (PDF) data for the array field of the data set, or a probability mass function (PMF) data for the array field of the data set.

6. The method of claim 5, wherein generating the one of: the PDF data or the PMF data for the array field of the data set is based on sampling a proper subset of values of array elements included in array structures of the array field.

7. The method of claim 5, wherein generating the array field distribution data includes generating one of: single-dimensional PDF data for the array field as the PDF data, or single-dimensional PMF data for the array field as the PMF data.

8. The method of claim 7, wherein the dataset includes a plurality of fields that includes the array field, further comprising:

generating multi-dimensional PDF data for a set of multiple fields in the plurality of fields; and generating the query plan data further based on the multi-dimensional PDF data for the set of multiple fields based on the query expression including at least one query predicate indicating the set of multiple fields of the dataset.

9. The method of claim 1, wherein the dataset includes a plurality of array fields that includes the array field, further comprising:

generating a plurality of array field distribution data by generating corresponding array field distribution data for each of the plurality of array fields, wherein generating the array field distribution data for each of the plurality of array fields includes generating, for each of the plurality of array fields, one of: single-dimensional PDF data, or single-dimensional PMF data.

10. The method of claim 1, wherein generating the array field distribution data for the array field of the dataset is based on generating statistical data indicating values of array elements included in array structures of the array field.

11. The method of claim 1, wherein the query predicate further indicates at least one other field of the dataset, and wherein generating the query plan data for the query expression includes selecting an ordering by which filtering denoted by the query predicate be applied to different fields of the dataset based on the array field distribution data for the array field and further based at least one other field distribution data that includes the second field distribution data for the second field.

12. The method of claim 1, wherein the dataset includes a plurality of rows, wherein the query predicate indicating the array field of the dataset indicates a filtering parameter for filtering the plurality of rows of the dataset based on identifying ones of the plurality of rows of the dataset having array structures in the array field with at least one array element meeting an array element value condition, and wherein the array field distribution data is utilized to estimate a proportion of rows expected to meet the array element value condition.

13. The method of claim 12, wherein the array element value condition indicates a requirement that a given value be included in array structures, wherein executing the query expression includes only identifying ones of the plurality of rows having the given value included as at least one array element in a corresponding array structure of the array field, and wherein the array field distribution data is utilized to estimate the proportion of rows expected to include the given value in their corresponding array structure.

14. The method of claim 13, wherein the array field distribution data is utilized to estimate the proportion of rows expected to include the given value in their array structure based on the array field distribution data being generated to denote, for each of a set of value ranges, a probability that a given array structure of the array field includes values within the each of the set of value ranges as at least one of its array elements, and wherein one of: the set of value ranges are discrete values based on the array field distribution data being generated in accordance with a probability mass function (PMF), or the set of value ranges are continuous ranges of values based on the array field distribution data being generated in accordance with a probability density function (PDF).

15. The method of claim 1, further comprising, prior to receiving the query expression:

receiving the dataset for storage;

processing the dataset for storage, wherein the array field distribution data is generated for the array field of the dataset in conjunction with processing the dataset for storage; and storing the dataset and the array field distribution data in storage resources of the database system;

wherein utilizing the array field distribution data to generate the query plan data for the query expression is based on accessing the array field distribution data in the storage resources, and wherein facilitating execution of the query expression in accordance with the query plan data includes accessing at least a portion of the dataset in the storage resources.

16. The method of claim 15, wherein processing the dataset for storage includes generating a plurality of segments based on segregating different portions of the dataset into different segments, wherein a first portion of each segment indicates array structures of the array field for a corresponding portion of the dataset, wherein a second portion of the each segment indicates corresponding array field distribution data for the array structures of the array field for the corresponding portion of the dataset, and wherein the different segments include different corresponding array field distribution data based on corresponding distribution differences across the different portions of the dataset.

17. A query processing system includes:
at least one processor; and
a memory that stores operational instructions that, when executed by the at least one processor, cause the query processing system to:
generate array field distribution data for an array field of a dataset;
receive a query expression for execution that includes a query predicate indicating the array field of the dataset;
utilize the array field distribution data for the array field to generate query plan data for the query expression based on the query expression including the query predicate indicating the array field; and
facilitate execution of the query expression in accordance with the query plan data;
wherein the dataset includes a plurality of rows, wherein the query predicate indicating the array field of the dataset indicates a filtering parameter for filtering the plurality of rows of the dataset based on identifying ones of the plurality of rows of the dataset having array structures in the array field with at least one array element meeting an array element value condition;
wherein the array field distribution data is utilized to estimate a proportion of rows expected to meet the array element value condition;
wherein the array element value condition indicates a requirement that a given value be included in array structures;
wherein executing the query expression includes only identifying ones of the plurality of rows having the given value included as at least one array element in a corresponding array structure of the array field;
wherein the array field distribution data is utilized to estimate the proportion of rows expected to include the given value in their corresponding array structure;
wherein the array field distribution data is utilized to estimate the proportion of rows expected to include the given value in their array structure based on the array field distribution data being generated to denote, for each of a set of value ranges, a probability that a given array structure of the array field includes values within the each of the set of value ranges as at least one of its array elements; and
wherein one of: the set of value ranges are discrete values based on the array field distribution data being generated in accordance with a probability mass function (PMF), or the set of value ranges are continuous ranges of values based on the array field distribution data being generated in accordance with a probability density function (PDF).

18. A non-transitory computer readable storage medium comprises:
at least one memory section that stores operational instructions that, when executed by a processing module that includes a processor and a memory, causes the processing module to perform operations that include:
generate array field distribution data for an array field of a dataset;
receive a query expression for execution that includes a query predicate indicating the array field of the dataset;
utilize the array field distribution data for the array field to generate query plan data for the query expression based on the query expression including the query predicate indicating the array field;
facilitate execution of the query expression in accordance with the query plan data; and
wherein, prior to receiving the query expression, the operations include:
receiving the dataset for storage;
processing the dataset for storage, wherein the array field distribution data is generated for the array field of the dataset in conjunction with processing the dataset for storage; and
storing the dataset and the array field distribution data in storage resources of a database system;
wherein utilizing the array field distribution data to generate the query plan data for the query expression is based on accessing the array field distribution data in the storage resources;
wherein facilitating execution of the query expression in accordance with the query plan data includes accessing at least a portion of the dataset in the storage resources;
wherein processing the dataset for storage includes generating a plurality of segments based on segregating different portions of the dataset into different segments;
wherein a first portion of each segment indicates array structures of the array field for a corresponding portion of the dataset; and
wherein a second portion of the each segment indicates corresponding array field distribution data for the array structures of the array field for the corresponding portion of the dataset, and wherein the different segments include different corresponding array field distribution data based on corresponding distribution differences across the different portions of the dataset.

* * * * *